US005633632A

United States Patent [19]

Ido et al.

[11] Patent Number: 5,633,632

[45] Date of Patent: May 27, 1997

[54] DATA CONVERSION METHOD AND APPARATUS IMBEDDING PILOT SIGNAL INTO CONVERTED DATA AND REDUCING ERROR PROPAGATION BETWEEN DATAWORDS

[75] Inventors: Kihei Ido; Masako Yamada; Hideaki Kosaka; Masayuki Ohta, all of Nagaokakyo, Japan

[73] Assignee: Mitsubishi Denki Kabushiki Kaisha, Tokyo, Japan

[21] Appl. No.: 592,588

[22] Filed: Jan. 17, 1996

Related U.S. Application Data

[63] Continuation of Ser. No. 18,403, Feb. 17, 1993, abandoned.

[30] Foreign Application Priority Data

Feb. 19, 1992 [JP] Japan .................................... 4-032077
Feb. 28, 1992 [JP] Japan .................................... 4-043074

[51] Int. Cl.[6] .................................................... H03M 7/00

[52] U.S. Cl. ............................................... 341/58; 341/59

[58] Field of Search .................................. 341/58, 59, 95

[56] References Cited

U.S. PATENT DOCUMENTS

| | | | |
|---|---|---|---|
| 4,499,454 | 2/1985 | Shimada | 341/58 |
| 4,675,650 | 6/1987 | Coppersmith et al. | 341/59 |
| 4,833,470 | 5/1989 | Iketani | 341/59 |
| 5,012,240 | 4/1991 | Takahashi et al. | 341/101 |
| 5,016,258 | 5/1991 | Tanaka et al. | 375/25 |
| 5,142,421 | 8/1992 | Kahlman et al. | 360/40 |
| 5,155,485 | 10/1992 | Sako et al. | 341/95 |
| 5,198,813 | 3/1993 | Isozaki | 341/59 |
| 5,276,708 | 1/1994 | Heitmann | 375/19 |

FOREIGN PATENT DOCUMENTS

| | | |
|---|---|---|
| 0104700 | 4/1984 | European Pat. Off. . |
| 0178589 | 4/1986 | European Pat. Off. . |
| 0250049 | 12/1987 | European Pat. Off. . |
| 0321314 | 6/1989 | European Pat. Off. . |
| 0338781 | 10/1989 | European Pat. Off. . |
| 0339724 | 11/1989 | European Pat. Off. . |
| 0405885 | 1/1991 | European Pat. Off. . |
| 0426033 | 5/1991 | European Pat. Off. . |
| 2551277 | 3/1985 | France . |
| 1-317280 | 12/1989 | Japan . |
| 3-217179 | 9/1991 | Japan . |
| 2111805 | 7/1983 | United Kingdom . |

OTHER PUBLICATIONS

"General Report of the DAT Conference" Mar., 1988.
IEEE Transactions on Consumer Electronics, vol. 37, No. 3, Aug. 1991, pp. 252–259, Onishi et al., "An Experimental Home-Use Digital VCR With Three Dimensional DCT and Superimposed Error Correction Coding".

*Primary Examiner*—Marc S. Hoff

[57] ABSTRACT

A data conversion method, wherein a sequence of first r-bit datawords is divided into groups of x bits where x is the least common multiple of r and m, an arbitrary first dataword selected from x/r groups of first datawords is divided into x/m, an m-bit second dataword is formed by appending r/(x/m)-bit data, obtained by dividing the first dataword into x/m, to the LSB or MSB side of one or other of the non-divided first datawords, and the word-converted m-bit second dataword is converted to an n-bit codeword (m<n).

53 Claims, 71 Drawing Sheets

Fig. 2
Prior Art

| | | Q′=−1 | | | Q′=1 | | |
|---|---|---|---|---|---|---|---|
| | DATAWORD (MSB-LSB) | CODEWORD (MSB-LSB) | DC | Q | CODEWORD (MSB-LSB) | DC | Q |
| 00 | 00000000 | 0101010101 | 0 | 1 | 0101010101 | 0 | −1 |
| 01 | 00000001 | 0101010111 | 0 | −1 | 0101010111 | 0 | 1 |
| 02 | 00000010 | 0101011101 | 0 | −1 | 0101011101 | 0 | 1 |
| 03 | 00000011 | 0101011111 | 0 | 1 | 0101011111 | 0 | −1 |
| 04 | 00000100 | 0101001001 | 0 | −1 | 0101001001 | 0 | 1 |
| 05 | 00000101 | 0101001011 | 0 | 1 | 0101001011 | 0 | −1 |
| 06 | 00000110 | 0101001110 | 0 | 1 | 0101001110 | 0 | −1 |
| 07 | 00000111 | 0101011010 | 0 | 1 | 0101011010 | 0 | −1 |
| 08 | 00001000 | 0101110101 | 0 | −1 | 0101110101 | 0 | 1 |
| 09 | 00001001 | 0101110111 | 0 | 1 | 0101110111 | 0 | −1 |
| 0A | 00001010 | 0101111101 | 0 | 1 | 0101111101 | 0 | −1 |
| 0B | 00001011 | 0101111111 | 0 | −1 | 0101111111 | 0 | 1 |
| 0C | 00001100 | 0101101001 | 0 | 1 | 0101101001 | 0 | −1 |
| 0D | 00001101 | 0101101011 | 0 | −1 | 0101101011 | 0 | 1 |
| 0E | 00001110 | 0101101110 | 0 | −1 | 0101101110 | 0 | 1 |
| 0F | 00001111 | 0101111010 | 0 | −1 | 0101111010 | 0 | 1 |
| ⋮ | ⋮ | ⋮ | ⋮ | ⋮ | ⋮ | ⋮ | ⋮ |
| F0 | 11110000 | 1101010101 | 0 | −1 | 1101010101 | 0 | 1 |
| F1 | 11110001 | 1101010111 | 0 | 1 | 1101010111 | 0 | −1 |
| F2 | 11110010 | 1101011101 | 0 | 1 | 1101011101 | 0 | −1 |
| F3 | 11110011 | 1101011111 | 0 | −1 | 1101011111 | 0 | 1 |
| F4 | 11110100 | 1101001001 | 0 | 1 | 1101001001 | 0 | −1 |
| F5 | 11110101 | 1101001011 | 0 | −1 | 1101001011 | 0 | 1 |
| F6 | 11110110 | 1101001110 | 0 | −1 | 1101001110 | 0 | 1 |
| F7 | 11110111 | 1101011010 | 0 | −1 | 1101011010 | 0 | 1 |
| F8 | 11111000 | 1111100101 | 2 | −1 | 0111100101 | −2 | −1 |
| F9 | 11111001 | 1111100111 | 2 | 1 | 0111100111 | −2 | 1 |
| FA | 11111010 | 1111101101 | 2 | 1 | 0111101101 | −2 | 1 |
| FB | 11111011 | 1111101111 | 2 | −1 | 0111101111 | −2 | −1 |
| FC | 11111100 | 1111111001 | 2 | 1 | 0111111001 | −2 | 1 |
| FD | 11111101 | 1111111011 | 2 | −1 | 0111111011 | −2 | −1 |
| FE | 11111110 | 1111111110 | 2 | −1 | 0111111110 | −2 | −1 |
| FF | 11111111 | 1111101010 | 2 | −1 | 0111101010 | −2 | −1 |

Fig. 6

| CDS | −1 | +1 | −3 | +3 | −5 | +5 |
|---|---|---|---|---|---|---|
| NUMBER OF CODEWORDS | 2481 | 2169 | 1888 | 1231 | 909 | 410 |

Fig. 7

| CONDITION OF $n_1$ | A CDS=0 | | | B CDS=+2 | | | C CDS=−2 | | D CDS=+4 | | E CDS=−4 | |
|---|---|---|---|---|---|---|---|---|---|---|---|---|
| | A1 | A2 | A3 | B1 | B2 | B3 | C1 | C2 | D1 | D2 | E1 | |
| NUMBER OF $n_1$ CODEWORDS | 102 | 14 | 4 | 51 | 17 | 3 | 116 | 4 | 18 | 2 | 68 | |
| $n_2$ CODEWORD MATCHING WITH $n_1$ | 02 | | | 02 | 02 | | | | | | | |
| | 05 | 05 | | 05 | 05 | 05 | | | | | | |
| | 07 | 07 | | 07 | 07 | 07 | | | | | | |
| | 09 | 09 | 09 | | | | 09 | | | | | |
| | 0A | 0A | 0A | 0A | 0A | 0A | | | | | | |
| | 0B | 0B | 0B | | | | 0B | | | | | |
| | 0D | 0D | 0D | 0D | 0D | 0D | | | | | | |
| | 0E | 0E | 0E | | | | 0E | | | | | |
| | 0F | 0F | 0F | 0F | 0F | 0F | | | | | | |
| | 12 | 12 | 12 | | | | 12 | 12 | | | | |
| | 15 | 15 | 15 | | | | 15 | 15 | | | | |
| | 17 | 17 | 17 | | | | 17 | 17 | | | | |
| | 19 | 19 | 19 | 19 | 19 | 19 | | | | | | |
| | 1A | 1A | 1A | | | | 1A | 1A | | | | |
| | 1B | 1B | 1B | 1B | 1B | 1B | | | | | | |
| | 1D | 1D | 1D | | | | 1D | 1D | | | | |
| | 1E | 1E | 1E | 1E | 1E | 1E | | | | | | |
| | 1F | 1F | 1F | | | | 1F | 1F | | | | |
| | | | | 01 | | | | | 01 | | | |
| | | | | 03 | 03 | | | | 03 | 03 | | |
| | | | | 06 | 06 | 06 | | | 06 | 06 | | |
| | | | | | | | 11 | 11 | | | 11 | |
| | | | | | | | 13 | 13 | | | 13 | |
| | | | | | | | 16 | 16 | | | 16 | |

NOTE : SUBDIVISIONS OF A TO E GROUPS ARE EXECUTED FOR EACH $n_1$ GROUP IN ACCORDANCE WITH "0" RUN-LENGTH AT LSB SIDE OF $n_1$.

F i g. 8

| | $m_1$ DATAWORD | $n_1$ GROUP | $n_2$ CODEWORD | | | | | | | | | | | | | | | |
|---|---|---|---|---|---|---|---|---|---|---|---|---|---|---|---|---|---|---|
| | | | $m_2$ 0 | 1 | 2 | 3 | 4 | 5 | 6 | 7 | 8 | 9 | A | B | C | D | E | F |
| 1 | 00 ~ 73 | A GROUP (A1, A2) | 07 | 09 | 0A | 0B | 0D | 0E | 0F | 12 | 15 | 17 | 19 | 1A | 1B | 1D | 1E | 1F |

Fig. 9

| | m1 DATAWORD | n1 GROUP | n2 CODEWORD m2 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|
| 2 | 74~BA | 1st n1 GROUP C1 | | | 09 | | 0B | | 0E | | 12 | 15 | 17 | | 1A | | 1D | 1E | |
| | | 2nd n1 GROUP B1 | | 07 | | 0A | | 0D | | 0F | | | | 19 | | 1B | | | 1F |

Fig. 10

| | $m_1$ | $n_1$ | $n_2$ CODEWORD | | | | | | | | | | | | | | | |
|---|---|---|---|---|---|---|---|---|---|---|---|---|---|---|---|---|---|---|
| | DATAWORD | GROUP | $m_2$ 0 | 1 | 2 | 3 | 4 | 5 | 6 | 7 | 8 | 9 | A | B | C | D | E | F |
| 3 | BB ~ E7 | 1st $n_1$ GROUP C1 | | 09 | | 0B | | 0E | | 12 | 15 | 17 | | 1A | | 1D | 1E | |
| | | 2nd $n_1$ GROUP B1 | 01 | | 03 | | 05 | | 06 | | | | | | | | | |
| | | 3rd $n_1$ GROUP E1 | | | | | | | | | | | 11 | | 13 | | | 16 |
| | E8 ~ ED | 1st $n_1$ GROUP C1 | | 11 | | 13 | | 16 | | 11 | 13 | 16 | | 11 | | 13 | 16 | |
| | | 2nd $n_1$ GROUP B1 | 01 | | 03 | | 05 | | 06 | | | | | | | | | |
| | | 3rd $n_1$ GROUP E1 | | | | | | | | | | | 11 | | 13 | | | 16 |
| | EE ~ FF | 1st $n_1$ GROUP C1 | | 11 | | 13 | | 16 | | 11 | 13 | 16 | | 11 | | 13 | 16 | |
| | | 2nd $n_1$ GROUP D1 | 01 | | 03 | | | | 06 | | | | | | | | | |
| | | 3rd $n_1$ GROUP E1, C2 | | | | | | | | | | | 11 | | 13 | | | 16 |
| | | 4th $n_1$ GROUP B2, B3 | | | | | 05 | | | | | | | | | | | |

Fig. 11

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 8847 | 4849 | 084A | C84B | 884D | C84E | 084F | 4852 | C855 | 4857 | 8859 | C85A | 085D | 485D | 085E | C85F |
| 01 | 48A7 | 88A9 | C8AA | 08AB | 48AD | 08AE | C8AF | 88B2 | 08B5 | 88B7 | 48B9 | 08BA | C8BD | 88BD | C8BE | 08BF |
| 02 | 88E7 | 48E9 | 08EA | C8EB | 88ED | C8EE | 08EF | 48F2 | C8F5 | 48F7 | 88F9 | C8FA | 08FD | 48FD | 08FE | C8FF |
| 03 | 4947 | 8949 | C94A | 094B | 494D | 094E | C94F | 8952 | 0955 | 8957 | 4959 | 095A | C95D | 895D | C95E | 095F |
| 04 | 89A7 | 49A9 | 09AA | C9AB | 89AD | C9AE | 09AF | 49B2 | C9B5 | 49B7 | 89B9 | C9BA | 09BD | 49BD | 09BE | C9BF |
| 05 | 49E7 | 89E9 | C9EA | 09EB | 49ED | 09EE | C9EF | 89F2 | 09F5 | 89F7 | 49F9 | 09FA | C9FD | 89FD | C9FE | 09FF |
| 06 | 8B27 | 4B29 | 0B2A | CB2B | 8B2D | CB2E | 0B2F | 4B32 | CB35 | 4B37 | 8B39 | CB3A | 0B3D | 4B3D | 0B3E | CB3F |
| 07 | 4B67 | 8B69 | CB6A | 0B6B | 4B6D | 0B6E | CB6F | 8B72 | 0B75 | 8B77 | 4B79 | 0B7A | CB7D | 8B7D | CB7E | 0B7F |
| 08 | 4BC7 | 8BC9 | CBCA | 0BCB | 4BCD | 0BCE | CBCF | 8BD2 | 0BD5 | 8BD7 | 4BD9 | 0BDA | CBDD | 8BDD | CBDE | 0BDF |
| 09 | 8E27 | 4E29 | 0E2A | CE2B | 8E2D | CE2E | 0E2F | 4E32 | CE35 | 4E37 | 8E39 | CE3A | 0E3D | 4E3D | 0E3E | CE3F |
| 0A | 4E67 | 8E69 | CE6A | 0E6B | 4E6D | 0E6E | CE6F | 8E72 | 0E75 | 8E77 | 4E79 | 0E7A | CE7D | 8E7D | CE7E | 0E7F |
| 0B | 4EC7 | 8EC9 | CECA | 0ECB | 4ECD | 0ECE | CECF | 8ED2 | 0ED5 | 8ED7 | 4ED9 | 0EDA | CEDD | 8EDD | CEDE | 0EDF |
| 0C | 5127 | 9129 | D12A | 112B | 512D | 112E | D12F | 9132 | 1135 | 9137 | 5139 | 113A | D13D | 913D | D13E | 113F |
| 0D | 9167 | 5169 | 116A | D16B | 916D | D16E | 116F | 5172 | D175 | 5177 | 9179 | D17A | 117D | 517D | 117E | D17F |
| 0E | 91C7 | 51C9 | 11CA | D1CB | 91CD | D1CE | 11CF | 51D2 | D1D5 | 51D7 | 91D9 | D1DA | 11DD | 51DD | 11DE | D1DF |
| 0F | 5247 | 9249 | D24A | 124B | 524D | 124E | D24F | 9252 | 1255 | 9257 | 5259 | 125A | D25D | 925D | D25E | 125F |

Fig. 12

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | 92A7 | 52A9 | 12AA | D2AB | 92AD | D2AE | 12AF | 52B2 | D2B5 | 52B7 | 92B9 | D2BA | 12BB | 52BD | 12BE | D2BF |
| 11 | 52E7 | 92E9 | D2EA | 12EB | 52ED | 12EE | D2EF | 92F2 | 12F5 | 92F7 | 52F9 | 12FA | D2FB | 92FD | D2FE | 12FF |
| 12 | 9347 | 5349 | 134A | D34B | 934D | D34E | 134F | 5352 | D355 | 5357 | 9359 | D35A | 135B | 535D | 135E | D35F |
| 13 | 53A7 | 93A9 | D3AA | 13AB | 53AD | 13AE | D3AF | 93B2 | 13B5 | 93B7 | 53B9 | 13BA | D3BB | 93BD | D3BE | 13BF |
| 14 | 93E7 | 53E9 | 13EA | D3EB | 93ED | D3EE | 13EF | 53F2 | D3F5 | 53F7 | 93F9 | D3FA | 13FB | 53FD | 13FE | D3FF |
| 15 | 9527 | 5529 | 152A | D52B | 952D | D52E | 152F | 5532 | D535 | 5537 | 9539 | D53A | 153B | 553D | 153E | D53F |
| 16 | 5567 | 9569 | D56A | 156B | 556D | 156E | D56F | 9572 | 1575 | 9577 | 5579 | 157A | D57B | 957D | D57E | 157F |
| 17 | 55C7 | 95C9 | D5CA | 15CB | 55CD | 15CE | D5CF | 95D2 | 15D5 | 95D7 | 55D9 | 15DA | D5DB | 95DD | D5DE | 15DF |
| 18 | 9647 | 5649 | 164A | D64B | 964D | D64E | 164F | 5652 | D655 | 5657 | 9659 | D65A | 165B | 565D | 165E | D65F |
| 19 | 56A7 | 96A9 | D6AA | 16AB | 56AD | 16AE | D6AF | 96B2 | 16B5 | 96B7 | 56B9 | 16BA | D6BB | 96BD | D6BE | 16BF |
| 1A | 96E7 | 56E9 | 16EA | D6EB | 96ED | D6EE | 16EF | 56F2 | D6F5 | 56F7 | 96F9 | D6FA | 16FB | 56FD | 16FE | D6FF |
| 1B | 5747 | 9749 | D74A | 174B | 574D | 174E | D74F | 9752 | 1755 | 9757 | 5759 | 175A | D75B | 975D | D75E | 175F |
| 1C | 97A7 | 57A9 | 17AA | D7AB | 97AD | D7AE | 17AF | 57B2 | D7B5 | 57B7 | 97B9 | D7BA | 17BB | 57BD | 17BE | D7BF |
| 1D | 57E7 | 97E9 | D7EA | 17EB | 57ED | 17EE | D7EF | 97F2 | 17F5 | 97F7 | 57F9 | 17FA | D7FB | 97FD | D7FE | 17FF |
| 1E | 9A27 | 5A29 | 1A2A | DA2B | 9A2D | DA2E | 1A2F | 5A32 | DA35 | 5A37 | 9A39 | DA3A | 1A3B | 5A3D | 1A3E | DA3F |
| 1F | 5A67 | 9A69 | DA6A | 1A6B | 5A6D | 1A6E | DA6F | 9A72 | 1A75 | 9A77 | 5A79 | 1A7A | DA7B | 9A7D | DA7E | 1A7F |

Fig. 13

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | 5AC7 | 9AC9 | DACA | 1ACB | 5ACD | 1ACE | DACF | 9AD2 | 1AD5 | 9AD7 | 5AD9 | 1ADA | DADB | 9ADD | DADE | 1ADF |
| 21 | 9C47 | 5C49 | 1C4A | DC4B | 9C4D | DC4E | 1C4F | 5C52 | DC55 | 5C57 | 9C59 | DC5A | 1C5B | 5C5D | 1C5E | DC5F |
| 22 | 5CA7 | 9CA9 | DCAA | 1CAB | 5CAD | 1CAE | DCAF | 9CB2 | 1CB5 | 9CB7 | 5CB9 | 1CBA | DCBB | 9CBD | DCBE | 1CBF |
| 23 | 9CE7 | 5CE9 | 1CEA | DCEB | 9CED | DCEE | 1CEF | 5CF2 | DCF5 | 5CF7 | 9CF9 | DCFA | 1CFB | 5CFD | 1CFE | DCFF |
| 24 | 5D47 | 9D49 | DD4A | 1D4B | 5D4D | 1D4E | DD4F | 9D52 | 1D55 | 9D57 | 5D59 | 1D5A | DD5B | 9D5D | DD5E | 1D5F |
| 25 | 9DA7 | 5DA9 | 1DAA | DDAB | 9DAD | DDAE | 1DAF | 5DB2 | DDB5 | 5DB7 | 9DB9 | DDBA | 1DDB | 5DBD | 1DBE | DDBF |
| 26 | 5DE7 | 9DE9 | DDEA | 1DEB | 5DED | 1DEE | DDEF | 9DF2 | 1DF5 | 9DF7 | 5DF9 | 1DFA | DDFB | 9DFD | DDFE | 1DFF |
| 27 | 9F27 | 5F29 | 1F2A | DF2B | 9F2D | DF2E | 1F2F | 5F32 | DF35 | 5F37 | 9F39 | DF3A | 1F3B | 5F3D | 1F3E | DF3F |
| 28 | 5F67 | 9F69 | DF6A | 1F6B | 5F6D | 1F6E | DF6F | 9F72 | 1F75 | 9F77 | 5F79 | 1F7A | DF7B | 9F7D | DF7E | 1F7F |
| 29 | 5FC7 | 9FC9 | DFCA | 1FCB | 5FCD | 1FCE | DFCF | 9FD2 | 1FD5 | 9FD7 | 5FD9 | 1FDA | DFDB | 9FDD | DFDE | 1FDF |
| 2A | 6227 | A229 | E22A | 222B | 622D | 222E | E22F | A232 | 2235 | A237 | 6239 | 223A | E23B | A23D | E23E | 223F |
| 2B | A267 | 6269 | 226A | E26B | A26D | E26E | 226F | 6272 | E275 | 6277 | A279 | E27A | 227B | 627D | 227E | E27F |
| 2C | A2C7 | 62C9 | 22CA | E2CB | A2CD | E2CE | 22CF | 62D2 | E2D5 | 62D7 | A2D9 | E2DA | 22DB | 62DD | 22DE | E2DF |
| 2D | 6447 | A449 | E44A | 244B | 644D | 244E | E44F | A452 | 2455 | A457 | 6459 | 245A | E45B | A45D | E45E | 245F |
| 2E | A4A7 | 64A9 | 24AA | E4AB | A4AD | E4AE | 24AF | 64B2 | E4B5 | 64B7 | A4B9 | E4BA | 24DB | 64BD | 24BE | E4BF |
| 2F | 64E7 | A4E9 | E4EA | 24EB | 64ED | 24EE | E4EF | A4F2 | 24F5 | A4F7 | 64F9 | 24FA | E4FB | A4FD | E4FE | 24FF |

Fig. 14

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | A547 | 6549 | 254A | E54B | A54D | E54E | 254F | 6552 | E555 | 6557 | A559 | E55A | 255B | 655D | 255E | E55F |
| 31 | 65A7 | A5A9 | E5AA | 25AB | 65AD | 25AE | E5AF | A5B2 | 25B5 | A5B7 | 65B9 | 25BA | E5BB | A5BD | E5BE | 25BF |
| 32 | A5E7 | 65E9 | 25EA | E5EB | A5ED | E5EE | 25EF | 65F2 | E5F5 | 65F7 | A5F9 | E5FA | 25FB | 65FD | 25FE | E5FF |
| 33 | 6727 | A729 | E72A | 272B | 672D | 272E | E72F | A732 | 2735 | A737 | 6739 | 273A | E73B | A73D | E73E | 273F |
| 34 | A767 | 6769 | 276A | E76B | A76D | E76E | 276F | 6772 | E775 | 6777 | A779 | E77A | 277B | 677D | 277E | E77F |
| 35 | A7C7 | 67C9 | 27CA | E7CB | A7CD | E7CE | 27CF | 67D2 | E7D5 | 67D7 | A7D9 | E7DA | 27DB | 67DD | 27DE | E7DF |
| 36 | A927 | 6929 | 292A | E92B | A92D | E92E | 292F | 6932 | E935 | 6937 | A939 | E93A | 293B | 693D | 293E | E93F |
| 37 | 6967 | A969 | E96A | 296B | 696D | 296E | E96F | A972 | 2975 | A977 | 6979 | 297A | E97B | A97D | E97E | 297F |
| 38 | 69C7 | A9C9 | E9CA | 29CB | 69CD | 29CE | E9CF | A9D2 | 29D5 | A9D7 | 69D9 | 29DA | E9DB | A9DD | E9DE | 29DF |
| 39 | AA47 | 6A49 | 2A4A | EA4B | AA4D | EA4E | 2A4F | 6A52 | EA55 | 6A57 | AA59 | EA5A | 2A5B | 6A5D | 2A5E | EA5F |
| 3A | 6AA7 | AAA9 | EAAA | 2AAB | 6AAD | 2AAE | EAAF | AAB2 | 2AB5 | AAB7 | 6AB9 | 2ABA | EABB | AABD | EABE | 2ABF |
| 3B | AAE7 | 6AE9 | 2AEA | EAEB | AAED | EAEE | 2AEF | 6AF2 | EAF5 | 6AF7 | AAF9 | EAFA | 2AFB | 6AFD | 2AFE | EAFF |
| 3C | 6B47 | AB49 | EB4A | 2B4B | 6B4D | 2B4E | EB4F | AB52 | 2B55 | AB57 | 6B59 | 2B5A | EB5B | AB5D | EB5E | 2B5F |
| 3D | ABA7 | 6BA9 | 2BAA | EBAB | ABAD | EBAE | 2BAF | 6BB2 | EBB5 | 6BB7 | ABB9 | EBBA | 2BBB | 6BBD | 2BBE | EBBF |
| 3E | 6BE7 | ABE9 | EBEA | 2BEB | 6BED | 2BEE | EBEF | ABF2 | 2BF5 | ABF7 | 6BF9 | 2BFA | EBFB | ABFD | EBFE | 2BFF |
| 3F | 6D27 | AD29 | ED2A | 2D2B | 6D2D | 2D2E | ED2F | AD32 | 2D35 | AD37 | 6D39 | 2D3A | ED3B | AD3D | ED3E | 2D3F |

Fig. 15

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | AD67 | 6D69 | 2D6A | ED6B | AD6D | ED6E | 2D6F | 6D72 | ED75 | 6D77 | AD79 | ED7A | 2D7B | 6D7D | 2D7E | ED7F |
| 41 | ADC7 | 6DC9 | 2DCA | EDCB | ADCD | EDCE | 2DCF | 6DD2 | EDD5 | 6DD7 | ADD9 | EDDA | 2DDB | 6DDD | 2DDE | EDDF |
| 42 | 6E47 | AE49 | EE4A | 2E4B | 6E4D | 2E4E | EE4F | AE52 | 2E55 | AE57 | 6E59 | 2E5A | EE5B | AE5D | EE5E | 2E5F |
| 43 | AEA7 | 6EA9 | 2EAA | EEAB | AEAD | EEAE | 2EAF | 6EB2 | EEB5 | 6EB7 | AEB9 | EEBA | 2EBB | 6EBD | 2EBE | EEBF |
| 44 | 6EE7 | AEE9 | EEEA | 2EEB | 6EED | 2EEE | EEEF | AEF2 | 2EF5 | AEF7 | 6EF9 | 2EFA | EEFB | AEFD | EEFE | 2EFF |
| 45 | AF47 | 6F49 | 2F4A | EF4B | AF4D | EF4E | 2F4F | 6F52 | EF55 | 6F57 | AF59 | EF5A | 2F5B | 6F5D | 2F5E | EF5F |
| 46 | 6FA7 | AFA9 | EFAA | 2FAB | 6FAD | 2FAE | EFAF | AFB2 | 2FB5 | AFB7 | 6FB9 | 2FBA | EFBB | AFBD | EFBE | 2FBF |
| 47 | AFE7 | 6FE9 | 2FEA | EFEB | AFED | EFEE | 2FEF | 6FF2 | EFF5 | 6FF7 | AFF9 | EFFA | 2FFB | 6FFD | 2FFE | EFFF |
| 48 | B227 | 7229 | 322A | F22B | B22D | F22E | 322F | 7232 | F235 | 7237 | B239 | F23A | 323B | 723D | 323E | F23F |
| 49 | 7267 | B269 | F26A | 326B | 726D | 326E | F26F | B272 | 3275 | B277 | 7279 | 327A | F27B | B27D | F27E | 327F |
| 4A | 72C7 | B2C9 | F2CA | 32CB | 72CD | 32CE | F2CF | B2D2 | 32D5 | B2D7 | 72D9 | 32DA | F2DB | B2DD | F2DE | 32DF |
| 4B | B447 | 7449 | 344A | F44B | B44D | F44E | 344F | 7452 | F455 | 7457 | B459 | F45A | 345B | 745D | 345E | F45F |
| 4C | 74A7 | B4A9 | F4AA | 34AB | 74AD | 34AE | F4AF | B4B2 | 34B5 | B4B7 | 74B9 | 34BA | F4BB | B4BD | F4BE | 34BF |
| 4D | B4E7 | 74E9 | 34EA | F4EB | B4ED | F4EE | 34EF | 74F2 | F4F5 | 74F7 | B4F9 | F4FA | 34FB | 74FD | 34FE | F4FF |
| 4E | 7547 | B549 | F54A | 354B | 754D | 354E | F54F | B552 | 3555 | B557 | 7559 | 355A | F55B | B55D | F55E | 355F |
| 4F | B5A7 | 75A9 | 35AA | F5AB | B5AD | F5AE | 35AF | 75B2 | F5B5 | 75B7 | B5B9 | F5BA | 35BB | 75BD | 35BE | F5BF |

Fig. 16

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | 75E7 | B5E9 | F5EA | 35EB | 75ED | 35EE | F5EF | B5F2 | 35F5 | B5F7 | 75F9 | 35FA | F5FB | B5FD | F5FE | 35FF |
| 51 | B727 | 7729 | 372A | F72B | B72D | F72E | 372F | 7732 | F735 | 7737 | B739 | F73A | 373B | 773D | 373E | F73F |
| 52 | 7767 | B769 | F76A | 376B | 776D | 376E | F76F | B772 | 3775 | B777 | 7779 | 377A | F77B | B77D | F77E | 377F |
| 53 | 77C7 | B7C9 | F7CA | 37CB | 77CD | 37CE | F7CF | B7D2 | 37D5 | B7D7 | 77D9 | 37DA | F7DB | B7DD | F7DE | 37DF |
| 54 | 7927 | B929 | F92A | 392B | 792D | 392E | F92F | B932 | 3935 | B937 | 7939 | 393A | F93B | B93D | F93E | 393F |
| 55 | B967 | 7969 | 396A | F96B | B96D | F96E | 396F | 7972 | F975 | 7977 | B979 | F97A | 397B | 797D | 397E | F97F |
| 56 | B9C7 | 79C9 | 39CA | F9CB | B9CD | F9CE | 39CF | 79D2 | F9D5 | 79D7 | B9D9 | F9DA | 39DB | 79DD | 39DE | F9DF |
| 57 | 7A47 | BA49 | FA4A | 3A4B | 7A4D | 3A4E | FA4F | BA52 | 3A55 | BA57 | 7A59 | 3A5A | FA5B | BA5D | FA5E | 3A5F |
| 58 | BAA7 | 7AA9 | 3AAA | FAAB | BAAD | FAAE | 3AAF | 7AB2 | FAB5 | 7AB7 | BAB9 | FABA | 3ABB | 7ABD | 3ABE | FABF |
| 59 | 7AE7 | BAE9 | FAEA | 3AEB | 7AED | 3AEE | FAEF | BAF2 | 3AF5 | BAF7 | 7AF9 | 3AFA | FAFB | BAFD | FAFE | 3AFF |
| 5A | BB47 | 7B49 | 3B4A | FB4B | BB4D | FB4E | 3B4F | 7B52 | FB55 | 7B57 | BB59 | FB5A | 3B5B | 7B5D | 3B5E | FB5F |
| 5B | 7BA7 | BBA9 | FBAA | 3BAB | 7BAD | 3BAE | FBAF | BBB2 | 3BB5 | BBB7 | 7BB9 | 3BBA | FBBB | BBBD | FBBE | 3BBF |
| 5C | BBE7 | 7BE9 | 3BEA | FBEB | BBED | FBEE | 3BEF | 7BF2 | FBF5 | 7BF7 | BBF9 | FBFA | 3BFB | 7BFD | 3BFE | FBFF |
| 5D | BD27 | 7D29 | 3D2A | FD2B | BD2D | FD2E | 3D2F | 7D32 | FD35 | 7D37 | BD39 | FD3A | 3D3B | 7D3D | 3D3E | FD3F |
| 5E | 7D67 | BD69 | FD6A | 3D6B | 7D6D | 3D6E | FD6F | BD72 | 3D75 | BD77 | 7D79 | 3D7A | FD7B | BD7D | FD7E | 3D7F |
| 5F | 7DC7 | BDC9 | FDCA | 3DCB | 7DCD | 3DCE | FDCF | BDD2 | 3DD5 | BDD7 | 7DD9 | 3DDA | FDDB | BDDD | FDDE | 3DDF |

Fig. 17

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | BE47 | 7E49 | 3E4A | FE4B | BE4D | FE4E | 3E4F | 7E52 | FE55 | 7E57 | BE59 | FE5A | 3E5B | 7E5D | 3E5E | FE5F |
| 61 | 7EA7 | BEA9 | FEAA | 3EAB | 7EAD | 3EAE | FEAF | BEB2 | 3EB5 | BEB7 | 7EB9 | 3EBA | FEBB | BEBD | FEBE | 3EBF |
| 62 | BEE7 | 7EE9 | 3EEA | FEEB | BEED | FEEE | 3EEF | 7EF2 | FEF5 | 7EF7 | BEF9 | FEFA | 3EFB | 7EFD | 3EFE | FEFF |
| 63 | 7F47 | BF49 | FF4A | 3F4B | 7F4D | 3F4E | FF4F | BF52 | 3F55 | BF57 | 7F59 | 3F5A | FF5B | BF5D | FF5E | 3F5F |
| 64 | BFA7 | 7FA9 | 3FAA | FFAB | BFAD | FFAE | 3FAF | 7FB2 | FFB5 | 7FB7 | BFB9 | FFBA | 3FBB | 7FBD | 3FBE | FFBF |
| 65 | 7FE7 | BFE9 | FFEA | 3FEB | 7FED | 3FEE | FFEF | BFF2 | 3FF5 | BFF7 | 7FF9 | 3FFA | FFFB | BFFD | FFFE | 3FFF |
| 66 | 4A87 | 8A89 | CA8A | 0A8B | 4A8D | 0A8E | CA8F | 8A92 | 0A95 | 8A97 | 4A99 | 0A9A | CA9B | 8A9D | CA9E | 0A9F |
| 67 | 4F87 | 8F89 | CF8A | 0F8B | 4F8D | 0F8E | CF8F | 8F92 | 0F95 | 8F97 | 4F99 | 0F9A | CF9B | 8F9D | CF9E | 0F9F |
| 68 | 9087 | 5089 | 108A | D08B | 908D | D08E | 108F | 5092 | D095 | 5097 | 9099 | D09A | 109B | 509D | 109E | D09F |
| 69 | 5487 | 9489 | D48A | 148B | 548D | 148E | D48F | 9492 | 1495 | 9497 | 5499 | 149A | D49B | 949D | D49E | 149F |
| 6A | 5B87 | 9B89 | DB8A | 1B8B | 5B8D | 1B8E | DB8F | 9B92 | 1B95 | 9B97 | 5B99 | 1B9A | DB9B | 9B9D | DB9E | 1B9F |
| 6B | 5E87 | 9E89 | DE8A | 1E8B | 5E8D | 1E8E | DE8F | 9E92 | 1E95 | 9E97 | 5E99 | 1E9A | DE9B | 9E9D | DE9E | 1E9F |
| 6C | A387 | 6389 | 238A | E38B | A38D | E38E | 238F | 6392 | E395 | 6397 | A399 | E39A | 239B | 639D | 239E | E39F |
| 6D | A687 | 6689 | 268A | E68B | A68D | E68E | 268F | 6692 | E695 | 6697 | A699 | E69A | 269B | 669D | 269E | E69F |
| 6E | 6887 | A889 | E88A | 288B | 688D | 288E | E88F | A892 | 2895 | A897 | 6899 | 289A | E89B | A89D | E89E | 289F |
| 6F | AC87 | 6C89 | 2C8A | EC8B | AC8D | EC8E | 2C8F | 6C92 | EC95 | 6C97 | AC99 | EC9A | 2C9B | 6C9D | 2C9E | EC9F |

Fig. 18

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 7387 | B389 | F38A | 338B | 738D | 338E | F38F | B392 | 3395 | B397 | 7399 | 339A | F39B | B39D | F39E | 339F |
| 71 | 7687 | B689 | F68A | 368B | 768D | 368E | F68F | B692 | 3695 | B697 | 7699 | 369A | F69B | B69D | F69E | 369F |
| 72 | B887 | 7889 | 388A | F88B | B88D | F88E | 388F | 7892 | F895 | 7897 | B899 | F89A | 389B | 789D | 389E | F89F |
| 73 | 7C87 | BC89 | FC8A | 3C8B | 7C8D | 3C8E | FC8F | BC92 | 3C95 | BC97 | 7C99 | 3C9A | FC9B | BC9D | FC9E | 3C9F |
| 74 | 0927 | C869 | 892A | 486B | 092D | 486E | 892F | C872 | 4875 | C877 | 0939 | 487A | 893B | C87D | 893E | 487F |
| 75 | 0AE7 | 0889 | 8AEA | 888B | 0AED | 888E | 8AEF | 0892 | 8895 | 0897 | 0AF9 | 889A | 8AFB | 089D | 8AFE | 889F |
| 76 | 0BA7 | C8C9 | 8BAA | 48CB | 0BAD | 48CE | 8BAF | C8D2 | 48D5 | C8D7 | 0BB9 | 48DA | 8BBB | C8DD | 8BBE | 48DF |
| 77 | 0D67 | 0969 | 8D6A | 896B | 0D6D | 896E | 8D6F | 0972 | 8975 | 0977 | 0D79 | 897A | 8D7B | 097D | 8D7E | 897F |
| 78 | 0EA7 | C989 | 8EAA | 498B | 0EAD | 498E | 8EAF | C992 | 4995 | C997 | 0EB9 | 499A | 8EDB | C99D | 8EBE | 499F |
| 79 | 0FE7 | 09C9 | 8FEA | 89CB | 0FED | 89CE | 8FEF | 09D2 | 89D5 | 09D7 | 0FF9 | 89DA | 8FFB | 09DD | 8FFE | 89DF |
| 7A | D0E7 | 0AA9 | 50EA | 8AAB | D0ED | 8AAE | 50EF | 0AB2 | 8AB5 | 0AB7 | D0F9 | 8ABA | 50FB | 0ABD | 50FE | 8ABF |
| 7B | D1A7 | CB09 | 51AA | 4B0B | D1AD | 4B0E | 51AF | CB12 | 4B15 | CB17 | D1B9 | 4B1A | 51BB | CB1D | 51BE | 4B1F |
| 7C | 1227 | 0B49 | 922A | 8B4B | 122D | 8B4E | 922F | 0B52 | 8B55 | 0B57 | 1239 | 8B5A | 923B | 0B5D | 923E | 8B5F |
| 7D | D327 | 0BE9 | 532A | 8BEB | D32D | 8BEE | 532F | 0BF2 | 8BF5 | 0BF7 | D339 | 8BFA | 533B | 0BFD | 533E | 8BFF |
| 7E | 14E7 | 0D29 | 94EA | 8D2B | 14ED | 8D2E | 94EF | 0D32 | 8D35 | 0D37 | 14F9 | 8D3A | 94FB | 0D3D | 94FE | 9D3F |
| 7F | 15A7 | 0E49 | 95AA | 8E4B | 15AD | 8E4E | 95AF | 0E52 | 8E55 | 0E57 | 15B9 | 8E5A | 95BB | 0E5D | 95BE | 8E5F |

Fig. 19

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | D627 | 0EE9 | 562A | 8EEB | D62D | 82EE | 562F | 0EF2 | 8EF5 | 0EF7 | D639 | 8EFA | 563B | 0EFD | 563E | 82FF |
| 81 | 1727 | 0FA9 | 972A | 8FAB | 172D | 8FAE | 972F | 0FB2 | 8FB5 | 0FB7 | 1739 | 8FBA | 973B | 0FBD | 973E | 8FBF |
| 82 | 1967 | D0A9 | 996A | 50AB | 196D | 50AE | 996F | D0B2 | 50B5 | D0B7 | 1979 | 50BA | 997B | D0BD | 997E | 50BF |
| 83 | 1AA7 | 1109 | 9AAA | 910B | 1AAD | 910E | 9AAF | 1112 | 9115 | 1117 | 1AB9 | 911A | 9ABB | 111D | 9ABE | 911F |
| 84 | 1BE7 | D149 | 9BEA | 514B | 1BED | 514E | 9BEF | D152 | 5155 | D157 | 1BF9 | 515A | 9BFB | D15D | 9BFE | 515F |
| 85 | DC27 | D1E9 | 5C2A | 51EB | DC2D | 51EE | 5C2F | D1F2 | 51F5 | D1F7 | DC39 | 51FA | 5C3B | D1FD | 5C3E | 51FF |
| 86 | 1D27 | 1269 | 9D2A | 926B | 1D2D | 926E | 9D2F | 1272 | 9275 | 1277 | 1D39 | 927A | 9D3B | 127D | 9D3E | 927F |
| 87 | 1EE7 | D289 | 9EEA | 528B | 1EED | 528E | 9EEF | D292 | 5295 | D297 | 1EF9 | 529A | 9EFB | D29D | 9EFE | 529F |
| 88 | 1FA7 | 12C9 | 9FAA | 92CB | 1FAD | 92CE | 9FAF | 12D2 | 92D5 | 12D7 | 1FB9 | 92DA | 9FBB | 12DD | 9FBE | 92DF |
| 89 | E167 | D369 | 616A | 536B | E16D | 536E | 616F | D372 | 5375 | D377 | E179 | 537A | 617B | D37D | 617E | 537F |
| 8A | E2A7 | 1389 | 62AA | 938B | E2AD | 938E | 62AF | 1392 | 9395 | 1397 | E2B9 | 939A | 62BB | 139D | 62BE | 939F |
| 8B | E3E7 | D3C9 | 63EA | 53CB | E3ED | 53CE | 63EF | D3D2 | 53D5 | D3D7 | E3F9 | 53DA | 63FB | D3DD | 63FE | 53DF |
| 8C | 2427 | 14A9 | A42A | 94AB | 242D | 94AE | A42F | 14B2 | 94B5 | 14B7 | 2439 | 94BA | A43B | 14BD | A43E | 94BF |
| 8D | E527 | D509 | 652A | 550B | E52D | 550E | 652F | D512 | 5515 | D517 | E539 | 551A | 653B | D51D | 653E | 551F |
| 8E | E6E7 | 1549 | 66EA | 954B | E6ED | 954E | 66EF | 1552 | 9555 | 1557 | E6F9 | 955A | 66FB | 155D | 66FE | 955F |
| 8F | E7A7 | 15E9 | 67AA | 95EB | E7AD | 95EE | 67AF | 15F2 | 95F5 | 15F7 | E7B9 | 95FA | 67BB | 15FD | 67BE | 95FF |

Fig. 20

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 28E7 | D669 | A8EA | 566B | 28ED | 566E | A8EF | D672 | 5675 | D677 | 28F9 | 567A | A8FB | D67D | A8FE | 567F |
| 91 | 29A7 | 1689 | A9AA | 968B | 29AD | 968E | A9AF | 1692 | 9695 | 1697 | 29B9 | 969A | A9BB | 169D | A9BE | 969F |
| 92 | EA27 | D6C9 | 6A2A | 56CB | EA2D | 56CE | 6A2F | D6D2 | 56D5 | D6D7 | EA39 | 56DA | 6A3B | D6DD | 6A3E | 56DF |
| 93 | 2B27 | 1769 | AB2A | 976B | 2B2D | 976E | AB2F | 1772 | 9775 | 1777 | 2B39 | 977A | AB3B | 177D | AB3E | 977F |
| 94 | ECE7 | D789 | 6CEA | 578B | ECED | 578E | 6CEF | D792 | 5795 | D797 | ECF9 | 579A | 6CFB | D79D | 6CFE | 579F |
| 95 | EDA7 | 17C9 | 6DAA | 97CB | EDAD | 97CE | 6DAF | 17D2 | 97D5 | 17D7 | EDB9 | 97DA | 6DBB | 17DD | 6DBE | 97DF |
| 96 | 2E27 | 1929 | AE2A | 992B | 2E2D | 992E | AE2F | 1932 | 9935 | 1937 | 2E39 | 993A | AE3B | 193D | AE3E | 993F |
| 97 | EF27 | 1A49 | 6F2A | 9A4B | EF2D | 9A4E | 6F2F | 1A52 | 9A55 | 1A57 | EF39 | 9A5A | 6F3B | 1A5D | 6F3E | 9A5F |
| 98 | 3167 | 1AE9 | B16A | 9AEB | 316D | 9AEE | B16F | 1AF2 | 9AF5 | 1AF7 | 3179 | 9AFA | B17B | 1AFD | B17E | 9AFF |
| 99 | 32A7 | 1BA9 | B2AA | 9BAB | 32AD | 9BAE | B2AF | 1BB2 | 9BB5 | 1BB7 | 32B9 | 9BBA | B2BB | 1BBD | B2BE | 9BBF |
| 9A | 33E7 | DC69 | B3EA | 5C6B | 33ED | 5C6E | B3EF | DC72 | 5C75 | DC77 | 33F9 | 5C7A | B3FB | DC7D | B3FE | 5C7F |
| 9B | F427 | 1C89 | 742A | 9C8B | F42D | 9C8E | 742F | 1C92 | 9C95 | 1C97 | F439 | 9C9A | 743B | 1C9D | 743E | 9C9F |
| 9C | 3527 | DCC9 | B52A | 5CCB | 352D | 5CCE | B52F | DCD2 | 5CD5 | DCD7 | 3539 | 5CDA | B53B | DCDD | B53E | 5CDF |
| 9D | 36E7 | 1D69 | B6EA | 9D6B | 36ED | 9D6E | B6EF | 1D72 | 9D75 | 1D77 | 36F9 | 9D7A | B6FB | 1D7D | B6FE | 9D7F |
| 9E | 37A7 | DD89 | B7AA | 5D8B | 37AD | 5D8E | B7AF | DD92 | 5D95 | DD97 | 37B9 | 5D9A | B7BB | DD9D | B7BE | 5D9F |
| 9F | F8E7 | 1DC9 | 78EA | 9DCB | F8ED | 9DCE | 78EF | 1DD2 | 9DD5 | 1DD7 | F8F9 | 9DDA | 78FB | 1DDD | 78FE | 9DDF |

Fig. 21

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | F9A7 | 1EA9 | 79AA | 9EAB | F9AD | 9EAE | 79AF | 1EB2 | 9EB5 | 1EB7 | F9B9 | 9EBA | 79BB | 1EBD | 79BE | 9EBF |
| A1 | 3A27 | DF09 | BA2A | 5F0B | 3A2D | 5F0E | BA2F | DF12 | 5F15 | DF17 | 3A39 | 5F1A | BA3B | DF1D | BA3E | 5F1F |
| A2 | FB27 | 1F49 | 7B2A | 9F4B | FB2D | 9F4E | 7B2F | 1F52 | 9F55 | 1F57 | FB39 | 9F5A | 7B3B | 1F5D | 7B3E | 9F5F |
| A3 | 3CE7 | 1FE9 | BC2A | 9FEB | 3CED | 9FEE | BC2F | 1FF2 | 9FF5 | 1FF7 | 3CF9 | 9FFA | BCFB | 1FFD | BCFE | 9FFF |
| A4 | 3DA7 | E129 | BDAA | 612B | 3DAD | 612E | BDAF | E132 | 6135 | E137 | 3DB9 | 613A | BDBB | E13D | BDBE | 613F |
| A5 | FE27 | E249 | 7E2A | 624B | FE2D | 624E | 7E2F | E252 | 6255 | E257 | FE39 | 625A | 7E3B | E25D | 7E3E | 625F |
| A6 | 3F27 | E2E9 | BF2A | 62EB | 3F2D | 62EE | BF2F | E2F2 | 62F5 | E2F7 | 3F39 | 62FA | BF3B | E2FD | BF3E | 62FF |
| A7 | 0A47 | E3A9 | 1A4A | 63AB | 0A4D | 63AE | 8A4F | E3B2 | 63B5 | E3B7 | 0A59 | 63BA | 8A5B | E3BD | 8A5E | 63BF |
| A8 | 0DC7 | 2469 | 8DCA | A46B | 0DCD | A46E | 8DCF | 2472 | A475 | 2477 | 0DD9 | A47A | 8DDB | 247D | 8DDE | A47F |
| A9 | 0F47 | E489 | 8F4A | 648B | 0F4D | 648E | 8F4F | E492 | 6495 | E497 | 0F59 | 649A | 8F5B | E49D | 8F5E | 649F |
| AA | 1447 | 24C9 | 944A | A4CB | 144D | A4CE | 944F | 24D2 | A4D5 | 24D7 | 1459 | A4DA | 945B | 24DD | 945E | A4DF |
| AB | 19C7 | E569 | 99CA | 656B | 19CD | 656E | 99CF | E572 | 6575 | E577 | 19D9 | 657A | 99DB | E57D | 99DE | 657F |
| AC | 1B47 | 2589 | 9B4A | A58B | 1B4D | A58E | 9B4F | 2592 | A595 | 2597 | 1B59 | A59A | 9B5B | 259D | 9B5E | A59F |
| AD | 1E47 | E5C9 | 9E4A | 65CB | 1E4D | 65CE | 9E4F | E5D2 | 65D5 | E5D7 | 1E59 | 65DA | 9E5B | E5DD | 9E5E | 65DF |
| AE | E1C7 | E6A9 | 61CA | 66AB | E1CD | 66AE | 61CF | E6B2 | 66B5 | E6B7 | E1D9 | 66BA | 61DB | E6BD | 61DE | 66BF |
| AF | E347 | 2709 | 634A | A70B | E34D | A70E | 634F | 2712 | A715 | 2717 | E359 | A71A | 635B | 271D | 635E | A71F |

Fig. 22

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | E647 | E749 | 664A | 674B | E64D | 674E | 664F | E752 | 6755 | E757 | E659 | 675A | 665B | E75D | 665E | 675F |
| B1 | 2847 | E7E9 | A84A | 67EB | 284D | 67EE | A84F | E7F2 | 67F5 | E7F7 | 2859 | 67FA | A85B | E7FD | A85E | 67FF |
| B2 | EC47 | 28A9 | 6C4A | A8AB | EC4D | A8AE | 6C4F | 28B2 | A8B5 | 21B7 | EC59 | A8BA | 6C5B | 28BD | 6C5E | A8BF |
| B3 | 31C7 | E909 | B1CA | 690B | 31CD | 690E | B1CF | E912 | 6915 | E917 | 31D9 | 691A | B1DB | E91D | B1CE | 691F |
| B4 | 3347 | 2949 | B34A | A94B | 334D | A94E | B34F | 2952 | A955 | 2957 | 3359 | A95A | B35B | 295D | B35E | A95F |
| B5 | 3647 | 29E9 | B64A | A9EB | 364D | A9EE | B64F | 29F2 | A9F5 | 29F7 | 3659 | A9FA | B65B | 29FD | B65E | A9FF |
| B6 | F847 | EA69 | 784A | 6A6B | F84D | 6A6E | 784F | EA72 | 6A75 | EA77 | F859 | 6A7A | 785B | EA7D | 785E | 6A7F |
| B7 | 3C47 | 2A89 | BC4A | AA8B | 3C4D | AA8E | BC4F | 2A92 | AA95 | 2A97 | 3C59 | AA9A | BC5B | 2A9D | BC5E | AA9F |
| B8 | 0C87 | EAC9 | 8C8A | 6ACB | 0C8D | 6ACE | 8C8F | EAD2 | 6AD5 | EAD7 | 0C99 | 6ADA | 8C9B | EADD | 8C9E | 6ADF |
| B9 | 1887 | 2B69 | 988A | AB6B | 188D | AB6E | 988F | 2B72 | AB75 | 2B77 | 1899 | AB7A | 989B | 2B7D | 989E | AB7F |
| BA | 3087 | EB89 | B08A | 6B8B | 308D | 6B8E | B08F | EB92 | 6B95 | EB97 | 3099 | 6B9A | B09B | EB9D | B09E | 6B9F |
| BB | 4921 | 2BC9 | C923 | ABCB | 8925 | ABCE | C926 | 2BD2 | ABD5 | 2BD7 | 0911 | ABDA | 8913 | 2BDD | 8916 | ABDF |
| BC | 4AE1 | ECA9 | CAE3 | 6CAB | 8AE5 | 6CAE | CAE6 | ECB2 | 6CB5 | ECB7 | 0A71 | 6CBA | 8A73 | ECBD | 8A76 | 6CBF |
| BD | 4BA1 | 2D09 | CBA3 | AD0B | 8BA5 | AD0E | CBA6 | 2D12 | AD15 | 2D17 | 0AD1 | AD1A | 8AD3 | 2D1D | 8AD6 | AD1F |
| BE | 4D61 | ED49 | CD63 | 6D4B | 8D65 | 6D4E | CD66 | ED52 | 6D55 | ED57 | 0B91 | 6D5A | 8B93 | ED5D | 8B96 | 6D5F |
| BF | 4EA1 | EDE9 | CEA3 | 6DEB | 8EA5 | 6DEE | CEA6 | EDF2 | 6DF5 | EDF7 | 0CB1 | 6DFA | 8CB3 | EDFD | 8CB6 | 6DFF |

Fig. 23

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | 4FE1 | 2E69 | CFE3 | AE6B | 8FE5 | AE6E | CFE6 | 2E72 | AE75 | 2E77 | 0D51 | AE7A | 8D73 | 2E7D | 8D76 | AE7F |
| C1 | 90E1 | EE89 | 10E3 | 6E8B | 50E5 | 6E8E | 10E6 | EE92 | 6E95 | EE97 | 0DF1 | 6E9A | 8D93 | EE9D | 8D96 | 6E9F |
| C2 | 91A1 | 2EC9 | 11A3 | AECB | 51A5 | AECE | 11A6 | 2ED2 | AED5 | 2ED7 | 0E91 | AEDA | 8ED3 | 2EDD | 8ED6 | AEDF |
| C3 | 5221 | EF69 | D223 | 6F6B | 9225 | 6F6E | D226 | EF72 | 6F75 | EF77 | 0F71 | 6F7A | 8F73 | EF7D | 8F76 | 6F7F |
| C4 | 9321 | 2F89 | 1323 | AF8B | 5325 | AF8E | 1326 | 2F92 | AF95 | 2F97 | 0FD1 | AF9A | 8F93 | 2F9D | 8F96 | AF9F |
| C5 | 54E1 | EFC9 | D4E3 | 6FCB | 94E5 | 6FCE | D4E6 | EFD2 | 6FD5 | EFD7 | D0D1 | 6FDA | 50D3 | EFDD | 50D6 | 6FDF |
| C6 | 55A1 | 3129 | D5A3 | B12B | 95A5 | B12E | D5A6 | 3132 | B135 | 3137 | D191 | B13A | 5133 | 313D | 5136 | B13F |
| C7 | 9621 | 3249 | 1623 | B24B | 5625 | B24E | 1626 | 3252 | B255 | 3257 | 1211 | B25A | 9253 | 325D | 9256 | B25F |
| C8 | 5721 | 32E9 | D723 | B2EB | 9725 | B2EE | D726 | 32F2 | B2F5 | 32F7 | D311 | B2FA | 53F3 | 32FD | 53F6 | B2FF |
| C9 | 5961 | 33A9 | D963 | B3AB | 9965 | B3AE | D966 | 33B2 | B3B5 | 33B7 | 1471 | B3BA | 94B3 | 33BD | 94B6 | B3BF |
| CA | 5AA1 | F469 | DAA3 | 746B | 9AA5 | 746E | DAA6 | F472 | 7475 | F477 | 14D1 | 747A | 9473 | F47D | 9476 | 747F |
| CB | 5BE1 | 3489 | DBE3 | B48B | 9BE5 | B48E | DBE6 | 3492 | B495 | 3497 | 1591 | B49A | 9593 | 349D | 9596 | B49F |
| CC | 9C21 | F4C9 | 1C23 | 74CB | 5C25 | 74CE | 1C26 | F4D2 | 74D5 | F4D7 | D611 | 74DA | 56D3 | F4DD | 56D6 | 74DF |
| CD | 5D21 | 3569 | DD23 | B56B | 9D25 | B56E | DD26 | 3572 | B575 | 3577 | 1711 | B57A | 9773 | 357D | 9776 | B57F |
| CE | 5EE1 | F589 | DEE3 | 758B | 9EE5 | 758E | DEE6 | F592 | 7595 | F597 | 18B1 | 759A | 9893 | F59D | 9896 | 759F |
| CF | 5FA1 | 35C9 | DFA3 | B5CB | 9FA5 | B5CE | DFA6 | 35D2 | B5D5 | 35D7 | 1951 | B5DA | 99D3 | 35DD | 99D6 | B5DF |

Fig. 24

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | A161 | 36A9 | 2163 | B6AB | 6165 | B6AE | 2166 | 36B2 | B6B5 | 36B7 | 19F1 | B6BA | 99F3 | 36BD | 99F6 | B6BF |
| D1 | A2A1 | F709 | 22A3 | 770B | 62A5 | 770E | 22A6 | F712 | 7715 | F717 | 1A91 | 771A | 9A93 | F71D | 9A96 | 771F |
| D2 | A3E1 | 3749 | 23E3 | B74B | 63E5 | B74E | 23E6 | 3752 | B755 | 3757 | 1B71 | B75A | 9B73 | 375D | 9B76 | B75F |
| D3 | 6421 | 37E9 | E423 | B7EB | A425 | B7EE | E426 | 37F2 | B7F5 | 37F7 | 1BD1 | B7FA | 9BD3 | 37FD | 9BD6 | B7FF |
| D4 | A521 | F8A9 | 2523 | 78AB | 6525 | 78AE | 2526 | F8B2 | 78B5 | F8B7 | 1D11 | 78BA | 9D13 | F8BD | 9D16 | 78BF |
| D5 | A6E1 | 3909 | 26E3 | B90B | 66E5 | B90E | 26E6 | 3912 | B915 | 3917 | 1E71 | B91A | 9E73 | 391D | 9E76 | B91F |
| D6 | A7A1 | F949 | 27A3 | 794B | 67A5 | 794E | 27A6 | F952 | 7955 | F957 | 1ED1 | 795A | 9ED3 | F95D | 9ED6 | 795F |
| D7 | 68E1 | F9E9 | E8E3 | 79EB | A8E5 | 79EE | E8E6 | F9F2 | 79F5 | F9F7 | 1F91 | 79FA | 9F93 | F9FD | 9F96 | 79FF |
| D8 | 69A1 | 3A69 | E9A3 | BA6B | A9A5 | BA6E | E9A6 | 3A72 | BA75 | 3A77 | E151 | BA7A | 6153 | 3A7D | 6156 | BA7F |
| D9 | AA21 | FA89 | 2A23 | 7A8B | 6A25 | 7A8E | 2A26 | FA92 | 7A95 | FA97 | E1F1 | 7A9A | 61F3 | FA9D | 61F6 | 7A9F |
| DA | 6B21 | 3AC9 | EB23 | BACB | AB25 | BACE | EB26 | 3AD2 | BAD5 | 3AD7 | E291 | BADA | 6293 | 3ADD | 6296 | BADF |
| DB | ACE1 | FB69 | 2CE3 | 7B6B | 6CE5 | 7B6E | 2CE6 | FB72 | 7B75 | FB77 | E371 | 7B7A | 6373 | FB7D | 6376 | 7B7F |
| DC | ADA1 | 3B89 | 2DA3 | BB8B | 6DA5 | BB8E | 2DA6 | 3B92 | BB95 | 3B97 | E3D1 | BB9A | 63D3 | 3B9D | 63D6 | BB9F |
| DD | 6EE1 | FBC9 | EEE3 | 7BCB | AEE5 | 7BCE | EEE6 | FBD2 | 7BD5 | FBD7 | E511 | 7BDA | 6513 | FBDD | 6516 | 7BDF |
| DE | AFE1 | 3CA9 | 2FE3 | BCAB | 6FE5 | BCAE | 2FE6 | 3CB2 | BCB5 | 3CB7 | E671 | BCBA | 6673 | 3CBD | 6676 | BCBF |
| DF | 7161 | FD09 | F163 | 7D0B | B165 | 7D0E | F166 | FD12 | 7D15 | FD17 | E6D1 | 7D1A | 66D3 | FD1D | 66D6 | 7D1F |

Fig. 25

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | 72A1 | 3D49 | F2A3 | BD4B | B2A5 | BD4E | F2A6 | 3D52 | BD55 | 3D57 | E791 | BD5A | 6793 | 3D5D | 6796 | BD5F |
| E1 | 73E1 | 3DE9 | F3E3 | BDEB | B3E5 | BDEE | F3E6 | 3DF2 | BDF5 | 3DF7 | 2871 | BDFA | A873 | 3DFD | A876 | BDFF |
| E2 | B421 | FE69 | 3423 | 7E6B | 7425 | 7E6E | 3426 | FE72 | 7E75 | FE77 | 28D1 | 7E7A | A8D3 | FE7D | A8D6 | 7E7F |
| E3 | 7521 | 3E89 | F523 | BE8B | B525 | BE8E | F526 | 3E92 | BE95 | 3E97 | 2991 | BE9A | A993 | 3E9D | A996 | BE9F |
| E4 | 76E1 | FEC9 | F6E3 | 7ECB | B6E5 | 7ECE | F6E6 | FED2 | 7ED5 | FED7 | EA11 | 7EDA | 6A13 | FEDD | 6A16 | 7EDF |
| E5 | 77A1 | 3F69 | F7A3 | BF6B | B7A5 | BF6E | F7A6 | 3F72 | BF75 | 3F77 | 2B11 | BF7A | AB13 | 3F7D | AB16 | BF7F |
| E6 | B8E1 | FF89 | 38E3 | 7F8B | 78E5 | 7F8E | 38E6 | FF92 | 7F95 | FF97 | EC71 | 7F9A | 6C73 | FF9D | 6C76 | 7F9F |
| E7 | B9A1 | 3FC9 | 39A3 | BFCB | 79A5 | BFCE | 39A6 | 3FD2 | BFD5 | 3FD7 | ECD1 | BFDA | 6CD3 | 3FDD | 6CD6 | BFDF |
| E8 | 7A21 | 90B1 | FA23 | 10B3 | BA25 | 10B6 | FA26 | A131 | 2133 | 2136 | ED91 | 7131 | 6D93 | F133 | 6D96 | F13F |
| E9 | BB21 | 5111 | 3B23 | D113 | 7B25 | D116 | 3B26 | A251 | 2253 | 2256 | 2E11 | 7251 | AE13 | F253 | AE16 | F25F |
| EA | 7CE1 | 9151 | FCE3 | 1153 | BCE5 | 1156 | FCE6 | A2F1 | 22F3 | 22F6 | EF11 | 72F1 | 6F13 | F2F3 | 6F16 | F2FF |
| EB | 7DA1 | 91F1 | FDA3 | 11F3 | BDA5 | 11F6 | FDA6 | A3B1 | 23B3 | 23B6 | 30B1 | 73B1 | B0B3 | F3B3 | B0B6 | F3BF |
| EC | BE21 | 5271 | 3E23 | D273 | 7E25 | D276 | 3E26 | 6471 | E473 | E476 | 3151 | B471 | B153 | 3473 | B156 | 347F |
| ED | 7F21 | 9291 | FF23 | 1293 | BF25 | 1296 | FF26 | A491 | 2493 | 2496 | 31F1 | 7491 | B1F3 | F493 | B1F6 | F49F |
| EE | 0A21 | 52D1 | 8A23 | D2D3 | BA45 | D2D6 | 8A26 | 64D1 | E4D3 | E4D6 | 3291 | B4D1 | B293 | 34D3 | B296 | 34DF |
| EF | 0CE1 | 9371 | 8CE3 | 1373 | BDC5 | 1376 | 8CE6 | A571 | 2573 | 2576 | 3371 | 7571 | B373 | F573 | B376 | F57F |

Fig. 26

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | 1DA1 | 5391 | 8DA3 | D393 | 8F45 | D396 | 8DA6 | 6591 | E593 | E596 | 33D1 | B591 | B3D3 | 3593 | B3D6 | 3596 |
| F1 | 1F21 | 93D1 | 8F23 | 13D3 | 9445 | 13D6 | 8F26 | A5D1 | 25D3 | 25D6 | 3511 | 75D1 | B513 | F5D3 | B516 | F5D6 |
| F2 | 1421 | 54B1 | 9423 | D4B3 | 98C5 | D4B6 | 9426 | A6B1 | 26B3 | 26B6 | 3671 | 76B1 | B673 | F6B3 | B676 | F6B6 |
| F3 | 18E1 | 9511 | 98E3 | 1513 | 9B45 | 1516 | 98E6 | 6711 | E713 | E716 | 36D1 | B711 | B6D3 | 3713 | B6D6 | 3716 |
| F4 | 19A1 | 5551 | 99A3 | D553 | 9E45 | D556 | 99A6 | A751 | 2753 | 2756 | 3791 | 7751 | B793 | F753 | B796 | F756 |
| F5 | 1B21 | 55F1 | 9B23 | D5F3 | 61C5 | D5F6 | 9B26 | A7F1 | 27F3 | 27F6 | F871 | 77F1 | 7873 | F7F3 | 7876 | F7F6 |
| F6 | 1E21 | 9671 | 9E23 | 1673 | 6345 | 1676 | 9E26 | 68B1 | E8B3 | E8B6 | F8D1 | B8B1 | 78D3 | 38B3 | 78D6 | 38B6 |
| F7 | E1A1 | 5691 | 61A3 | D693 | 6645 | D696 | 61A6 | A911 | 2913 | 2916 | F991 | 7911 | 7993 | F913 | 7996 | F916 |
| F8 | E321 | 96D1 | 6323 | 16D3 | A845 | 16D6 | 6326 | 6951 | E953 | E956 | 3A11 | B951 | BA13 | 3953 | BA16 | 3956 |
| F9 | E621 | 5771 | 6623 | D773 | 6C45 | D776 | 6626 | 69F1 | E9F3 | E9F6 | FB11 | B9F1 | 7B13 | 39F3 | 7B16 | 39F6 |
| FA | EC21 | 9791 | 6C23 | 1793 | B1C5 | 1796 | 6C26 | AA71 | 2A73 | 2A76 | 3C71 | 7A71 | BC73 | FA73 | BC76 | FA76 |
| FB | 30E1 | 57D1 | B0E3 | D7D3 | B345 | D7D6 | B0E6 | 6A91 | EA93 | EA96 | 3CD1 | BA91 | BCD3 | 3A93 | BCD6 | 3A96 |
| FC | 31A1 | 5931 | B1A3 | D933 | B645 | D936 | B1A6 | AAD1 | 2AD3 | 2AD6 | 3D91 | 7AD1 | BD93 | FAD3 | BD96 | FAD6 |
| FD | 3321 | 5A51 | B323 | DA53 | 7845 | DA56 | B326 | 6B71 | EB73 | EB76 | FE11 | BB71 | 7E13 | 3B73 | 7E16 | 3B76 |
| FE | 3621 | 5AF1 | B623 | DAF3 | BC45 | DAF6 | B626 | AB91 | 2B93 | 2B96 | 3F11 | 7B91 | BF13 | FB93 | BF16 | FB96 |
| FF | 3C21 | 5BB1 | BC23 | DBB3 | 8C85 | DBB6 | BC26 | 6BD1 | EBD3 | EBD6 | 8E11 | BBD1 | 0E13 | 3BD3 | 0E16 | 3BD6 |

Fig. 33

| n2 GROUP | m2 DATA 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 1 | 07 | 09 | 0A | 0B | 0D | 0E | 0F | 12 | 15 | 17 | 19 | 1A | 1B | 1D | 1E | 1F |
| 2 | 01 | | 03 | | 05 | | 06 | | | | | | | | | |
| 3 | | | | | | | | | | | 11 | | 13 | | | 16 |
| 4 | | 11 | | 13 | | 16 | | 11 | 13 | 16 | | 11 | | 13 | 16 | |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | 4E7B | 4E7E | CEA1 | 4EA3 | 4EA6 | CEC2 | 4EC5 | CEC7 | 4ECA | CECD | 4ECF | CED9 | 4EDB | 4EDE | CEF1 | 4EF3 |
| 01 | 4EF6 | 4F43 | 4F46 | 4F85 | CF87 | 4F8A | CF8D | 4F8F | CF99 | 4F9B | 4F9E | CFB1 | 4FB3 | 4FB6 | CFE1 | 4FE3 |
| 02 | 4FE6 | D0B9 | 50BB | 50BE | D092 | 5095 | D097 | 509A | D09D | 509F | 50A9 | D0AB | D0AE | 50B2 | D0B5 | 50B7 |
| 03 | D0BA | 50BD | D0BF | 50D1 | D0D3 | D0D6 | 50E2 | D0E5 | 50E7 | D0EA | 50ED | D0EF | 50F9 | D0FB | D0FB | D011 |
| 04 | 5113 | 5116 | D122 | 5125 | D127 | 512A | D12D | 512F | D139 | 513B | 513E | 5149 | D14B | D14E | 5152 | D155 |
| 05 | 5157 | D15A | 515D | D15F | D169 | 516B | 516E | D172 | 5175 | D177 | 517A | D17D | 517F | 5191 | D193 | D196 |
| 06 | 51A2 | D1A5 | 51A7 | D1AA | 51AD | D1AF | 51B9 | D1BB | D1BE | D1C9 | 51CB | 51CE | D1D2 | 51D5 | D1D7 | 51DA |
| 07 | D1DD | 51DF | 51E9 | D1EB | D1EE | 51F2 | D1F5 | 51F7 | D1FA | 51FD | D1FF | D221 | 5223 | 5226 | D242 | 5245 |
| 08 | D247 | 524A | D24D | 524F | D259 | 525B | 525E | D271 | 5273 | 5286 | 5289 | D28B | D28E | 5292 | D295 | 5297 |
| 09 | D29A | 529D | D29F | D2A9 | 52AB | 52AE | D2B2 | 52B5 | D2B7 | 52BA | D2BD | 52BF | D2D1 | 52D3 | 52D6 | D2E2 |
| 0A | 52E5 | D2E7 | 52EA | D2ED | D2EF | D2F9 | 52FB | 52FE | 5311 | D313 | D316 | 5322 | D325 | 5327 | D32A | 532D |
| 0B | D32F | 5339 | D33B | D33E | D349 | 534B | 534E | D352 | 5355 | D357 | 535A | D35D | 535F | 5369 | D36B | D36E |
| 0C | 5372 | D375 | 5377 | D37A | 537D | D37F | D391 | 5393 | 5396 | D3A2 | 53A5 | D3A7 | 53AA | D3AD | 53AF | D3B9 |
| 0D | 53BB | 53BE | 53C9 | D3CB | D3CE | 53D2 | D3D5 | 53D7 | D3DA | 53DD | D3DF | D3E9 | 53EB | 53EE | D3F2 | 53F5 |
| 0E | D3F7 | 53FA | D3FD | 53FF | 5443 | 5446 | 5485 | D487 | 548A | D48D | 548F | D499 | 549B | 549E | D4B1 | 54B3 |
| 0F | 54BB | D4E1 | 54E3 | 54E6 | 5509 | D50B | D50E | 5512 | D515 | 5517 | D51A | 551D | D51F | D529 | 552B | 552E |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | D532 | 5535 | D537 | 553A | D53D | 553F | D551 | 5553 | 5556 | D562 | 5565 | D567 | 556A | D56D | 556F | D579 |
| 11 | 557B | 557E | D5A1 | 55A3 | 55A6 | D542 | 55C5 | D5C7 | 55CA | D5CD | 55CF | D5D9 | 55DB | 55DE | D5F1 | 55F3 |
| 12 | 55F6 | 5611 | D613 | D616 | 5622 | D625 | 5627 | D62A | 562D | D62F | 5639 | D63B | D63E | D649 | 564B | 564E |
| 13 | D652 | 5655 | D657 | 565A | D65D | 565F | 5669 | D66B | D66E | 5672 | D675 | 5677 | D67A | 567D | D67F | D691 |
| 14 | 5693 | 5696 | D6AE | 56A5 | D6A7 | 56AA | D6AD | 56AF | D6B9 | 56BB | 56BE | 56C9 | D6CB | D6CE | 56D2 | D6D5 |
| 15 | 56D7 | D6DA | 56DD | D6DF | D6E9 | 56EB | 56EE | D6F2 | 56F5 | D6F7 | 56FA | D6FD | 56FF | D621 | 5623 | 5626 |
| 16 | D742 | 5745 | D747 | 574A | D74D | 574F | D759 | 575B | 575E | D771 | 5773 | 5776 | 5789 | D78B | D78E | 5792 |
| 17 | D795 | 5797 | D79A | 579D | D79F | D7A9 | 57AB | D7AE | D7B2 | 57B5 | D7B7 | 57BA | D7BD | 57BF | D7D1 | 57D3 |
| 18 | 57D6 | D7E2 | 57E5 | D7E7 | 57EA | D7ED | 57EF | D7F9 | 57FB | 57FE | 5886 | 590A | D90D | 590F | D919 | 591B |
| 19 | 591E | D931 | 5933 | 5936 | D961 | 5963 | 5966 | 59C3 | 59C6 | 5A12 | DA15 | 5A17 | DA1A | 5A1D | DA1F | DA29 |
| 1A | 5A2B | 5A2E | DA32 | 5A35 | DA37 | 5A3A | DA3D | 5A3F | DA51 | 5A53 | 5A56 | DA62 | 5A65 | DA67 | 5A6A | DA6D |
| 1B | 5A6F | DA79 | 5A7B | 5A7E | DAA1 | 5AA3 | 5AA6 | DAC2 | 5AC5 | DAC7 | 5ACA | DACD | 5ACF | DAD9 | 5ADB | 5ADE |
| 1C | DAF1 | 5AF3 | 5AF6 | 5B43 | 5B46 | 5B85 | DB87 | 5B8A | DB8D | 5B8F | DB99 | 5B9B | 5B9E | DBB1 | 5BB3 | 5BB6 |
| 1D | DBE1 | 5BE3 | 5BE6 | 5C22 | DC25 | 5C27 | DC2A | 5C2D | DC2F | 5C39 | DC3B | DC3E | DC49 | 5C4B | 5C4E | DC52 |
| 1E | 5C55 | DC57 | 5C5A | DC5D | 5C5F | 5C69 | DC6B | DC6E | 5C72 | DC75 | 5C77 | DC7A | 5C7D | DC7F | DC91 | 5C93 |
| 1F | 5C96 | DCA2 | 5CA5 | DCA7 | 5CAA | DCAD | 5CAF | DCB9 | 5CBB | 5CBE | 5CC9 | DCCB | DCCE | 5CD2 | DCD5 | 5CD7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | DCDA | 5CDD | DCDF | DCE5 | 5CEB | 5CEE | DCF2 | 5CF5 | DCF7 | 5CFA | DCFD | 5CFF | DD21 | 5D23 | 5D26 | DD42 |
| 21 | 5D45 | DD47 | 5D4A | DD4D | 5D4F | DD59 | 5D5B | 5D5E | DD71 | 5D73 | 5D76 | 5D89 | DD8B | DD8E | 5D92 | DD95 |
| 22 | 5D97 | DD9A | 5D9D | DD9F | DDA9 | 5DAB | 5DAE | DDB2 | 5DB5 | DDB7 | 5DBA | DDBD | 5DBF | DDD1 | 5DD3 | 5DD6 |
| 23 | DDE2 | 5DE5 | DDE7 | 5DEA | DDED | 5DEF | DDF9 | 5DFB | 5DFE | 5E43 | 5E46 | 5E85 | DE87 | 5E8A | DE8D | 5E8F |
| 24 | DE99 | 5E9B | 5E9E | DED1 | 5ED3 | 5EB6 | DEE1 | 5EE3 | 5EE6 | 5F09 | DF0B | DF0E | 5F12 | DF15 | 5F17 | DF1A |
| 25 | 5F1D | DF1F | DF29 | 5F2B | 5F2E | DF32 | 5F35 | DF37 | 5F3A | DF3D | 5F3F | DF51 | 5F53 | 5F56 | DF62 | 5F65 |
| 26 | DF67 | 5F64 | DF6D | 5F6F | DF79 | 5F7D | 5F7E | DFA1 | 5FA3 | 5FA6 | DFC2 | 5FC5 | DFC7 | 5FCA | DFCD | 5FCF |
| 27 | DFD9 | 5FDB | 5FDE | DFF1 | 5FF3 | 5FF6 | 6843 | 6846 | 6885 | E887 | 688A | E88D | 688F | E899 | 689B | 689E |
| 28 | E8B1 | 68B7 | 68B6 | E8E1 | 68E3 | 68E6 | 6909 | E90B | E90E | 6912 | E915 | 6917 | E91A | 691D | E91F | E929 |
| 29 | 692B | 692E | E932 | 6935 | E937 | 693A | E93D | 693F | E951 | 6953 | 6956 | E962 | 6965 | E967 | 696A | E96D |
| 2A | 696F | E979 | 697B | 697E | E9A1 | 69A3 | 69A6 | E9C2 | 69C5 | E9C7 | 69CA | E9CD | 69CF | E9D9 | 69DB | 69DE |
| 2B | E9F1 | 69F3 | 69F6 | 6A11 | EA13 | EA16 | 6A22 | EA25 | 6A27 | EA2A | 6A2D | EA2F | 6A39 | EA3B | EA3E | EA49 |
| 2C | 6A4B | 6A4E | EA52 | 6A55 | EA57 | 6A5A | EA5D | 6A5F | 6A66 | EA6B | EA6E | 6A72 | EA75 | 6A77 | EA7A | 6A7D |
| 2D | EA7F | EA91 | 6A93 | 6A96 | EAA2 | 6AA5 | EAA7 | 6AAA | EAAD | 6AAF | EAB9 | 6ABB | 6ABE | 6AC9 | EACB | EACE |
| 2E | 6AD2 | EAD5 | 6AD7 | EADA | 6ADD | EADF | EAE9 | 6AEB | 6AEE | EAF2 | 6AF5 | EAF7 | 6AFA | EAFD | 6AFF | EB21 |
| 2F | 6B23 | 6B26 | EB42 | 6B45 | EB47 | 6B4A | EB4D | 6B4F | EB59 | 6B5B | 6B5E | EB71 | 6B73 | 6B76 | 6B89 | EB8B |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | EBBE | 6B92 | EB95 | 6B97 | 6B9A | 6B9D | EB9F | EBA9 | 6BAB | 6BAE | EBB2 | 6BB5 | EBB7 | 6BBA | EBBD | 6BBF |
| 31 | EBD1 | 6BD3 | 6BD6 | EBE2 | EBE5 | EBE7 | 6BEA | EBED | 6BEF | EBF9 | 6BFB | 6BFE | 6C21 | EC23 | EC26 | 6C42 |
| 32 | EC45 | 6C47 | EC4A | 6C4D | 6C4F | 6C59 | EC5B | EC5E | 6C71 | EC73 | EC76 | EC89 | 6C8B | 6C8E | EC92 | 6C95 |
| 33 | EC97 | 6C9A | EC9D | 6C9F | ECA9 | ECAB | ECAE | 6CB2 | ECB5 | 6CB7 | ECBA | 6CBD | ECBF | 6CD1 | ECD3 | ECD6 |
| 34 | 6CE2 | ECE5 | 6CE7 | ECEA | 6CED | ECEF | 6CF9 | ECFB | ECFE | ED11 | 6D13 | 6D16 | ED22 | 6D25 | ED27 | 6D2A |
| 35 | ED2D | 6D2F | ED39 | 6D3B | 6D3E | 6D49 | ED4B | ED4E | 6D52 | ED55 | 6D57 | ED5A | 6D5D | ED5F | ED69 | 6D6B |
| 36 | 6D6E | ED72 | 6D75 | ED77 | 6D7A | ED7D | 6D7F | 6D91 | ED93 | ED96 | 6DA2 | EDA5 | 6DA7 | EDAA | 6DAD | EDAF |
| 37 | 6DB9 | EDBB | EDBE | EDC9 | 6DCB | 6DCE | EDD2 | 6DD5 | EDD7 | 6DDA | EDDD | 6DDF | 6DE9 | EDEB | EDEE | 6DF2 |
| 38 | EDF5 | 6DF7 | EDFA | 6DFD | EDFF | EE21 | 6E23 | 6E26 | EE42 | 6E45 | EE47 | 6E4A | EE4D | 6E4F | EE59 | 6E5B |
| 39 | 6E5E | EE71 | 6E73 | 6E76 | 6E89 | EE8B | EE8E | 6E92 | EE95 | 6E97 | EE95 | 6E9D | EE9F | EEA9 | 6EAB | 6EAE |
| 3A | EEB2 | 6EB5 | EEB7 | 6EBA | EEBD | 6EBF | EED1 | 6ED3 | 6ED6 | EEE2 | 6EEA | EEE7 | 6EEA | EEED | 6EEF | EEF9 |
| 3B | 6EFB | 6EFE | 6F11 | EF13 | EF16 | 6F22 | EF25 | 6F27 | EF2A | 6F2D | EF2F | 6F39 | EF3B | EF3E | EF49 | 6F4B |
| 3C | 6F4E | EF52 | 6F55 | EF57 | 6F5A | EF5D | 6F5F | 6F69 | EF6B | EF6E | 6F72 | EF75 | 6F77 | EF7A | 6F7D | EF7F |
| 3D | EF91 | 6F93 | 6F9B | EFA2 | 6FA5 | EFA7 | 6FAA | EFAD | 6FAF | EFB9 | 6FBB | 6FBE | 6FC9 | EFCB | EFCE | 6FD2 |
| 3E | EFD5 | 6FD7 | EFDA | 6FDD | EFDF | EFE9 | 6FEB | 6FEE | EFF2 | 6FF5 | EFF7 | 6FFA | EFFD | 6FFF | 7086 | 710A |
| 3F | F10D | 710F | F119 | 711B | 711E | F131 | 7133 | 7136 | F161 | 7163 | 7166 | 71C3 | 71C6 | 7212 | F215 | 7217 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | F21A | 721D | F21F | F229 | 722B | 722E | F232 | 7235 | F237 | 723A | F23D | 723F | F251 | F253 | 7256 | F262 |
| 41 | 7265 | F267 | 726A | F26D | 726F | F279 | 727B | 727E | F2A1 | 72A3 | 72A6 | F2C2 | 72C5 | 72C7 | 72CA | F2CD |
| 42 | 72CF | F2D9 | 72DB | 72DE | F2F1 | 72F3 | 72F6 | 7343 | 7346 | 7385 | F387 | 738A | F38D | 738F | F399 | 739B |
| 43 | 739E | F381 | 73B3 | 73B6 | F3E1 | 73E3 | 73E6 | 7422 | F425 | 7427 | F42A | 742D | F42F | 7439 | F43B | F43E |
| 44 | F449 | 744B | 744E | F452 | 7455 | F457 | 745A | F45D | 745F | 7469 | F46B | F46E | 7472 | F475 | 7477 | F47A |
| 45 | 747D | F47F | F471 | 7493 | 7496 | F4A2 | 74A5 | F4A7 | 74AA | F4AD | 74AF | F4B9 | 74BB | 74CE | 74C9 | F4CB |
| 46 | F4CE | 74D2 | F4D5 | 74D7 | F4DA | 74DD | F4DF | F4E9 | 74EB | 74EE | F4F2 | 74F5 | F4F7 | 74FA | F4FD | 74FF |
| 47 | F521 | 7523 | 7526 | F542 | 7545 | F547 | 754A | F54D | 754F | F559 | 755B | 755E | F571 | 7573 | 7576 | 7589 |
| 48 | F58B | F58E | 7582 | F595 | 7597 | F59A | 759D | F59F | F5A9 | 75AB | 75AE | F5B2 | 75B5 | F5B7 | 75BA | F5BD |
| 49 | 75BF | F5D1 | 75D3 | 75D6 | F5E2 | 75E5 | F5E7 | 75EA | F5ED | 75EF | F5F9 | 75FB | 75FE | 7643 | 7646 | 7685 |
| 4A | F687 | 768A | F68D | 768F | F699 | 769B | 769E | F6B1 | 76B3 | 76B6 | F6E1 | 76E3 | 76E6 | 7709 | F70B | F70E |
| 4B | 7712 | F715 | 7717 | F71A | 771D | F71F | F729 | 772B | 772E | F732 | 7735 | F737 | 773A | F73D | 773F | F751 |
| 4C | 7753 | 7756 | F752 | 7765 | F767 | 776A | F76D | 776F | F776 | 777B | 777E | F7A1 | 77A3 | 77C0 | F7A2 | 77C5 |
| 4D | F7C7 | 77CA | F7CD | 77CF | F7D9 | 77DB | 77DE | F7F1 | 77F3 | 77F6 | 7842 | F845 | 7847 | F84A | 784D | F84F |
| 4E | 7859 | F85B | F85E | 7871 | F873 | F876 | F889 | 788B | 788E | F892 | 7895 | F897 | 789A | F89D | 789F | 78A9 |
| 4F | F8AB | F8AE | 78A2 | F8B5 | 78B7 | F8BA | 78BD | F8BF | 78D1 | F8D3 | F8D6 | 78E2 | F8E5 | 78E7 | F8EA | 78ED |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | F8EF | 78F9 | F8FB | F8FE | F911 | 7913 | 7916 | F922 | 7925 | F927 | 792A | F92D | 792F | F939 | 793B | 793E |
| 51 | 7949 | F94B | F94E | 7952 | F955 | 7957 | F95A | 795D | F95F | F969 | 796B | 796E | F972 | 7975 | F977 | 797A |
| 52 | F97D | 797F | 7991 | F993 | F996 | 79A2 | F9A5 | 79A7 | F9AA | 79AD | F9AF | 79B9 | F9BB | F9BB | F9C9 | 79CB |
| 53 | 79CE | F9D2 | 79D5 | F9D7 | 79DA | F9DD | 79DF | 79E9 | F9EB | F9EE | 79F2 | F9F5 | 79F7 | F9FA | 79FD | F9FF |
| 54 | FA21 | 7A23 | 7A26 | FA42 | 7A45 | FA47 | 7A4A | FA4D | 7A4F | FA59 | 7A5B | 7A5E | FA71 | 7A73 | 7A76 | 7A89 |
| 55 | FA8B | FA8E | 7A92 | FA95 | 7A97 | FA9A | 7A9D | FA9F | FAA9 | 7AAB | 7AAE | FAB2 | 7AB5 | FAB7 | 7ABA | FABD |
| 56 | 7ABF | FAD1 | 7AD3 | 7AD6 | FAE2 | 7AE5 | FAE7 | 7AEA | FAED | 7AEF | FAF9 | 7AFB | 7AFE | 7B11 | FB13 | FB16 |
| 57 | 7B22 | FB25 | 7B27 | FB2A | 7B2D | FB2F | 7B39 | FB3B | FB3E | FB49 | 7B4B | 7B4F | FB52 | 7B55 | FB57 | 7B5A |
| 58 | FB5D | 7B5F | 7B69 | FB6B | FB6E | 7B72 | FB75 | 7B77 | FB7A | 7B7D | FB7F | FB91 | 7B93 | 7B96 | FBA2 | 7BA5 |
| 59 | FBA7 | 7BAA | FBAD | 7BAF | FBB9 | 7BBB | 7BBE | 7BC9 | FBCB | FBCE | 7BD2 | FBD5 | 7BD7 | FBDA | 7BDD | FBDF |
| 5A | FBE9 | 7BEB | 7BEE | FBF2 | 7BF5 | FBF7 | 7BFA | FBFD | 7BFF | 7C43 | 7C46 | 7C85 | FC87 | 7C8A | FC8D | 7C8F |
| 5B | FC99 | 7C9B | 7C9E | FCB1 | 7CB3 | 7CB6 | FCE1 | 7CE3 | 7CE6 | 7D09 | FD0B | FD0E | 7D12 | FD15 | 7D17 | FD1A |
| 5C | 7D1D | FD1F | FD29 | 7D2B | 7D2E | FD32 | 7D35 | FD37 | 7D3A | FD3D | 7D3F | FD51 | 7D53 | 7D56 | FD62 | 7D65 |
| 5D | FD67 | 7D6A | FD6D | 7D6F | FD79 | 7D7B | 7D7E | FDA1 | 7DA3 | 7DA6 | FDC2 | 7DC5 | FDC7 | 7DCA | FDCD | 7DCF |
| 5E | FDD9 | 7DDB | 7DDE | FDF1 | 7DF3 | 7DF6 | 7E11 | FE13 | FE16 | 7E22 | FE25 | 7E27 | FE2A | 7E2D | FE2F | 7E39 |
| 5F | FE3B | FE3E | FE49 | 7E4B | 7E4E | FE52 | 7E55 | FE57 | 7E5A | FE5D | 7E5F | 7E69 | FE6B | FE6E | 7E72 | FE75 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | 7E77 | FE7A | 7E7D | FE7F | FE91 | 7E93 | 7E96 | FEA2 | 7EA5 | FEA7 | 7EAA | FEAD | 7EAF | FEB9 | 7EBB | 7EBE |
| 61 | 7EC9 | FECB | FECE | 7ED2 | FED5 | 7ED7 | FEDA | 7EDD | FEDF | FEE9 | 7EEB | 7EEE | FEF2 | 7EF5 | FEF7 | 7EFA |
| 62 | FEFD | 7EFF | FF21 | 7F23 | 7F26 | FF42 | 7F45 | FF47 | 7F4A | FF4D | 7F4F | FF59 | 7F5B | 7F5E | FF71 | 7F73 |
| 63 | 7F76 | 7F89 | FF8B | FF8E | 7F92 | FF95 | 7F97 | FF9A | 7F9D | FF9F | FFA9 | 7FAB | 7FAE | FFB2 | 7FB5 | FFB7 |
| 64 | 7FBA | FFBD | 7FBF | FFD1 | 7FD3 | 7FD8 | FFE2 | 7FE5 | FFE7 | 7FEA | FFED | 7FEF | FFF9 | 7FFB | 7FFB | 8842 |
| 65 | 0845 | 8847 | 084A | 884D | 084F | 8859 | 085B | 085E | 8871 | 0873 | 0876 | 0889 | 888B | 888E | 0892 | 8895 |
| 66 | 0897 | 889A | 089D | 889F | 88A9 | 08AB | 08AE | 88B2 | 08B5 | 88B7 | 08BA | 88BD | 08BF | 88D1 | 08D3 | 08D6 |
| 67 | 88E2 | 08E5 | 88E7 | 08EA | 88ED | 08EF | 88F9 | 08FB | 08FE | 0911 | 8913 | 8916 | 0922 | 8925 | 0927 | 892A |
| 68 | 092D | 892F | 0939 | 893B | 893E | 8949 | 094B | 094E | 8952 | 0955 | 8957 | 095A | 895D | 095F | 0969 | 896B |
| 69 | 896E | 0972 | 8975 | 0977 | 897A | 097D | 897F | 8991 | 0993 | 0996 | 89A2 | 09A5 | 89A7 | 09AA | 89AD | 09AF |
| 6A | 89B9 | 09BB | 09BE | 09C9 | 89CB | 89CE | 09D2 | 89D5 | 09D7 | 89DA | 09DD | 89DF | 89E9 | 09EB | 09EE | 89F2 |
| 6B | 09F5 | 89F7 | 09FA | 89FD | 09FF | 0A21 | 8A23 | 8A26 | 0A42 | 8A45 | 0A47 | 8A4A | 0A4D | 8A4F | 0A59 | 8A5B |
| 6C | 8A5E | 0A71 | 8A73 | 8A76 | 8A89 | 0A8B | 0A8E | 8A92 | 0A95 | 8A97 | 0A9A | 8A9B | 0A9F | 0AA9 | 8AAB | 8AAE |
| 6D | 0AB2 | 8AB5 | 0AB7 | 8ABA | 0AB0 | 8ABF | 0AD1 | 8AD3 | 8AD6 | 0AE2 | 8AE5 | 0AE7 | 8AEA | 0AED | 8AEF | 0AF9 |
| 6E | 8AFB | 8AFE | 8B11 | 0B13 | 0B16 | 8B22 | 0B25 | 8B27 | 0B2A | 8B2D | 0B2F | 8B39 | 0B3B | 0B3E | 0B49 | 8B4B |
| 6F | 8B4E | 0B52 | 8B55 | 0B57 | 8B5A | 0B5D | 8B5F | 8B69 | 0B6B | 0B6E | 8B72 | 0B75 | 8B77 | 0B7A | 8B7D | 0B7F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 0B91 | 8B93 | 8B96 | 0BA2 | 8BA5 | 0BA7 | 8BAA | 0BAD | 8BAF | 0BB9 | 8BBB | 8BBE | 8BC9 | 0BCB | 0BCE | 8BD2 |
| 71 | 0BD5 | 8BD7 | 0BDA | 8BDD | 0BDF | 0BE9 | 8BEB | 8BEE | 0BF2 | 8BF5 | 0BF7 | 8BFA | 0BFD | 8BFF | 8B43 | 8B46 |
| 72 | 8C85 | 0C87 | 8C8A | 0CBD | 8C8F | 0C99 | 8C9B | 8C9E | 0CB1 | 8CB3 | 8CB6 | 0CE1 | 8CE3 | 8CE6 | 8C09 | 0C0B |
| 73 | 0D0E | 8D12 | 0D15 | 8D17 | 0D1A | 8D1D | 0D1F | 0D29 | 8D2B | 8D2E | 0D32 | 8D35 | 0D37 | 8D3A | 0D3D | 8D3F |
| 74 | 0D51 | 8D53 | 8D56 | 0D62 | 8D65 | 0D67 | 8D6A | 0D6D | 8D6F | 0D79 | 8D7B | 8D7E | 0DA1 | 8DA3 | 8DA6 | 0DC2 |
| 75 | 8DC5 | 0DC7 | 8DCA | 0DCD | 8DCF | 0DD9 | 8DDB | 8DDE | 0DF1 | 8DF3 | 8DF6 | 8E11 | 0E13 | 0E16 | 8E22 | 0E25 |
| 76 | 8E27 | 0E2A | 8E2D | 0E2F | 8E39 | 0E3B | 0E3E | 0E49 | 8E4B | 8E4E | 0E52 | 8E55 | 0E57 | 8E5A | 0E5D | 8E5F |
| 77 | 8E69 | 0E6B | 0E6E | 8E72 | 0E75 | 8E77 | 0E7A | 8E7D | 0E7F | 0E91 | 8E93 | 8E96 | 0EA2 | 8EA5 | 0EA7 | 8EAA |
| 78 | 0EAD | 8EAF | 0EB9 | 8EBB | 8EBE | 8EC9 | 0ECB | 0ECE | 8ED2 | 0ED5 | 8ED7 | 0EDA | 8EDD | 0EDF | 0EE9 | 8EEB |
| 79 | 8EEE | 0EF2 | 8EF5 | 0EF7 | 8EFA | 0EFD | 8EFF | 0E21 | 8F23 | 8F26 | 0F42 | 8F45 | 0F47 | 8F4A | 0F4D | 8F4F |
| 7A | 0F59 | 8F5B | 8F5E | 0F71 | 8F73 | 8F76 | 8F8B | 0F8B | 0F8E | 8F92 | 0F95 | 8F97 | 0F9A | 8F9D | 0F9F | 0FA9 |
| 7B | 8FAB | 8FAE | 0FB2 | 8FB5 | 0FB7 | 8FBA | 0FBD | 8FBF | 0FD1 | 8FD3 | 8FD6 | 0FE2 | 8FE5 | 0FE7 | 8FEA | 0FED |
| 7C | 8FEF | 0FF9 | 8FFB | 8FFE | 1085 | 9087 | 108A | 908D | 108F | 9099 | 109B | 109E | 90B1 | 10B3 | 10B6 | 90E1 |
| 7D | 10E3 | 10E6 | 1109 | 910B | 910E | 1112 | 9115 | 1117 | 911A | 111D | 911F | 9129 | 112B | 112E | 9132 | 1135 |
| 7E | 9137 | 113A | 013D | 113F | 9151 | 1153 | 1156 | 9162 | 1165 | 9167 | 116A | 016D | 116F | 9179 | 117B | 117E |
| 7F | 91A1 | 11A3 | 11A6 | 91C2 | 11C5 | 91C7 | 11CA | 91CD | 11CF | 81D9 | 11DB | 11DE | 91F1 | 11F3 | 11F6 | 1211 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | 9213 | 9216 | 1222 | 0225 | 1227 | 922A | 122D | 022F | 1239 | 923B | 923E | 9249 | 124B | 124E | 9252 | 1255 |
| 81 | 9257 | 125A | 925D | 125F | 1269 | 926B | 926E | 1272 | 9275 | 1277 | 927A | 127D | 927F | 9291 | 1293 | 1296 |
| 82 | 92A2 | 12A5 | 92A7 | 12AA | 92AD | 12AF | 92B0 | 12BB | 12BE | 12C9 | 92CB | 92CE | 12D2 | 92D5 | 12D7 | 92DA |
| 83 | 12DD | 92DF | 92E9 | 12EB | 12EE | 92F2 | 12F5 | 93F7 | 12FA | 92FD | 12FF | 9321 | 1323 | 1326 | 9342 | 1345 |
| 84 | 9347 | 134A | 934D | 134F | 9359 | 135B | 135E | 0371 | 1373 | 1376 | 1389 | 93BB | 938E | 1392 | 9395 | 1397 |
| 85 | 939A | 139D | 939F | 93A9 | 13AB | 13AE | 93B2 | 13B5 | 93B7 | 13BA | 938D | 13BF | 93D1 | 13D3 | 13D6 | 93E2 |
| 86 | 13E5 | 93E7 | 13EE | 93ED | 13EF | 93F9 | 13FB | 14FE | 1421 | 0423 | 9426 | 1442 | 9445 | 1447 | 944A | 144D |
| 87 | 944F | 1459 | 945D | 945E | 1471 | 9473 | 9476 | 9489 | 148B | 148E | 9492 | 1495 | 9497 | 149A | 949D | 149F |
| 88 | 14A9 | 94AB | 94AE | 14B2 | 94B5 | 14B7 | 94BA | 158D | 94BF | 14D1 | 94D3 | 94D6 | 14E2 | 94E5 | 14E7 | 94EA |
| 89 | 14ED | 94EF | 14F9 | 94FB | 94FE | 9511 | 1513 | 1516 | 9522 | 1525 | 9527 | 152A | 952D | 152F | 9539 | 153B |
| 8A | 153E | 1549 | 9548 | 954E | 1552 | 9555 | 1557 | 955A | 155D | 055F | 9569 | 156B | 156E | 9572 | 1575 | 9577 |
| 8B | 157A | 957D | 157F | 1591 | 9593 | 9596 | 15A2 | 95A5 | 15A7 | 05AA | 15AD | 95AF | 15B9 | 95BB | 05BE | 95C9 |
| 8C | 15CB | 15CE | 95D2 | 15D5 | 95D7 | 15DA | 95DD | 15DF | 15A9 | 05EB | 95EE | 15F2 | 95F5 | 15F7 | 95FA | 15FD |
| 8D | 95FF | 9621 | 1623 | 1626 | 0642 | 1645 | 0647 | 164A | 964D | 164F | 9659 | 1658 | 165E | 9671 | 1673 | 1676 |
| 8E | 1689 | 9688 | 968E | 169E | 0695 | 1697 | 069A | 169D | 969F | 96A9 | 16AB | 16AE | 96B2 | 16B5 | 06B7 | 16BA |
| 8F | 96BD | 16B4 | 96D1 | 16D3 | 16D6 | 96E2 | 16E5 | 96E7 | 16EA | 96ED | 16EF | 96F9 | 16FB | 16FE | 1711 | 9713 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 9716 | 1722 | 9725 | 1727 | 972A | 172D | 972F | 1739 | 973B | 973E | 9749 | 174B | 174E | 9752 | 1755 | 9757 |
| 91 | 175A | 975D | 175F | 1769 | 976B | 976E | 1772 | 9775 | 1777 | 977A | 177D | 977F | 9791 | 1793 | 1796 | 97A2 |
| 92 | 17A5 | 97A7 | 17AA | 97AD | 17AF | 97B9 | 17BB | 17BE | 17C9 | 97CB | 97CE | 17D2 | 97D5 | 17D7 | 97DA | 17DD |
| 93 | 97DF | 97E9 | 17EB | 17EE | 97F2 | 17F5 | 97F7 | 17FA | 97FD | 17FF | 9843 | 98A6 | 9885 | 1887 | 988A | 1B8D |
| 94 | 988F | 1899 | 989B | 989E | 18B1 | 98B3 | 98B6 | 18E1 | 98E3 | 98E6 | 9909 | 190B | 190E | 9912 | 1915 | 9917 |
| 95 | 191A | 991D | 191F | 1929 | 992B | 992E | 1932 | 9935 | 1937 | 993A | 193D | 993F | 1951 | 9953 | 9956 | 1962 |
| 96 | 9965 | 1967 | 996A | 196D | 996F | 1979 | 997B | 997E | 19A1 | 99A3 | 99A6 | 19C2 | 99C5 | 19C7 | 99CA | 19CD |
| 97 | 09CF | 19D9 | 99DB | 99DE | 19F1 | 99F3 | 99F6 | 9A11 | 1A13 | 1A16 | 9A22 | 1A25 | 9A27 | 1A2A | 9A2D | 1A2F |
| 98 | 9A39 | 1A3B | 1A3E | 1A49 | 9A4B | 9A4E | 1A52 | 9A55 | 1A57 | 9A5A | 1A5D | 9A5F | 9A65 | 1A6B | 1A6E | 9A72 |
| 99 | 1A75 | 9A77 | 1A7A | 9A7D | 1A7F | 1A91 | 9A93 | 9A96 | 1AA2 | 9AA5 | 1AA7 | 9AAA | 1AAD | 9AAF | 1AB9 | 9ABB |
| 9A | 0ABE | 9AC9 | 1ACB | 1ACE | 0AD2 | 1AD5 | 9AD7 | 1ADA | 9ADD | 1ADF | 1AE9 | 9AEB | 9AEE | 1AF2 | 9AF5 | 1AF7 |
| 9B | 0AFA | 1AFD | 9AFF | 1B21 | 0B23 | 0B26 | 1B42 | 9B45 | 1B47 | 0B4A | 1B4D | 0B4F | 1B59 | 9B5B | 0B5E | 1B71 |
| 9C | 0B73 | 9B76 | 9B89 | 1BBB | 1B8E | 0B92 | 1B95 | 9B97 | 1B9A | 0B9D | 1B9F | 1BA9 | 8BAB | 9BAE | 1BB2 | 9BB5 |
| 9D | 1BB7 | 0BBA | 1BBD | 9BBF | 1BD1 | 0BD3 | 9BD6 | 1BE2 | 9BE5 | 1BE7 | 9BEA | 1BED | 0BEF | 1BF9 | 9BFB | 9BFE |
| 9E | 9C21 | 1C23 | 1C26 | 9C42 | 1C45 | 0C47 | 1C4A | 9C4D | 1C4F | 0C55 | 1C5B | 1C5E | 0C71 | 1C73 | 1C76 | 1C89 |
| 9F | 0C8B | 0C8E | 1C92 | 9C95 | 1C97 | 0C9A | 1C9D | 9C9F | 9CA9 | 1CAB | 1CAE | 0CB2 | 1CB5 | 9CB7 | 1CBA | 9CBD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | 1CBF | 9CD1 | 1CD3 | 1CD6 | 9CE2 | 1CE5 | 9CE7 | 1CEA | 9CED | 1CEF | 9CF9 | 1CFB | 1CFE | 1D11 | 9D13 | 9D16 |
| A1 | 1D22 | 9D25 | 1D27 | 9D2A | 1D2D | 9D2F | 1D39 | 9D3B | 9D3E | 9D49 | 1D4B | 1D4E | 9D52 | 1D55 | 9D57 | 1D5A |
| A2 | 9D5D | 1D5F | 1D69 | 9D6B | 9D6E | 1D72 | 9D75 | 1D77 | 9D7A | 1D7D | 9D7F | 9D91 | 1D93 | 1D96 | 9DA2 | 1DA5 |
| A3 | 9DA7 | 1DAA | 9DAD | 1DAF | 9DB9 | 1DBB | 1DBE | 1DC9 | 9DCB | 9DCE | 1DD2 | 9DD5 | 1DD7 | 9DDA | 1DDD | 9DDF |
| A4 | 9DE9 | 1DEB | 1DEE | 9DF2 | 1DF9 | 9DF7 | 1DFA | 9DFD | 1DFF | 1E21 | 9E23 | 9E26 | 1E42 | 9E45 | 1E47 | 9E4A |
| A5 | 1E4D | 9E4F | 1E59 | 9E5B | 9E5B | 1E71 | 9E73 | 9E76 | 9E89 | 1E8B | 1E8E | 9E92 | 1E95 | 9E97 | 1E9A | 9E9D |
| A6 | 1E9F | 1EA9 | 9EAB | 9EAE | 1EB2 | 9EB5 | 1EB7 | 9EBA | 1EBD | 9EBF | 1ED1 | 9ED3 | 9ED6 | 1EE2 | 9EE5 | 1EE7 |
| A7 | 9EEA | 1EED | 9EEF | 1EF9 | 9EFB | 9EFE | 9F11 | 1F13 | 1F16 | 9F22 | 1F25 | 9F27 | 1F2A | 9F2D | 1F2F | 9F39 |
| A8 | 1F3B | 1F3E | 1F49 | 9F4B | 9F4E | 1F52 | 9F55 | 1F57 | 9F5A | 1F5D | 9F5F | 9F69 | 1F6B | 1F6E | 9F72 | 1F7D |
| A9 | 9F77 | 1F7A | 9F7D | 1F7F | 1F91 | 9F93 | 9F96 | 1FA2 | 9FA5 | 1FA7 | 9FAA | 1FAD | 9FAF | 1FB9 | 9FBB | 9FBE |
| AA | 9FC9 | 1FCB | 1FCE | 9FD2 | 1FD5 | 9FD7 | 1FDA | 9FDD | 1FDF | 1FE9 | 9FEB | 9FEE | 1FF2 | 9FF5 | 1FF7 | 9FFA |
| AB | 1FFD | 9FFF | 210A | A10D | 210F | A119 | 211B | 211E | A131 | 2133 | 2136 | A161 | 2163 | 2166 | 21C3 | 21C6 |
| AC | 2212 | A215 | 2217 | A21A | 221D | A21F | A229 | 222B | 222E | A232 | 2235 | A237 | 223A | A23D | 223F | A251 |
| AD | 2253 | 2256 | A262 | 2265 | A267 | 226A | A26D | 226F | A279 | 227B | 227E | A2A1 | 22A3 | 22A6 | A2C2 | 22C5 |
| AE | A2C7 | 22CA | A2CD | 22CF | A2D9 | 22DB | 22DE | A2F1 | 22F3 | 22F6 | 2343 | 2346 | 2385 | A387 | 238A | A38D |
| AF | 238F | A399 | 239B | 239E | A3B1 | 23B3 | 23B6 | A3E1 | 23E3 | 23E6 | 2422 | A425 | 2427 | A42A | 242D | A42F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | 2439 | A43B | A43E | A449 | 244B | 244E | A452 | 2455 | A457 | 245A | A45D | 245F | 2469 | A46B | A46E | 2472 |
| B1 | A475 | 2477 | A47A | 247D | A47F | A491 | 2493 | 2496 | A4A2 | 24A5 | A4A7 | 24AA | A4AD | 24AF | A4B9 | 24BB |
| B2 | 24BE | 24C9 | A4C8 | A4CE | 24D2 | A4D5 | 24D7 | A4DA | 24DD | A4DF | A4E9 | 24EB | 24EE | A4F2 | 24F5 | A4F7 |
| B3 | 24FA | A4FD | 24FF | A521 | 2523 | 2526 | A542 | 2545 | A547 | 254A | A54D | 254F | A555 | 255B | 255E | A571 |
| B4 | 2573 | 2576 | 2589 | A58B | A58E | 2592 | A595 | 2597 | A59A | 259D | A59F | A5A9 | 25AB | 25AE | A5B2 | 25B5 |
| B5 | A5B7 | 25BA | A58D | 25BF | A5D1 | 25D3 | 25D6 | A5E2 | 25E5 | A5E7 | 25EA | A5ED | 25EF | A5F9 | 25FB | 25FE |
| B6 | 2643 | 2646 | 2685 | A687 | 268A | A68D | 268F | A699 | 269B | 269E | A6B1 | 26B3 | 26B6 | A6E1 | 26E3 | 26E6 |
| B7 | 2709 | A70B | A70E | 2712 | A715 | 2717 | A71A | 271D | A71F | A729 | 272B | 272E | A732 | 2735 | A737 | 273A |
| B8 | A73D | 273F | A751 | 2753 | 2756 | A762 | 2765 | A767 | 276A | A76D | 276F | A779 | 277B | 277E | A7A1 | 27A3 |
| B9 | 27A6 | A7C2 | 27C5 | A7C7 | 27CA | A7CD | 27CF | A7D9 | 27DB | 27DE | A7F1 | 27F3 | 27F6 | 2842 | A845 | 2847 |
| BA | A84A | 284D | A84F | 2859 | A85B | A85E | 2871 | A873 | A876 | A889 | 288B | 288E | A892 | 2895 | A897 | 289A |
| BB | A89D | 289F | 28A9 | A8AB | A8AE | 28B2 | A8B5 | 28B7 | A8BA | 28BD | A8BF | 28D1 | A8D3 | A8D6 | 28E2 | A8E5 |
| BC | 28E7 | A8EA | 28ED | A8EF | 28F9 | A8FB | A8FE | A911 | 2913 | 2916 | A92E | 2925 | A927 | 292A | A92D | 292F |
| BD | A939 | 293B | 293E | 2949 | A94B | A94E | 2952 | A955 | 2957 | A95A | 295D | A95F | A969 | 296B | 296E | A972 |
| BE | 2975 | A977 | 297A | A97D | 297F | 2991 | A993 | A996 | 29A2 | A9A5 | 29A7 | A9AA | 29AD | A9AF | 29B9 | A9BB |
| BF | A9BE | A9C9 | 29CB | 29CE | A9D2 | 29D5 | A9D7 | 29DA | A9DD | 29DF | 29E9 | A9EB | A9EE | 29F2 | A9F5 | 29F7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | A9FA | 29FD | A9FF | AA21 | 2A23 | 2A26 | AA42 | 2A45 | AA47 | 2A4A | AA4D | 2A4F | AA55 | 2A5B | 2A5E | AA71 |
| C1 | 2A73 | 2A76 | 2A89 | AA8B | AA8E | 2A92 | AA95 | 2A97 | AA9A | 2A9D | AA9F | AA99 | 2AAB | 2AAE | AAB2 | 2AB5 |
| C2 | AAB7 | 2ABA | AABD | 2ABF | AAD1 | 2AD3 | 2AD0 | AAE2 | 2AE5 | AAE7 | 2AEA | AAAD | 2AEF | AAF9 | 2AFB | 2AFE |
| C3 | 2B11 | AB13 | AB16 | 2B22 | AB25 | 2B27 | AB2A | 2B2D | AB2F | 2B39 | AB3B | AB3E | AB49 | 2B4B | 2B4E | AB52 |
| C4 | 2B55 | AB57 | 2B5A | AB5D | 2B5F | 2B69 | AB6B | AB6E | 2B72 | AB75 | 2B77 | AB7A | 2B7D | AB7F | AB91 | 2B93 |
| C5 | 2B96 | ABA2 | 2BA5 | ABA7 | 2BAA | ABAD | 2BAF | ABB9 | 2BBB | 2BBE | 2BC9 | ABCB | ABCE | 2BD2 | ABD5 | 2BD7 |
| C6 | ABDA | 2BDD | ABDF | ABE9 | 2BEB | 2BEE | ABF2 | 2BF5 | ABF7 | 2BFA | ABFD | 2BFF | 2C43 | 2C46 | 2C85 | AC87 |
| C7 | 2C8A | AC8D | 2C8F | AC99 | 2C9B | 2C9E | ACB1 | 2C83 | 2CB6 | ACE1 | 2CE3 | 2CE6 | 2D09 | AD0B | AD0E | 2D12 |
| C8 | AD15 | 2D17 | AD1A | 2D1D | AD1F | AD29 | 2D2B | 2D2E | AD32 | 2D35 | AD37 | 2D3A | AD3D | 2D3F | AD51 | 2D53 |
| C9 | 2D56 | AD62 | 2D65 | AD67 | 2D6A | AD6D | 2D6F | AD79 | 2D7B | 2D7E | ADA1 | 2DA3 | 2DA6 | ADC2 | 2DC5 | ADC7 |
| CA | 2DCA | ADCD | 2DCF | ADD9 | 2DDB | 2DDE | ADF1 | 2DF3 | 2DF6 | 2E11 | AE13 | AE16 | 2E22 | AE25 | 2E27 | AE2A |
| CB | 2E2D | AE2F | 2E39 | AE3B | AE3E | AE49 | 2E4B | 2E4E | AE52 | 2E55 | AE57 | 2E5A | AE5D | 2E5F | 2E69 | AE6B |
| CC | AE6E | 2E72 | AE75 | 2E77 | AE7A | 2E7D | AE7F | AE91 | 2E93 | 2E96 | AEA2 | 2EA5 | AEA7 | 2EAA | AEAD | 2EAF |
| CD | AE89 | 2EBB | 2EBE | 2EC9 | AECB | AECE | 2EB2 | AED5 | 2ED7 | AEDA | 2EDD | AEDF | AEE9 | 2EEB | 2EEE | AEF2 |
| CE | 2EF5 | AEF7 | 2EFA | AEFD | 2EFF | AF21 | 2F23 | 2F26 | AF42 | 2F45 | AF47 | 2F4A | AF4D | 2F4F | AF59 | 2F5B |
| CF | 2F5E | AF71 | 2F73 | 2F76 | 2F89 | AF8B | AF8E | 2F92 | AF95 | 2F97 | AF9A | 2F9D | AF9F | AFA5 | 2FAB | 2FAE |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | AFB2 | 2FB5 | AFB7 | 2FBA | AFBD | 2FBF | AFD1 | 2FD3 | 2FD6 | AFE2 | 2FE5 | AFE7 | 2FEA | AFED | 2FEF | AFF9 |
| D1 | 2FFB | 2FFE | B085 | 3087 | 808A | 308D | 808F | 3099 | 809B | 809E | 30B1 | 80B3 | 80B6 | 30E1 | 80E3 | B0E6 |
| D2 | B109 | 310B | 310E | 8112 | 3115 | 8117 | 311A | 811D | 311F | 3129 | 812B | 812E | 3132 | B135 | 3137 | 813A |
| D3 | 313D | 813F | 3151 | 8153 | 8156 | 3162 | 8165 | 3167 | 816A | 316D | 816F | 3179 | 817B | B17E | 31A1 | 81A3 |
| D4 | 81A6 | 31C2 | 81C5 | 31C7 | 81CA | 31CD | 81CF | 31D9 | 81DB | 81DE | 31F1 | 81F3 | 81F6 | B211 | 3213 | 3216 |
| D5 | 8222 | 3225 | 8227 | 322A | 822D | 322F | 8239 | 323B | 323E | 3249 | 824B | 824E | 3252 | B255 | 3257 | 825A |
| D6 | 325D | 825F | 8269 | 326B | 326E | 8272 | 3275 | 8277 | 327A | 827D | 327F | 3291 | 8293 | B296 | 32A2 | 82A5 |
| D7 | 32A7 | 82AA | 32AD | 82AF | 3289 | 82BB | 82BE | 82C9 | 32CB | 32CE | 82D2 | 32D5 | 82D7 | 32DA | 82DD | 32DF |
| D8 | 32E9 | 82EB | 82EE | 32F2 | 82F5 | 32F7 | 82FA | 32FD | 82FF | 3321 | 8323 | 8326 | 3342 | B345 | 3347 | 834A |
| D9 | 334D | 834F | 3359 | 835B | 835E | 3371 | 8373 | 8376 | 8389 | 338B | 338E | 8392 | 3395 | 8397 | 339A | 839D |
| DA | 339F | 33A9 | 83AB | 83AE | 33B2 | 83B5 | 33B7 | 83BA | 33BD | 83BF | 33D1 | 83D3 | 83D6 | 33E2 | 8325 | 33E7 |
| DB | 83EA | 33ED | 83EF | 33F9 | 83FB | 83FE | 8421 | 3423 | 3426 | 8442 | 3445 | 8447 | 344A | B44D | 344F | 8459 |
| DC | 345B | 345E | 8471 | 3473 | 3476 | 3489 | 848B | 848E | 3492 | 8495 | 3497 | 849A | 349D | B49F | 84A9 | 34AB |
| DD | 34AE | 84B2 | 34B5 | 84B7 | 34BA | 84BD | 34BF | 84D1 | 34D3 | 34D6 | 84E2 | 34E5 | 84E7 | 34EA | 84ED | 34EF |
| DE | 84F9 | 34FB | 34FE | 3511 | 8513 | 8516 | 3522 | 8525 | 3527 | 852A | 352D | 852F | 3539 | 853B | 853E | 8549 |
| DF | 354B | 354E | 8552 | 3555 | 8557 | 355A | 855D | 355F | 3569 | 856B | 856E | 3572 | 8575 | 3577 | 857A | 357D |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | B57F | B591 | 3593 | 3596 | B5A2 | 35A5 | B5A7 | 35AA | B5AD | 35AF | B5BB | 35BB | 35BE | 35C9 | B5CB | B5CE |
| E1 | 35D2 | B5D5 | 35D7 | B5DA | 35DD | B5DF | B5E9 | 35EB | 35EE | B5F2 | 35F5 | B5F7 | 35FA | B5FD | 35FF | 3621 |
| E2 | B623 | B626 | 3642 | B645 | 3647 | B64A | 364D | B64F | 3659 | B65B | B65E | 3671 | B673 | B676 | B689 | 368B |
| E3 | 368E | B692 | 3695 | B697 | 369A | B69D | 369F | 36A9 | B6AB | B6AE | 36B2 | B6B5 | 36B7 | B6BA | 36BD | B6BF |
| E4 | 36D1 | B6D3 | B6D6 | 36E2 | B6B5 | 36E7 | B6EA | 36ED | B6EF | 36F9 | B6FB | B6FE | B711 | 3713 | 3716 | B722 |
| E5 | 3725 | B727 | 372A | B72D | 372F | B739 | 373B | 373E | 3749 | B74B | B74E | 3752 | B755 | 3757 | B75A | 375D |
| E6 | B75F | B769 | 376B | 376B | B772 | 3775 | B777 | 377A | B77D | 377F | 3791 | B793 | B796 | 37A2 | B7A5 | 37A7 |
| E7 | B7AA | 37AD | B7AF | 37B9 | B7BB | B7BE | B7C9 | 37CB | 37CE | B7D2 | 37D5 | B7D7 | 37DA | B7DD | 37DF | 37D9 |
| E8 | B7EB | B7EE | 37F2 | B7F5 | 37F7 | B7FA | 37FD | B7FF | 3843 | 3846 | 3885 | B887 | 38BA | B88D | 388F | B899 |
| E9 | 389B | 389E | B8B1 | 38B3 | 38B6 | B8E1 | 38B3 | 38E6 | 3909 | B90B | B90E | 3912 | B915 | 3917 | B91A | 391D |
| EA | B91F | B929 | 392B | 392E | B932 | 3935 | B937 | 393A | B93D | 393F | B951 | 3953 | 3956 | B962 | 3965 | B967 |
| EB | 396A | B96D | 396F | B979 | 397B | 397E | B9A1 | 39A3 | 39A6 | B9C2 | 39C5 | B9C7 | 39CA | B9CD | 39CF | 39D9 |
| EC | 39DB | 39DE | B9F1 | 39F3 | 39F6 | 3A11 | BA13 | BA16 | 3A22 | BA25 | 3A27 | BA2A | 3A2D | BA2F | 3A39 | BA3B |
| ED | BA32 | BA49 | 3A4B | 3A4E | BA52 | 3A55 | BA57 | 3A5A | BA5D | 3A5F | 3A69 | BA6B | BA6E | 3A72 | BA75 | 3A77 |
| EE | BA7A | 3A7D | BA7F | BA91 | 3A93 | 3A96 | BAA2 | 3AA5 | BAA7 | 3AAA | BAAD | 3AAF | BAB9 | 3ABB | 3ABE | 3AC9 |
| EF | BACB | BACE | 3AD2 | BAD5 | 3AD7 | BADA | 3ADD | BADF | BAE9 | 3AEB | 3AEE | BAF2 | 3AF5 | BAF7 | 3AFA | BAFD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | 3AFF | BB21 | 3B23 | 3B26 | BB42 | 3B45 | BB47 | 3B4A | BB4D | 3B4F | BB59 | 3B5B | 3B5E | BB71 | 3B73 | 3B76 |
| F1 | 3B89 | BB8B | BB8E | 3B92 | BB95 | 3B97 | BB9A | 3B9D | BB9F | BBA9 | 3BAB | 3BAE | BBB2 | 3BB5 | BBB7 | 3BBA |
| F2 | BBBD | 3BBF | BBD1 | 3BD3 | 3BD6 | BBE2 | 3BE5 | BBE7 | 3BEA | BBED | 3BEF | BBF9 | 3BFB | 3BFE | 3C21 | BC23 |
| F3 | BC26 | 3C42 | BC45 | 3C47 | BC4A | 3C4D | BC4F | 3C59 | BC5B | BC53 | 3C71 | BC73 | BC76 | BC89 | 3C8B | 3C8E |
| F4 | BC92 | 3C95 | BC97 | 3C9A | BC9D | 3C9F | 3CA9 | BCAB | BCAE | 3CB2 | BCB5 | 3CB7 | BCBA | 3CBD | BCBF | 3CD1 |
| F5 | BCD3 | BCD6 | 3CE2 | BCE5 | 3CE7 | BCDA | 3CED | BCEF | 3CF9 | BCFB | BCFE | BD11 | 3D13 | 3D16 | BD22 | 3D25 |
| F6 | BD27 | 3D2A | BD2D | 3D2F | BD39 | 3D3B | 3D3B | 3D49 | BD48 | BD4E | 3D52 | BD55 | 3D57 | BD5A | 3D5D | BD5F |
| F7 | BD69 | 3D6B | 3D6E | BD72 | 3D75 | BD77 | 3D7A | BD7D | 3D7F | 3D91 | BD93 | BD96 | 3DA2 | BDA5 | 3DA7 | BDAA |
| F8 | 3DAD | BDAF | 3DB9 | BDBB | BDBE | BDC9 | 3DCB | 3DCE | BDD2 | 3DD5 | BDD7 | 3DDA | BDDD | 3DDF | 3DE9 | BDEB |
| F9 | BDEE | 3DF2 | BDF5 | 3DF7 | BDFA | 3DFD | BDFF | BE21 | 3E23 | 3E26 | BE42 | 3E45 | BE47 | 3E4A | BE4D | 3E4F |
| FA | BE59 | 3E5B | 3E5E | BE71 | 3E73 | 3E76 | 3E89 | BE8B | BE8E | 3E92 | BE95 | 3E97 | BE9A | 3E9D | BE9F | BEA9 |
| FB | 3EAB | 3EAE | BEB2 | 3E85 | BEB7 | 3EBA | BEBD | 3EBF | BED1 | 3ED3 | 3ED6 | BEE2 | 3EE5 | BEE7 | 3EEA | BEED |
| FC | 3EEF | BEF9 | 3EFB | 3EFE | 3F11 | BF13 | BF16 | 3F22 | BF25 | 3F27 | BF2A | 3F2D | BF2F | 3F39 | BF3B | BF3E |
| FD | BF49 | 3F4B | 3F4E | BF52 | 3F55 | BF57 | 3F5A | BF5D | 3F5F | 3F69 | BF6B | BF6E | 3F72 | BF75 | 3F77 | BF7A |
| FE | 3F7D | BF7F | BF91 | 3F93 | 3F96 | BFA2 | 3FA5 | BFA7 | 3FAA | BFAD | 3FAF | BFB9 | 3FBB | 3FBE | 3FC9 | BFCB |
| FF | BFCE | 3FD2 | BFD5 | 3FD7 | BFDA | 3FDD | BFDF | BFE9 | 3FEB | 3FEE | BFF2 | 3FF5 | BFF7 | 3FFA | BFFD | 3FFF |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | CCB5 | 4CB7 | CCBA | 4CBD | CCBF | 4CD1 | CCD3 | CCD6 | 4CE2 | CCE5 | 4CE7 | CCEA | 4CED | CCEF | 4CF9 | CCFB |
| 01 | CCFE | CD11 | 4D13 | 4D16 | CD22 | 4D25 | CD27 | 4D2A | CD2D | 4D2F | CD39 | 4D3B | 4D3E | 4D49 | CD4B | CD4E |
| 02 | 4D52 | CD55 | 4D57 | CD5A | 4D5D | CD5F | CD69 | 4D6B | 4D66 | CD72 | 4D75 | CD77 | 4D7A | CD7D | 4D7F | 4D91 |
| 03 | CD93 | CD96 | 4DA2 | CDA5 | 4DA7 | CDAA | 4DAD | CDAF | 4DB9 | CDBB | CDBE | CDC9 | 4DCB | 4DCE | CDD2 | 4DD5 |
| 04 | CDD7 | 4DDA | CDDD | 4DDF | 4DEB | CDEB | CDEE | 4DF2 | CDF5 | 4DF7 | CDFA | 4DFD | CDFF | CE21 | 4E23 | 4E26 |
| 05 | CE42 | 4E45 | CE47 | 4E4A | CE4D | 4E4F | CE59 | 4E5B | 4E5E | CE71 | 4E73 | 4E76 | AE89 | CE8B | CE8E | 4E92 |
| 06 | CE95 | 4E97 | CE9A | 4E9D | CE9F | CEA9 | 4EAB | 4EAE | CEB2 | 4EB5 | CEB7 | 4EBA | CEBD | 4EBF | CED1 | 4ED3 |
| 07 | 4ED6 | CEE2 | 4EE5 | CEE7 | 4EEA | CEED | 4EEF | CEF9 | 4EFB | 4EFE | 4F11 | CF13 | CF16 | 4F22 | CF25 | 4F27 |
| 08 | CF2A | 4F2D | CF2F | 4F39 | CF3B | CF3E | CF49 | 4F4B | 4F4E | CF52 | 4F55 | CF57 | 4F5A | CF5D | 4F5F | 4F69 |
| 09 | CF6B | CF6E | 4F72 | CF75 | 4F77 | CF7A | 4F7D | CF7F | CF91 | 4F93 | 4F96 | CFA2 | 4FA5 | CFA7 | 4FAA | CFAD |
| 0A | 4FAF | CFB9 | 4FBB | 4FBB | 4FC9 | CFCB | CFCE | 4FD2 | CFD5 | 4FD7 | CFAA | 4FAD | CFDF | CFE9 | 4FEB | AFEE |
| 0B | CFF2 | 4FF5 | CFF7 | 4FFA | CFFD | 4FFF | 5086 | 510A | D10D | 510F | D119 | 511B | 511E | D131 | 5133 | 5136 |
| 0C | D161 | 5163 | 5166 | 51C3 | 51C6 | 5212 | D215 | 5217 | D21A | 521D | D21F | D229 | 522B | 522E | D232 | 5235 |
| 0D | D237 | 523A | D23D | 523F | D251 | 5253 | 5256 | D262 | 5265 | D267 | 526A | D26D | 526F | D279 | 527B | 527E |
| 0E | D2A1 | 52A3 | 52A6 | D2C2 | 52C5 | D2C7 | 52CA | D2CD | 52CF | D2D9 | 52DB | 52DE | D2F1 | 52F3 | 52F6 | 5343 |
| 0F | 5346 | 5385 | D387 | 538A | D38D | 538F | D399 | 5396 | 539E | D3B1 | 53B3 | 53B6 | D3E1 | 53E3 | 53E6 | 5422 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 10 | D425 | 5427 | D42A | 542D | D42F | 5439 | D43B | D43E | D449 | 544B | 544E | D452 | 5455 | D457 | 545A | D45D |
| 11 | 545F | 5469 | D46B | D46E | 5472 | D475 | 5477 | D47A | 547D | D47F | D491 | 5493 | 5498 | D4A2 | 54A5 | D4A7 |
| 12 | 54AA | D4AD | 54AF | D4B9 | 54BB | 54BE | 54C9 | D4CB | D4CE | 54D2 | D4D5 | 54D7 | D4DA | 54DD | D4DF | D4E9 |
| 13 | 54EB | 54EE | D4F2 | 54F5 | D4F7 | 54FA | D4FD | 54FF | D521 | 5523 | 5526 | D542 | 5545 | D547 | 554A | D54D |
| 14 | 554F | D559 | 555B | 555E | D571 | 5573 | 5576 | 5589 | D58B | D58E | 5592 | D595 | 5597 | D59A | 559D | D59F |
| 15 | D5A9 | 55AB | 55AE | D5B2 | 55B5 | D5B7 | 55BA | D5BD | 558F | D5D1 | 55D3 | 55D6 | D5E2 | 55E5 | D5E7 | 55EA |
| 16 | D5ED | 55EF | D5F9 | 55FB | 55FE | 5643 | 5646 | 5685 | D687 | 568A | D68D | 568F | D699 | 569B | 569E | D6B1 |
| 17 | 56B3 | 56B8 | D6E1 | 56E3 | 56E6 | 5709 | D70B | D70E | 5712 | D715 | 5717 | D71A | 571D | D71F | D729 | 572B |
| 18 | 572E | D732 | 5735 | D737 | 573A | D73D | 573F | D751 | 5753 | 5756 | D762 | 5765 | D767 | 576A | D76D | 576F |
| 19 | D779 | 5778 | 577E | D7A1 | 57A3 | 57A6 | D7C2 | 57C5 | D7C7 | 57CA | D7CD | 57CF | D7D9 | 57DB | 57DE | D7F1 |
| 1A | 57F3 | 57F6 | 5842 | D845 | 5847 | D84A | 584D | D84F | 5859 | D85B | D85E | 5871 | D873 | D876 | D889 | 588B |
| 1B | 588E | D892 | 5895 | D897 | 589A | D89D | 589F | 58A9 | D8AB | D8AE | 58B2 | D8B5 | 5887 | D8BA | 58BD | D8BF |
| 1C | 58D1 | D8D3 | D8D6 | 58E2 | D8E5 | 58E7 | D8EA | 58ED | D8EF | 58F9 | D8FB | D8FE | D911 | 5913 | 5916 | D922 |
| 1D | 5925 | D927 | 592A | D92D | 592F | D939 | 593B | 593E | 5949 | D94B | D94E | 5952 | D955 | 5957 | D95A | 595D |
| 1E | D95F | D969 | 596B | 596E | D972 | 5975 | D977 | 597A | D97D | 597F | 5991 | D993 | D996 | 59A2 | D9A5 | 59A7 |
| 1F | D9AA | 59AD | D9AF | 59B9 | D9BB | D9BE | D9C9 | 59CB | 59CE | D9D2 | 59D5 | D9D7 | 59DA | D9DD | 59DF | 59E9 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 | D9EB | D9EE | 59F2 | D9F5 | 59F7 | D9FA | 59FD | D9FF | DA21 | 5A23 | 5A26 | DA42 | 5A45 | DA47 | 5A4A | DA4D |
| 21 | 5A4F | DA59 | 5A5B | 5A5E | DA71 | 5A73 | 5A76 | 5A89 | DA8B | DA8E | 5A92 | DA95 | 5A97 | DA9A | 5A9D | DA9F |
| 22 | DAA9 | 5AAB | 5AAE | DAB2 | 5AB5 | DAB7 | 5ABA | DABD | 5ABF | DAD1 | 5AD3 | 5ADD | DAE2 | 5AE5 | DAE7 | 5AEA |
| 23 | DAED | 5AEF | DAF9 | 5AFB | 5AFE | 5B11 | DB13 | DB16 | 5B22 | DB25 | 5B27 | DB2A | 5B2D | DB2F | 5B39 | DB3B |
| 24 | DB3E | DB49 | 5B4B | 5B4E | DB52 | 5B55 | DB57 | 5B5A | DB5D | 5B5F | 5B69 | DB6B | DB6E | 5B72 | DB75 | 5B77 |
| 25 | DB7A | 5B7D | DB7F | DB91 | 5B93 | 5B96 | DBA2 | 5BA5 | DBA7 | 5BAA | DBAD | 5BAF | DBB9 | 5BBB | 5BBE | 5BC9 |
| 26 | DBCB | DBCE | 5BD2 | DBD5 | 5BD7 | DBDA | 5BDD | DBDF | DBE9 | 5BE8 | 5BEE | DBF2 | 5BF5 | DBF7 | 5BFA | DBFD |
| 27 | 5BFF | 5C43 | 5C46 | 5C85 | DC87 | 5C8A | DCBD | 5C8F | DC99 | 5C9B | 5C9E | DCB1 | 5CB3 | 5CB6 | DCE1 | 5CE3 |
| 28 | 5CE6 | 5D09 | DD0B | DD0E | 5D12 | DD15 | 5D17 | DD1A | 5D1D | DD1F | DD29 | 5D2B | 5D2E | DD32 | 5D35 | DD37 |
| 29 | 5D3A | DD3D | 5D3F | DD51 | 5D53 | 5D56 | DD62 | 5D65 | DD67 | 5D6A | DD6D | 5D6F | DD79 | 5D7B | 5D7E | DDA1 |
| 2A | 5DA3 | 5DA6 | DDC2 | 5DC5 | DDC7 | 5DCA | DDCD | 5DCF | DDD9 | 5DDB | 5DDE | DDF1 | 5DF3 | 5DF6 | 5E11 | DE13 |
| 2B | DE16 | 5E22 | DE25 | 5E27 | DE2A | 5E2D | DE2F | 5E39 | DE3B | DE3E | DE49 | 5E4B | 5E4E | DE52 | 5E55 | DE57 |
| 2C | 5E5A | DE5D | 5E5F | 5E69 | DE6B | DE6E | 5E72 | DE75 | 5E77 | DE7A | 5E7D | DE7F | DE91 | 5E93 | 5E96 | DEA2 |
| 2D | 5EA5 | DEA7 | 5EAA | DEAD | 5EAF | DEB9 | 5EBB | 5EBE | 5EC9 | DECB | DECE | 5ED2 | DED5 | 5ED7 | DEDA | 5EDD |
| 2E | DEDF | DEE9 | 5EEB | 5EEE | DEF2 | 5EF5 | DEF7 | 5EFA | DEFD | 5EFF | DF21 | 5F23 | 5F26 | DF42 | 5F45 | DF47 |
| 2F | 5F4A | DF4D | 5F4F | DF59 | 5F5B | 5F5E | DF71 | 5F73 | 5F76 | 5F89 | DF8B | DF8E | 5F92 | DF95 | 5F97 | DF9A |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 30 | 5F9D | DF9F | DFA9 | 5FAB | 5FAE | DFB2 | 5FB5 | DF67 | 5F6A | DFBD | 5FBF | DFD1 | 5FD3 | 5FD6 | DFE2 | 5FE5 |
| 31 | DFE7 | 5FEA | DFED | 5FEF | DFF9 | 5FFB | 5FFE | E849 | 684B | 684E | E852 | 6855 | E857 | 685A | E85D | 685F |
| 32 | 6869 | E86B | E86E | 6872 | E875 | 6877 | E87A | 687D | E87F | E891 | 6893 | 6896 | E8A2 | 68A5 | E8A7 | 68AA |
| 33 | E8AD | 68AF | E8B9 | 68BB | 68BE | 68C9 | E8CB | E8CE | 68D2 | E8D5 | 68D7 | E8DA | 68DD | E8DF | E8E9 | 68EB |
| 34 | 68EE | E8F2 | 68F5 | E8F7 | 68FA | E8FD | 68FF | E921 | 6923 | 6926 | E942 | 6945 | E947 | 694A | E94D | 694F |
| 35 | E959 | 695B | 698E | E971 | 6973 | 6976 | 6989 | E98B | E98E | 6992 | E995 | 6997 | E99A | 699D | E99F | E9A9 |
| 36 | 69AB | 69AE | E9B2 | 69B5 | E9B7 | 69BA | E9BD | 69BF | E9D1 | 69D3 | 69D6 | E9E2 | 69E5 | E9E7 | 69EA | E9ED |
| 37 | 695F | E9F9 | 69FB | 69FE | 6A43 | 6A46 | 6A85 | EA87 | 6A8A | EA8D | 6A8F | EA99 | 6A9B | 6A9E | EAB1 | 6AD3 |
| 38 | 6AB6 | EAE1 | 6AE3 | 6AE6 | 6B09 | EB0B | EB0E | 6B12 | EB15 | 6B17 | EB1A | 6B1D | EB1F | EB29 | 6B2B | 6B2E |
| 39 | EB32 | 6B35 | EB37 | 6B3A | EB3D | 6B3F | EB51 | 6B53 | 6B56 | EB62 | 6B65 | EB67 | 6B6A | EB6D | 6B6F | EB79 |
| 3A | 6B7B | 6B7E | EBA1 | 6BA3 | 6BA6 | EBC2 | 6BC5 | EBC7 | 6BCA | EBCD | 6BCF | EBD9 | 6BDB | 6BDE | EBF1 | 6BF3 |
| 3B | 6BF6 | 6C86 | 6D0A | ED0D | 6D0F | ED19 | 6D1B | 6D1E | ED31 | 6D33 | 6D36 | ED61 | 6D63 | 6D66 | 6DC3 | 6DC6 |
| 3C | 6E12 | EE15 | 6E17 | EE1A | 6E1D | EE1F | EE29 | 6E2B | 6E2E | EE32 | 6E35 | EE37 | 6E3A | EE3D | 6E3F | EE51 |
| 3D | 6E53 | 6E56 | EE62 | 6E65 | EE67 | 6E6A | EE6D | 6E6F | EE79 | 6E7B | 6E7E | EEA1 | 6EA3 | 6EA6 | EEC2 | 6EC5 |
| 3E | EEC7 | 6ECA | EECD | 6ECF | EED9 | 6EDB | 6EDE | EEF1 | 6EF3 | 6EF6 | 6F43 | 6F46 | 6F85 | EF87 | 6F8A | EF8D |
| 3F | 6F8F | EF99 | 6F9B | 6F9E | EFB1 | 6FB3 | 6FB6 | EFE1 | 6FE3 | 6FE6 | F089 | 708B | 708E | F092 | 7095 | F097 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 40 | 709A | F09D | 709F | 70A9 | F0AB | F0AE | 70B2 | F0B5 | 70B7 | F0BA | 70BD | F0BF | 70D1 | F0D3 | F0D6 | 70E2 |
| 41 | F0E5 | 70E7 | F0EA | 70ED | F0EF | 70F9 | F0FD | F0FE | F111 | 7113 | 7116 | F122 | 7125 | F127 | 712A | F12D |
| 42 | 712F | F139 | 713B | 713E | 7149 | F14B | F14E | 7152 | F155 | 7157 | F15A | 715D | F15F | F169 | 716B | 716E |
| 43 | F172 | 7175 | F177 | 717A | F17D | 717F | 7191 | F193 | F196 | 71A2 | F1A5 | 71A7 | F1AA | 71AD | F1AF | 71B9 |
| 44 | F1BB | F1BE | F1C9 | 71CB | 71CE | F1D2 | 71D5 | F1D7 | 71DA | F1DD | 71DF | 71E9 | F1EB | F1EE | 71F2 | F1F5 |
| 45 | 71F7 | F1FA | 71FD | F1FF | F221 | 7223 | 7226 | F242 | 7245 | F247 | 724A | F24D | 724F | F259 | 725B | 725E |
| 46 | F271 | 7273 | 7276 | 7289 | F28B | F28E | 7292 | F295 | 7297 | F29A | 729D | F29F | F2A9 | 72AB | 72AE | F2B2 |
| 47 | 72B5 | F2B7 | 72BA | F2BD | 72BF | F2D1 | 72D3 | 72D6 | F2E2 | 72E5 | F2E7 | 72EA | F2ED | 72EF | F2F9 | 72FB |
| 48 | 72FE | 7311 | F313 | F316 | 7322 | F325 | 7327 | F32A | 732D | F32F | 7339 | F33B | F33E | F349 | 734B | 734E |
| 49 | F352 | 7355 | F357 | 735A | F35D | 735F | 7369 | F36B | F36E | 7372 | F375 | 7377 | F37A | 737D | F37F | F391 |
| 4A | 7393 | 7396 | F3A2 | 73A5 | F3A7 | 73AA | F3AD | 73AF | F389 | 73BB | 73BE | 73C9 | F3CB | F3CE | 73D2 | F3D5 |
| 4B | 73D7 | F3DA | 73DD | F3DF | F3E9 | 73EB | 73EE | F3F2 | 73F5 | F3F7 | 73FA | F3FD | 73FF | 7443 | 7446 | 7485 |
| 4C | F487 | 748A | F4BD | 748F | F499 | 749B | 749E | F4B1 | 74B3 | 74B6 | F4E1 | 74E3 | 74E6 | 7509 | F50B | F50E |
| 4D | 7512 | F515 | 7517 | F51A | 751D | F51F | F529 | 7522 | 752A | F532 | 7535 | F537 | 753A | F53D | 753F | F551 |
| 4E | 7553 | 7556 | F562 | 7565 | F567 | 756A | F56D | 756F | F579 | 757B | 757E | F5A1 | 75A3 | 75A6 | F5C2 | 75C5 |
| 4F | F5C7 | 75CA | F5CD | 75CF | F5D9 | 75DB | 75DE | F5F1 | 75F3 | 75F6 | 7611 | F613 | F616 | 7622 | F625 | 7627 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 50 | F62A | 762D | F62F | 7639 | F63B | F63E | F649 | 764B | 764E | F652 | 7655 | F657 | 765A | F65D | 765F | 7669 |
| 51 | F66B | F66E | 7672 | F675 | 7677 | F67A | 767D | F67F | F691 | 7693 | 7696 | F6A2 | 76A5 | F6A7 | 76AA | F6AD |
| 52 | 76AF | F6B9 | 76BB | 76BE | 76C9 | F6CB | F6CE | 76D2 | F6D5 | 76D7 | F6DA | 76DD | F6DF | F6E9 | 76EB | 76EE |
| 53 | F6F2 | 76F5 | F6F7 | 76FA | F6FD | 76FF | F721 | 7723 | 7726 | F742 | 7745 | F747 | 774A | F74D | 774F | F759 |
| 54 | 775B | 775E | F771 | 7773 | 7776 | 7789 | F78B | F78E | 7792 | F795 | 7797 | F79A | 779D | F79F | F7A9 | 77AB |
| 55 | 77AE | F7B2 | 77B5 | F7B7 | 77BA | F7BD | 77BF | F7D1 | 77D3 | 77D6 | F7E2 | 77E5 | F7E7 | 77EA | F7ED | 77EF |
| 56 | F7F9 | 77FB | 77FE | 7886 | 790A | F90D | 790F | F915 | 791B | 791E | F931 | 7933 | 7936 | F961 | 7963 | 7966 |
| 57 | 79C3 | 79C6 | 7A12 | FA15 | 7A17 | FA1A | 7A1D | FA1F | FA29 | 7A2B | 7A2E | FA32 | 7A35 | FA37 | 7A3A | FA3D |
| 58 | 7A3F | FA51 | 7A53 | 7A56 | FA62 | 7A65 | FA67 | 7A6A | FA6D | 7A6F | FA79 | 7A7B | 7A7E | FAA1 | 7AA3 | 7AA6 |
| 59 | FAC2 | 7AC5 | FAC7 | 7ACA | FACD | 7ACF | FAD9 | 7ADB | 7ADE | FAF1 | 7AF3 | 7AF6 | 7B43 | 7B46 | 7B85 | FB87 |
| 5A | 7BBA | FB8D | 7B8F | FB99 | 7B9B | 7B9E | FBB1 | 7BB3 | 7BB6 | FBE1 | 7BE3 | 7BE6 | 7C22 | FC25 | 7C27 | FC2A |
| 5B | 7C2D | FC2F | 7C39 | FC3B | FC3E | FC49 | 7C4B | 7C4E | FC52 | 7C55 | FC57 | 7C5A | FC5D | 7C5F | 7C69 | FC6B |
| 5C | FC6E | 7C72 | FC75 | 7C77 | FC7A | 7C7D | FC7F | FC91 | 7C93 | 7C96 | FCA2 | 7CA5 | FCA7 | 7CAA | FCAD | 7CAF |
| 5D | FCB9 | 7CBB | 7CBE | 7CC9 | FCCB | FCCE | 7CD2 | FCD5 | 7CD7 | FCDA | 7CDD | FCDF | FCE9 | 7CEB | 7CEE | FCF2 |
| 5E | 7CF5 | FCF7 | 7CFA | FCFD | 7CFF | FD21 | 7D23 | 7D26 | FD42 | 7D45 | FD47 | 7D4A | FD4D | 7D4F | FD59 | 7D5B |
| 5F | 7D5E | FD71 | 7D73 | 7D76 | 7D89 | FD8B | FD8E | 7D92 | FD95 | 7D97 | FD9A | 7D9D | FD9F | FDA9 | 7DAB | 7DAE |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 60 | FDB2 | 7DB5 | FDB7 | 7DBA | FDBD | 7DBF | FDD1 | 7DD3 | 7DD6 | FDE2 | 7DE5 | FDE7 | 7DEA | FDED | 7DEF | FDF9 |
| 61 | 7DFB | 7DFE | 7E43 | 7E46 | 7E85 | FE87 | 7E8A | FE8D | 7E8F | FE99 | 7E9B | 7E9E | FEB1 | 7EB3 | 7EB6 | FEE1 |
| 62 | 7EE3 | 7EE6 | 7F09 | FF0B | FF0E | 7F12 | FF15 | 7F17 | FF1A | 7F1D | FF1F | FF29 | 7F2B | 7F2E | FF32 | 7F35 |
| 63 | FF37 | 7F3A | FF3D | 7F3F | FF51 | 7F53 | 7F56 | FF62 | 7F65 | FF67 | 7F6A | FF6D | 7F6F | FF79 | 7F7B | 7F7E |
| 64 | FFA1 | 7FA3 | 7FA6 | FFC2 | 7FC5 | FFC7 | 7FCA | FFCD | 7FCF | FFD9 | 7FDB | 7FDE | FFF1 | 7FF3 | 7FF6 | 0842 |
| 65 | 8845 | 0847 | 884A | 084D | 884F | 0859 | 885B | 885E | 0871 | 8873 | 8876 | 8889 | 088B | 088E | 8892 | 0895 |
| 66 | 8897 | 089A | 889D | 089F | 08A9 | 88AB | 88AE | 08B2 | 88B5 | 08B7 | 88BA | 08BD | 88BF | 08D1 | 88D3 | 88D6 |
| 67 | 08E2 | 88E5 | 08E7 | 88EA | 08ED | 88EF | 08F9 | 88FB | 88FE | 8911 | 0913 | 0916 | 8922 | 0925 | 8927 | 092A |
| 68 | 892D | 092F | 8939 | 093B | 093E | 0949 | 894B | 894E | 0952 | 8955 | 0957 | 895A | 095D | 895F | 8969 | 096B |
| 69 | 096E | 8972 | 0975 | 8977 | 097A | 897D | 097F | 0991 | 8993 | 8996 | 09A2 | 89A5 | 09A7 | 89AA | 09AD | 89AF |
| 6A | 09B9 | 99BB | 89BB | 89C9 | 09CB | 09CE | 89D2 | 09D5 | 89D7 | 09DA | 89DD | 09DF | 09E9 | 89EB | 89EE | 09F2 |
| 6B | 89F5 | 09F7 | 89FA | 09FD | 89FF | 8A21 | 0A23 | 0A26 | 8A42 | 0A45 | 8A47 | 0A4A | 8A4D | 0A4F | 8A59 | 0A5B |
| 6C | 0A5E | 8A71 | 0A73 | 0A76 | 0A89 | 8A8B | 8A8E | 0A92 | 8A95 | 0A97 | 8A9A | 0A9D | 8A9F | 8AA9 | 0AA2 | 0AAE |
| 6D | 8AB2 | 0AB5 | 8AB7 | 0ABA | 8ABD | 0ABF | 8AD1 | 0AD3 | 0AD6 | 8AE2 | 0AE5 | 8AE7 | 0AEA | 8AED | 0AEF | 8AF9 |
| 6E | 0AFB | 0AFE | 0B11 | 8B13 | 8B16 | 0B22 | 8B25 | 0B27 | 8B2A | 0B2D | 8B2F | 0B39 | 8B3B | 8B3E | 8B49 | 0B4B |
| 6F | 0B4E | 8B52 | 0B55 | 8B57 | 0B5A | 8B5D | 0B5F | 0B69 | 8B6B | 8B6E | 0B72 | 8B75 | 0B77 | 8B7A | 0B7D | 8B7F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 70 | 8B91 | 0B93 | 0B96 | 8BA2 | 0BA5 | 8BA7 | 0BAA | 8BAD | 0BAF | 8BB9 | 0BBB | 0BBE | 0BC9 | 8BCB | 8BCE | 0BD2 |
| 71 | 8BD5 | 0BD7 | 8BDA | 0BDD | 8BDF | 8BE9 | 0BEB | 0BEE | 8BF2 | 0BF5 | 8BF7 | 0BFA | 8BFD | 0BFF | 0B43 | 0B46 |
| 72 | 0C85 | 8C87 | 0C8A | 8CBD | 0C8F | 8C99 | 0C9B | 0C9E | 8CB1 | 0CB3 | 0CB6 | 8CE1 | 0CE3 | 0CE6 | 0C09 | 8C0B |
| 73 | 8D0E | 0D12 | 8D15 | 0D17 | 8D1A | 0D1D | 9D1F | 8D29 | 0D2B | 0D2E | 8D32 | 0D35 | 8D37 | 0D3A | 8D3D | 0D3F |
| 74 | 8D51 | 0D53 | 0D56 | 8D62 | 0D65 | 8D67 | 0D6A | 8D6D | 0D6F | 8D79 | 0D7B | 0D7E | 8DA1 | 0DA3 | 0DA6 | 8DC2 |
| 75 | 0DC5 | 8DC7 | 0DCA | 8DCD | 0DCF | 8DD9 | 0DDB | 0DDE | 8DF1 | 0DF3 | 0DF6 | 0E11 | 8E13 | 8E16 | 0E22 | 8E25 |
| 76 | 0E27 | 8E2A | 0E2D | 8E2F | 0E39 | 8E3B | 8E3E | 8E49 | 0E4B | 0E4E | 8E52 | 0E55 | 8E57 | 0E5A | 8E5D | 0E5F |
| 77 | 0E69 | 8E6B | 8E6E | 0E72 | 8E75 | 0E77 | 8E7A | 0E7D | 8E7F | 8E91 | 0E93 | 0E96 | 8EA2 | 0EA5 | 8EA7 | 0EAA |
| 78 | 8EAD | 0EAF | 8EB9 | 0EBB | 0EBE | 0EC9 | 8ECB | 8ECE | 0ED2 | 8ED5 | 0ED7 | 8EDA | 0EDD | 8EDF | 8EE9 | 0EEB |
| 79 | 0EEE | 8EF2 | 0EF5 | 8EF7 | 0EFA | 8EFD | 0EFF | 8E21 | 0F23 | 0F26 | 8F42 | 0F45 | 8F47 | 0F4A | 8F4D | 0F4F |
| 7A | 8F59 | 0F5B | 0F5E | 8F71 | 0F73 | 0F76 | 0F8B | 8F8B | 8F8E | 0F92 | 8F95 | 0F97 | 8F9A | 0F9D | 8F9F | 8FA9 |
| 7B | 0FAB | 0FAE | 8FB2 | 0FB5 | 8FB7 | 0FBA | 8FBD | 0FBF | 8FD1 | 0FD3 | 0FD6 | 8FE2 | 0FE5 | 8FE7 | 0FEA | 8FED |
| 7C | 0FEF | 8FF9 | 0FFB | 0FFE | 9085 | 1087 | 908A | 108D | 908F | 1099 | 909B | 909E | 10B1 | 90B3 | 90B6 | 10E1 |
| 7D | 90E3 | 90E6 | 9109 | 110B | 110E | 9112 | 1115 | 9117 | 111A | 911D | 111F | 1129 | 912B | 912E | 1132 | 9135 |
| 7E | 1137 | 913A | 113D | 913F | 1151 | 9153 | 9156 | 1162 | 9165 | 1167 | 916A | 116D | 916F | 1179 | 917B | 917E |
| 7F | 11A1 | 91A3 | 81A6 | 11C2 | 91C5 | 11C7 | 91CA | 11CD | 91CF | 11D9 | 91DB | 91DE | 11F1 | 91F3 | 91F6 | 9211 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 80 | 1213 | 1216 | 9222 | 1225 | 9227 | 122A | 922D | 122F | 9239 | 123B | 123E | 1249 | 924B | 924E | 1252 | 9255 |
| 81 | 1257 | 925A | 125D | 925F | 9269 | 126B | 126E | 9272 | 1275 | 9277 | 127A | 927D | 127F | 1291 | 9293 | 9296 |
| 82 | 12A2 | 92A5 | 12A7 | 92AA | 12AD | 92AF | 12B0 | 92BB | 92BE | 92C9 | 12CB | 12CE | 92D2 | 12D5 | 92D7 | 12DA |
| 83 | 92DD | 12DF | 12E9 | 92EB | 92EE | 12F2 | 92F5 | 13F7 | 92FA | 12FD | 92FF | 1321 | 9323 | 9326 | 1342 | 9345 |
| 84 | 1347 | 934A | 134D | 934F | 1359 | 935B | 935E | 1371 | 9373 | 9376 | 9389 | 13BB | 138E | 9392 | 1395 | 9397 |
| 85 | 139A | 939D | 139F | 13A9 | 93AB | 93AE | 13B2 | 93B5 | 13B7 | 93BA | 138D | 93BF | 13D1 | 93D3 | 93D6 | 13E2 |
| 86 | 93E5 | 13E7 | 93EE | 13ED | 93EF | 13F9 | 93FB | 94FE | 9421 | 1423 | 1426 | 9442 | 1445 | 9447 | 144A | 944D |
| 87 | 144F | 9459 | 145D | 145E | 9471 | 1473 | 1476 | 1489 | 948B | 948E | 1492 | 9495 | 1497 | 949A | 149D | 949F |
| 88 | 94A9 | 14AB | 14AE | 94B2 | 14B5 | 94B7 | 14BA | 958D | 14BF | 94D1 | 14D3 | 14D6 | 94E2 | 14E5 | 94E7 | 14EA |
| 89 | 94ED | 14EF | 94F9 | 14FB | 14FE | 1511 | 9513 | 9516 | 1522 | 9525 | 1527 | 952A | 152D | 952F | 1539 | 953B |
| 8A | 953E | 9549 | 1548 | 154E | 9552 | 1555 | 9557 | 155A | 955D | 155F | 1569 | 956B | 956E | 1572 | 9575 | 1577 |
| 8B | 957A | 157D | 957F | 9591 | 1593 | 1596 | 95A2 | 15A5 | 95A7 | 15AA | 95AD | 15AF | 95B9 | 15BB | 15BE | 15C9 |
| 8C | 95CB | 95CE | 15D2 | 95D5 | 15D7 | 95DA | 15DD | 95DF | 95A9 | 15EB | 15EE | 95F2 | 15F5 | 95F7 | 15FA | 95FD |
| 8D | 15FF | 1621 | 9623 | 9626 | 1642 | 9645 | 1647 | 964A | 164D | 964F | 1659 | 9658 | 965E | 1671 | 9673 | 9676 |
| 8E | 9689 | 1688 | 168E | 969E | 1695 | 9697 | 169A | 969D | 169F | 16A9 | 96AB | 96AE | 16B2 | 96B5 | 16B7 | 96BA |
| 8F | 16BD | 96B4 | 16D1 | 96D3 | 96D6 | 16E2 | 96E5 | 16E7 | 96EA | 16ED | 96EF | 16F9 | 96FB | 96FE | 9711 | 1713 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 90 | 1716 | 9722 | 1725 | 9727 | 172A | 972D | 172F | 9739 | 173B | 173E | 1749 | 974B | 974E | 1752 | 9755 | 1757 |
| 91 | 975A | 175D | 975F | 9769 | 176B | 176E | 9772 | 1775 | 9777 | 177A | 977D | 177F | 1791 | 9793 | 9796 | 17A2 |
| 92 | 97A5 | 17A7 | 97AA | 17AD | 97AF | 17B9 | 97BB | 97BE | 97C9 | 17CB | 17CE | 97D2 | 17D5 | 97D7 | 17DA | 97DD |
| 93 | 17DF | 17E9 | 97EB | 97EE | 17F2 | 97F5 | 17F7 | 97FA | 17FD | 97FF | 1843 | 18A6 | 1885 | 9887 | 188A | 9B8D |
| 94 | 188F | 9899 | 189B | 189E | 98B1 | 18B3 | 18B6 | 98E1 | 18E3 | 18E6 | 1909 | 990B | 990E | 1912 | 9915 | 1917 |
| 95 | 991A | 191D | 991F | 9929 | 192B | 192E | 9932 | 1935 | 9937 | 193A | 993D | 193F | 9951 | 1953 | 1956 | 9962 |
| 96 | 1965 | 9967 | 196A | 996D | 196F | 9979 | 197B | 197E | 99A1 | 19A3 | 19A6 | 99C2 | 19C5 | 99C7 | 19CA | 99CD |
| 97 | 19CF | 99D9 | 19DB | 19DE | 99F1 | 19F3 | 19F6 | 1A11 | 9A13 | 9A16 | 1A22 | 9A25 | 1A27 | 9A2A | 1A2D | 9A2F |
| 98 | 1A39 | 9A3B | 9A3E | 9A49 | 1A4B | 1A4E | 9A52 | 1A55 | 9A57 | 1A5A | 9A5D | 1A5F | 1A65 | 9A6B | 9A6E | 1A72 |
| 99 | 9A75 | 1A77 | 9A7A | 1A7D | 9A7F | 9A91 | 1A93 | 1A96 | 9AA2 | 1AA5 | 9AA7 | 1AAA | 9AAD | 1AAF | 9AB9 | 1ABB |
| 9A | 1ABE | 1AC9 | 9ACB | 9ACE | 1AD2 | 9AD5 | 1AD7 | 9ADA | 1ADD | 9ADF | 9AE9 | 1AEB | 1AEE | 9AF2 | 1AF5 | 9AF7 |
| 9B | 1AFA | 9AFD | 1AFF | 9B21 | 1B23 | 1B26 | 9B42 | 1B45 | 9B47 | 1B4A | 9B4D | 1B4F | 9B59 | 1B5B | 1B5E | 9B71 |
| 9C | 1B73 | 1B76 | 1B89 | 9BBB | 9B8E | 1B92 | 9B95 | 1B97 | 9B9A | 1B9D | 9B9F | 9BA9 | 1BAB | 1BAE | 9BB2 | 1BB5 |
| 9D | 9BB7 | 1BBA | 9BBD | 1BBF | 9BD1 | 1BD3 | 1BD6 | 9BE2 | 1BE5 | 9BE7 | 1BEA | 9BED | 1BEF | 9BF9 | 1BFB | 1BFE |
| 9E | 1C21 | 9C23 | 9C26 | 1C42 | 9C45 | 1C47 | 9C4A | 1C4D | 9C4F | 1C55 | 9C5B | 9C5E | 1C71 | 9C73 | 9C76 | 9C89 |
| 9F | 1C8B | 1C8E | 9C92 | 1C95 | 9C97 | 1C9A | 9C9D | 1C9F | 1CA9 | 9CAB | 9CAE | 1CB2 | 9CB5 | 1CB7 | 9CBA | 1CBD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| A0 | 9CBF | 1CD1 | 9CD3 | 9CD6 | 1CE2 | 9CE5 | 1CE7 | 9CEA | 1CED | 9CEF | 1CF9 | 9CFB | 9CFE | 9D11 | 1D13 | 1D16 |
| A1 | 9D22 | 1D25 | 9D27 | 1D2A | 9D2D | 1D2F | 9D39 | 1D3B | 1D3E | 1D49 | 9D4B | 9D4E | 1D52 | 9D55 | 1D57 | 9D5A |
| A2 | 1D5D | 9D5F | 9D69 | 1D6B | 1D6E | 9D72 | 1D75 | 9D77 | 1D7A | 9D7D | 1D7F | 1D91 | 9D93 | 9D96 | 1DA2 | 9DA5 |
| A3 | 1DA7 | 9DAA | 1DAD | 9DAF | 1DB9 | 9DBB | 9DBE | 9DC9 | 1DCB | 1DCE | 9DD2 | 1DD5 | 9DD7 | 1DDA | 9DDD | 1DDF |
| A4 | 1DE9 | 9DEB | 9DEE | 1DF2 | 9DF9 | 1DF7 | 9DFA | 1DFD | 9DFF | 9E21 | 1E23 | 1E26 | 9E42 | 1E45 | 9E47 | 1E4A |
| A5 | 9E4D | 1E4F | 9E59 | 1E5B | 1E5B | 9E71 | 1E73 | 1E76 | 1E89 | 9E8B | 9E8E | 1E92 | 9E95 | 1E97 | 9E9A | 1E9D |
| A6 | 9E9F | 9EA9 | 1EAB | 1EAE | 9EB2 | 1EB5 | 9EB7 | 1EBA | 9EBD | 1EBF | 9ED1 | 1ED3 | 1ED6 | 9EE2 | 1EE5 | 9EE7 |
| A7 | 1EEA | 9EED | 1EEF | 9EF9 | 1EFB | 1EFE | 1F11 | 9F13 | 9F16 | 1F22 | 9F25 | 1F27 | 9F2A | 1F2D | 9F2F | 1F39 |
| A8 | 9F3B | 9F3E | 9F49 | 1F4B | 1F4E | 9F52 | 1F55 | 9F57 | 1F5A | 9F5D | 1F5F | 1F69 | 9F6B | 9F6E | 1F72 | 9F7D |
| A9 | 1F77 | 9F7A | 1F7D | 9F7F | 9F91 | 1F93 | 1F96 | 9FA2 | 1FA5 | 9FA7 | 1FAA | 9FAD | 1FAF | 9FB9 | 1FBB | 1FBE |
| AA | 1FC9 | 9FCB | 9FCE | 1FD2 | 9FD5 | 1FD7 | 9FDA | 1FDD | 9FDF | 9FE9 | 1FEB | 1FEE | 9FF2 | 1FF5 | 9FF7 | 1FFA |
| AB | 9FFD | 1FFF | A10A | 210D | A10F | 2119 | A11B | A11E | 2131 | A133 | A136 | 2161 | A163 | A166 | A1C3 | A1C6 |
| AC | A212 | 2215 | A217 | 221A | A21D | 221F | 2229 | A22B | A22E | 2232 | A235 | 2237 | A23A | 223D | A23F | 2251 |
| AD | A253 | A256 | 2262 | A265 | 2267 | A26A | 226D | A26F | 2279 | A27B | A27E | 22A1 | A2A3 | A2A6 | 22C2 | A2C5 |
| AE | 22C7 | A2CA | 22CD | A2CF | 22D9 | A2DB | A2DE | 22F1 | A2F3 | A2F6 | A343 | A346 | A385 | 2387 | A38A | 238D |
| AF | A38F | 2399 | A39B | A39E | 23B1 | A3B3 | A3B6 | 23E1 | A3E3 | A3E6 | A422 | 2425 | A427 | 242A | A42D | 242F |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| B0 | A439 | 243B | 243E | 2449 | A44B | A44E | 2452 | A455 | 2457 | A45A | 245D | A45F | A469 | 246B | 246E | A472 |
| B1 | 2475 | A477 | 247A | A47D | 247F | 2491 | A493 | A496 | 24A2 | A4A5 | 24A7 | A4AA | 24AD | A4AF | 24B9 | A4BB |
| B2 | A4BE | A4C9 | 24C8 | 24CE | A4D2 | 24D5 | A4D7 | 24DA | A4DD | 24DF | 24E9 | A4EB | A4EE | 24F2 | A4F5 | 24F7 |
| B3 | A4FA | 24FD | A4FF | 2521 | A523 | A526 | 2542 | A545 | 2547 | A54A | 254D | A54F | 2555 | A55B | A55E | 2571 |
| B4 | A573 | A576 | A589 | 258B | 258E | A592 | 2595 | A597 | 259A | A59D | 259F | 25A9 | A5AB | A5AE | 25B2 | A5B5 |
| B5 | 25B7 | A5BA | 258D | A5BF | 25D1 | A5D3 | A5D6 | 25E2 | A5E5 | 25E7 | A5EA | 25ED | A5EF | 25F9 | A5FB | A5FE |
| B6 | A643 | A646 | A685 | 2687 | A68A | 268D | A68F | 2699 | A69B | A69E | 26B1 | A6B3 | A6B6 | 26E1 | A6E3 | A6E6 |
| B7 | A709 | 270B | 270E | A712 | 2715 | A717 | 271A | A71D | 271F | 2729 | A72B | A72E | 2732 | A735 | 2737 | A73A |
| B8 | 273D | A73F | 2751 | A753 | A756 | 2762 | A765 | 2767 | A76A | 276D | A76F | 2779 | A77B | A77E | 27A1 | A7A3 |
| B9 | A7A6 | 27C2 | A7C5 | 27C7 | A7CA | 27CD | A7CF | 27D9 | A7DB | A7DE | 27F1 | A7F3 | A7F6 | A842 | 2845 | A847 |
| BA | 284A | A84D | 284F | A859 | 285B | 285E | A871 | 2873 | 2876 | 2889 | A88B | A88E | 2892 | A895 | 2897 | A89A |
| BB | 289D | A89F | A8A9 | 28AB | 28AE | A8B2 | 28B5 | A8B7 | 28BA | A8BD | 28BF | A8D1 | 28D3 | 28D6 | A8E2 | 28E5 |
| BC | A8E7 | 28EA | A8ED | 28EF | A8F9 | 28FB | 28FE | 2911 | A913 | A916 | 292E | A925 | 2927 | A92A | 292D | A92F |
| BD | 2939 | A93B | A93E | A949 | 294B | 294E | A952 | 2955 | A957 | 295A | A95D | 295F | 2969 | A96B | A96E | 2972 |
| BE | A975 | 2977 | A97A | 297D | A97F | A991 | 2993 | 2996 | A9A2 | 29A5 | A9A7 | 29AA | A9AD | 29AF | A9B9 | 29BB |
| BF | 29BE | 29C9 | A9CB | A9CE | 29D2 | A9D5 | 29D7 | A9DA | 29DD | A9DF | A9E9 | 29EB | 29EE | A9F2 | 29F5 | A9F7 |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| C0 | 29FA | A9FD | 29FF | 2A21 | AA23 | AA26 | 2A42 | AA45 | 2A47 | AA4A | 2A4D | AA4F | 2A55 | AA5B | AA5E | 2A71 |
| C1 | AA73 | AA76 | AA89 | 2A8B | 2A8E | AA92 | 2A95 | AA97 | 2A9A | AA9D | 2A9F | 2A99 | AAAB | AAAE | 2AB2 | AAB5 |
| C2 | 2AB7 | AABA | 2ABD | AABF | 2AD1 | AAD3 | AAD0 | 2AE2 | AAE5 | 2AE7 | AAEA | 2AAD | AAEF | 2AF9 | AAFB | AAFE |
| C3 | AB11 | 2B13 | 2B16 | AB22 | 2B25 | AB27 | 2B2A | AB2D | 2B2F | AB39 | 2B3B | 2B3E | 2B49 | AB4B | AB4E | 2B52 |
| C4 | AB55 | 2B57 | AB5A | 2B5D | AB5F | AB69 | 2B6B | 2B6E | AB72 | 2B75 | AB77 | 2B7A | AB7D | 2B7F | 2B91 | AB93 |
| C5 | AB96 | 2BA2 | ABA5 | 2BA7 | ABAA | 2BAD | ABAF | 2BB9 | ABBB | ABBE | ABC9 | 2BCB | 2BCE | ABD2 | 2BD5 | ABD7 |
| C6 | 2BDA | ABDD | 2BDF | 2BE9 | ABEB | ABEE | 2BF2 | ABF5 | 2BF7 | ABFA | 2BFD | ABFF | AC43 | AC46 | AC85 | 2C87 |
| C7 | AC8A | 2C8D | AC8F | 2C99 | AC9B | AC9E | 2CB1 | AC83 | ACB6 | 2CE1 | ACE3 | ACE6 | AD09 | 2D0B | 2D0E | AD12 |
| C8 | 2D15 | AD17 | 2D1A | AD1D | 2D1F | 2D29 | AD2B | AD2E | 2D32 | AD35 | 2D37 | AD3A | 2D3D | AD3F | 2D51 | AD53 |
| C9 | AD56 | 2D62 | AD65 | 2D67 | AD6A | 2D6D | AD6F | 2D79 | AD7B | AD7E | 2DA1 | ADA3 | ADA6 | 2DC2 | ADC5 | 2DC7 |
| CA | ADCA | 2DCD | ADCF | 2DD9 | ADDB | ADDE | 2DF1 | ADF3 | ADF6 | AE11 | 2E13 | 2E16 | AE22 | 2E25 | AE27 | 2E2A |
| CB | AE2D | 2E2F | AE39 | 2E3B | 2E3E | 2E49 | AE4B | AE4E | 2E52 | AE55 | 2E57 | AE5A | 2E5D | AE5F | AE69 | 2E6B |
| CC | 2E6E | AE72 | 2E75 | AE77 | 2E7A | AE7D | 2E7F | 2E91 | AE93 | AE96 | 2EA2 | AEA5 | 2EA7 | AEAA | 2EAD | AEAF |
| CD | 2E89 | AEBB | AEBE | AEC9 | 2ECB | 2ECE | AEB2 | 2ED5 | AED7 | 2EDA | AEDD | 2EDF | 2EE9 | AEEB | AEEE | 2EF2 |
| CE | AEF5 | 2EF7 | AEFA | 2EFD | AEFF | 2F21 | AF23 | AF26 | 2F42 | AF45 | 2F47 | AF4A | 2F4D | AF4F | 2F59 | AF5B |
| CF | AF5E | 2F71 | AF73 | AF76 | AF89 | 2F8B | 2F8E | AF92 | 2F95 | AF97 | 2F9A | AF9D | 2F9F | 2FA5 | AFAB | AFAE |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| D0 | 2FB2 | AFB5 | 2FB7 | AFBA | 2FBD | AFBF | 2FD1 | AFD3 | AFD6 | 2FE2 | AFE5 | 2FE7 | AFEA | 2FED | AFEF | 2FF9 |
| D1 | AFFB | AFFE | 3085 | B087 | 308A | B08D | 308F | B099 | 309B | 309E | B0B1 | 30B3 | 30B6 | B0E1 | 30E3 | 30E6 |
| D2 | 3109 | B10B | B10E | 3112 | B115 | 3117 | B11A | 311D | B11F | B129 | 312B | 312E | B132 | 3135 | B137 | 313A |
| D3 | B13D | 313F | B151 | 3153 | 3156 | B162 | 3165 | B167 | 316A | B16D | 316F | B179 | 317B | 317E | B1A1 | 31A3 |
| D4 | 31A6 | B1C2 | 31C5 | B1C7 | 31CA | B1CD | 31CF | B1D9 | 31DB | 31DE | B1F1 | 31F3 | 31F6 | 3211 | B213 | B216 |
| D5 | 3222 | B225 | 3227 | B22A | 322D | B22F | 3239 | B23B | B23E | B249 | 324B | 324E | B252 | 3255 | B257 | 325A |
| D6 | B25D | 325F | 3269 | B26B | B26E | 3272 | B275 | 3277 | B27A | 327D | B27F | B291 | 3293 | 3296 | B2A2 | 32A5 |
| D7 | B2A7 | 32AA | B2AD | 32AF | B289 | 32BB | 32BE | 32C9 | B2CB | B2CE | 32D2 | B2D5 | 32D7 | B2DA | 32DD | B2DF |
| D8 | B2E9 | 32EB | 32EE | B2F2 | 32F5 | B2F7 | 32FA | B2FD | 32FF | B321 | 3323 | 3326 | B342 | 3345 | B347 | 334A |
| D9 | B34D | 334F | B359 | 335B | 335E | B371 | 3373 | 3376 | 3389 | B38B | B38E | 3392 | B395 | 3397 | B39A | 339D |
| DA | B39F | B3A9 | 33AB | 33AE | B3B2 | 33B5 | B3B7 | 33BA | B3BD | 33BF | B3D1 | 33D3 | 33D6 | B3E2 | 3325 | B3E7 |
| DB | 33EA | B3ED | 33EF | B3F9 | 33FB | 33FE | 3421 | B423 | B426 | 3442 | B445 | 3447 | B44A | 344D | B44F | 3459 |
| DC | B45B | B45E | 3471 | B473 | B476 | B489 | 348B | 348E | B492 | 3495 | B497 | 349A | B49D | 349F | 34A9 | B4AB |
| DD | B4AE | 34B2 | B4B5 | 34B7 | B4BA | 34BD | B4BF | 34D1 | B4D3 | B4D6 | 34E2 | B4E5 | 34E7 | B4EA | 34ED | B4EF |
| DE | 34F9 | B4FB | B4FE | B511 | 3513 | 3516 | B522 | 3525 | B527 | 352A | B52D | 352F | B539 | 353B | 353E | 3549 |
| DF | B54B | B54E | 3552 | B555 | 3557 | B55A | 355D | B55F | B569 | 356B | 356E | B572 | 3575 | B577 | 357A | B57D |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| E0 | 357F | 3591 | B593 | B596 | 35A2 | B5A5 | 35A7 | B5AA | 35AD | B5AF | 35BB | B5BB | B5BE | B5C9 | 35CB | 35CE |
| E1 | B5D2 | 35D5 | B5D7 | 35DA | B5DD | 35DF | 35E9 | B5EB | B5EE | 35F2 | B5F5 | 35F7 | B5FA | 35FD | B5FF | B621 |
| E2 | 3623 | 3626 | B642 | 3645 | B647 | 364A | B64D | 364F | B659 | 365B | 365E | B671 | 3673 | 3676 | 3689 | B68B |
| E3 | B68E | 3692 | B695 | 3697 | B69A | 369D | B69F | B6A9 | 36AB | 36AE | B6B2 | 36B5 | B6B7 | 363A | B6BD | 36BF |
| E4 | B6D1 | 36D3 | 36D6 | B6E2 | 36B5 | B6E7 | 36EA | B6ED | 36EF | B6F9 | 36FB | 36FE | 3711 | B713 | B716 | 3722 |
| E5 | B725 | 3727 | B72A | 372D | B72F | 3739 | B73B | B73E | B749 | 374B | 374E | B752 | 3755 | B757 | 375A | B75D |
| E6 | 375F | 3769 | B76B | B76B | 3772 | B775 | 3777 | B77A | 377D | B77F | B791 | 3793 | 3796 | B7A2 | 37A5 | B7A7 |
| E7 | 37AA | B7AD | 37AF | B7B9 | 37BB | 37BE | 37C9 | B7CB | B7CE | 37D2 | B7D5 | 37D7 | B7DA | 37DD | B7DF | B7D9 |
| E8 | 37EB | 37EE | B7F2 | 37F5 | B7F7 | 37FA | B7FD | 37FF | B843 | B846 | B885 | 3887 | B8BA | 388D | B88F | 3899 |
| E9 | B89B | B89E | 38B1 | B8B3 | B8B6 | 38E1 | B8B3 | B8E6 | B909 | 390B | 390E | B912 | 3915 | B917 | 391A | B91D |
| EA | 391F | 3929 | B92B | B92E | 3932 | B935 | 3937 | B93A | 393D | B93F | 3951 | B953 | B956 | 3962 | B965 | 3967 |
| EB | B96A | 396D | B96F | 3979 | B97B | B97E | 39A1 | B9A3 | B9A6 | 39C2 | B9C5 | 39C7 | B9CA | 39CD | B9CF | 39D9 |
| EC | B9DB | B9DE | 39F1 | B9F3 | B9F6 | BA11 | 3A13 | 3A16 | BA22 | 3A25 | BA27 | 3A2A | BA2D | 3A2F | BA39 | 3A3B |
| ED | 3A32 | 3A49 | BA4B | BA4E | 3A52 | BA55 | 3A57 | BA5A | 3A5D | BA5F | BA69 | 3A6B | 3A6E | BA72 | 3A75 | BA77 |
| EE | 3A7A | BA7D | 3A7F | 3A91 | BA93 | BA96 | 3AA2 | BAA5 | 3AA7 | BAAA | 3AAD | BAAF | 3AB9 | BABB | BABE | BAC9 |
| EF | 3ACB | 3ACE | BAD2 | 3AD5 | BAD7 | 3ADA | BADD | 3ADF | 3AE9 | BAEB | BAEE | 3AF2 | BAF5 | 3AF7 | BAFA | 3AFD |

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| F0 | BAFF | 3B21 | BB23 | BB26 | 3B42 | BB45 | 3B47 | BB4A | 3B4D | BB4F | 3B59 | BB5B | BB5E | 3B71 | BB73 | BB76 |
| F1 | BB89 | 3B8B | 3B8E | BB92 | 3B95 | BB97 | 3B9A | BB9D | 3B9F | 3BA9 | BBAB | BBAE | 3BB2 | BBB5 | 3BB7 | BBBA |
| F2 | 3BBD | BBBF | 3BD1 | BBD3 | BBD6 | 3BE2 | 3BE5 | 3BE7 | BBEA | 3BED | BBEF | 3BF9 | BBFB | BBFE | BC21 | 3C23 |
| F3 | 3C26 | BC42 | 3C45 | BC47 | 3C4A | BC4D | 3C4F | BC59 | 3C5B | 3C53 | BC71 | 3C73 | 3C76 | 3C89 | BC8B | BC8E |
| F4 | 3C92 | BC95 | 3C97 | BC9A | 3C9D | BC9F | BCA9 | 3CAB | 3CAE | BCB2 | 3CB5 | BCB7 | 3CBA | BCBD | 3CBF | BCD1 |
| F5 | 3CD3 | 3CD6 | BCE2 | 3CE5 | BCE7 | 3CDA | BCED | 3CEF | BCF9 | 3CFB | 3CFE | 3D11 | BD13 | BD16 | 3D22 | BD25 |
| F6 | 3D27 | BD2A | 3D2D | BD2F | 3D39 | BD3B | BD3B | BD49 | 3D48 | 3D4E | BD52 | 3D55 | BD57 | 3D5A | BD5D | 3D5F |
| F7 | 3D69 | BD6B | BD6E | 3D72 | BD75 | 3D77 | BD7A | 3D7D | BD7F | BD91 | 3D93 | 3D96 | BDA2 | 3DA5 | BDA7 | 3DAA |
| F8 | BDAD | 3DAF | BDB9 | 3DBB | 3DBE | 3DC9 | BDCB | BDCE | 3DD2 | BDD5 | 3DD7 | BDDA | 3DDD | BDDF | BDE9 | 3DEB |
| F9 | 3DEE | BDF2 | 3DF5 | BDF7 | 3DFA | BDFD | 3DFF | 3E21 | BE23 | BE26 | 3E42 | BE45 | 3E47 | BE4A | 3E4D | BE4F |
| FA | 3E59 | BE5B | BE5E | 3E71 | BE73 | BE76 | BE89 | 3E8B | 3E8E | BE92 | 3E95 | BE97 | 3E9A | BE9D | 3E9F | 3EA9 |
| FB | BEAB | BEAE | 3EB2 | BE85 | 3EB7 | BEBA | 3EBD | BEBF | 3ED1 | BED3 | BED6 | 3EE2 | BEE5 | 3EE7 | BEEA | 3EED |
| FC | BEEF | 3EF9 | BEFB | BEFE | BF11 | 3F13 | 3F16 | BF22 | 3F25 | BF27 | 3F2A | BF2D | 3F2F | BF39 | 3F3B | 3F3E |
| FD | 3F49 | BF4B | BF4E | 3F52 | BF55 | 3F57 | BF5A | 3F5D | 2F5F | BF69 | 3F6B | 3F6E | BF72 | 3F75 | BF77 | 3F7A |
| FE | BF7D | 3F7F | 3F91 | BF93 | BF96 | 3FA2 | BFA5 | 3FA7 | 2FAA | 3FAD | BFAF | 3FB9 | BFBB | BFBE | BFC9 | 3FCB |
| FF | 3FCE | BFD2 | 3FD5 | BFD7 | 3FDA | BFDD | 3FDF | 3FE9 | 2FEB | BFEE | 3FF2 | BFF5 | 3FF7 | BFFA | 3FFD | BFFF |

Fig. 51

| | | | | | | | | | | | | | | | | |
|---|---|---|---|---|---|---|---|---|---|---|---|---|---|---|---|---|
| DSV | 0 | 0 | 0 | 0 | 0 | 0 | 0 | 0 | 1 | 1 | 1 | 1 | 1 | 1 | 1 | 1 |
| DSV' | 0 | 0 | 0 | 0 | 1 | 1 | 1 | 1 | 0 | 0 | 0 | 0 | 1 | 1 | 1 | 1 |
| Q' | 0 | 0 | 1 | 1 | 0 | 0 | 1 | 1 | 0 | 0 | 1 | 1 | 0 | 0 | 1 | 1 |
| CDS | 0 | 1 | 0 | 1 | 0 | 1 | 0 | 1 | 0 | 1 | 0 | 1 | 0 | 1 | 0 | 1 |
| Q" | 1 | 0 | 1 | 0 | 0 | 1 | 0 | 1 | 0 | 1 | 0 | 1 | 1 | 0 | 1 | 0 |

DATA CONVERSION METHOD AND APPARATUS IMBEDDING PILOT SIGNAL INTO CONVERTED DATA AND REDUCING ERROR PROPAGATION BETWEEN DATAWORDS

This application is a continuation of application Ser. No. 08/018,403 filed on Feb. 17, 1993, now abandoned.

BACKGROUND OF THE INVENTION

1. Field of the Invention

The present invention relates to a data conversion method for converting digital data to signals suitable for the recording system or the transmission channel used when recording or transmitting the digital data onto magnetic tape, and a recording/reproducing apparatus employing the data conversion method.

2. Description of Related Art

Prior art data conversion methods employed in magnetic recording/reproducing apparatus include for example, an 8/10 modulation method such as disclosed in "THE DAT CONFERENCE STANDARD" (issued June 1987). The 8/10 modulation method is a data conversion method in which digital data are partitioned into datawords of 8 bits each for conversion into 10-bit codewords. FIG. 1 is a circuit block diagram for explaining this his data conversion method, and FIG. 2 is a data conversion table used for the same. In FIG. 1, the reference numeral 1 designates an encoder for accepting eight-bit, digital data and a one-bit table select signal (Q') at its respective inputs and for outputting a total of 11 bits, i.e. a 10-bit codeword plus a one-bit signal (Q) for selecting the table for the next codeword. Further, the numeral 2 denotes a flip-flop for delaying the codeword table selected signal by one dataword. The encoder 1 includes a read-only memory (ROM) or the like which contains the data conversion table shown in FIG. 2, wherein codewords of CDS (Codeword Digital Sum)=0 are mapped on a one-to-one basis to 256 datawords from "00" to "FF" of hexadecimal numeral, while in the case of codewords of CDS ≠0, pairs of codewords, one with CDS=+2 and the other with CDS=−2, are each mapped to one dataword, the table of Q'=−1 consisting of codewords of CDS=+2 and the table of Q'=+1 consisting of codewords of CDS=−2. The table select signal (Q) is used to select the CDS (table) having the directed on that suppresses the description of charges in the codeword sequence.

The operation of the above circuit will now be explained with reference to the timing diagram of FIG. 3. In FIG. 3 the reference signs (a), (Q), and (b) correspond to inputs/outputs at the respective parts shown in FIG. 1 and the reference signs (c) and (d) respectively represent an output signal from an NRZI. converter (not shown) and a DSV (Digital Sum Variation) value at the end of codeword.

First, an eight-bit dataword "FF" is input to the encoder 1 along with the table select signal (Q')=−1, and consequently, the encoder 1 outputs a 10-bit codeword "1111101010" or CDS=+2 corresponding to "FF" for Q'=−1. At the same time the table select signal Q=−1 is output for the next codeword. The parallel 10-bit signal is then converted to a serial signal, after which the signals NRZI-modulalted. As a result, the DSV value at the end of the codeword becomes +2.

Next, when "00" input to the encoder 1 the encoder 1 outputs Q'=1 together with a 10-bit signal "0101010101" of CDS=0 corresponding to "00" for Q'=−1 which is produced by introducing a one-symbol delay in the previous output Q=−1. As a result, the DSV value at the end of the codeword after NRZI modulation remains at +2.

Next, when "11" is input to the encoder 1, the encoder 1 outputs Q=−1 together with a 10-bit signal of CDS=−2 corresponding to "11" for Q'=1. As a result the DSV value at the end of the codeword after NRZI modulation becomes zero. In this manner for each eight-bit dataword input to the encoder 1 a codeword to be output is selected from the table of either Q'=−1 or Q'=1 corresponding to the dataword on the basis of the table select signal output previously. The DSV at the end of each codeword after NRZI modulation can only take the value 0, +2 or −2. This means that the DSV dispersion is suppressed, as a result of which DC-free data conversion is realized.

As described above, according to the prior art data conversion method eight-bit data is converted to a 10-bit codeword of CDS=0 or CDS=+2 or −2 and a DC-free signal is produced with the DSV dispersion suppressed, thereby minimizing intersymbol interference on the transmission channel and thus increasing the recording density per track. However, for recent digital magnetic recording/reproducing apparatus using a rotary head, a recording density as high as several square micrometers per bit is demanded, which necessitates not only increasing the recording density per track but also reducing the track width down to several micrometers. To implement such apparatus, it is essential to employ a dynamic tracking following (DTF) control system whereby pilot signals for tracking are recorded on the main track recorded by the rotary head and the playback head is controlled to follow the recorded track curves during playback. When the prior are data conversion method is employed in such apparatus for multiplex recording of the pilot signals, the digtital signal spectral distribution has to be obtained down to ultra low frequency ranges although the recorded information signals contain no DC components; the resulting problem is that the pilot signals cause external disturbances, leading to increased errors in the detection of the digital signals.

One possible approach to overcoming the problem of the pilot signals causing external disturbances to the digital signals may be by generating pilot signals synchronized to the digital signals. However, the prior art data conversion method is effective only in suppressing the DSV dispersion and is not capable of actively controlling the DSV and therefore, has the problem that it cannot general pilot signals synchronized to the digital signals.

FIG. 4 shows a DAT recording format employed in a magnetic recording apparatus using the 8/10 modulation method. As shown, according to the format of FIG. 4 ATF areas for tracking control are provided in each of which a pilot signal for tracking control is recorded. Further, FIG. 5 shows a digital VTR recording format which is disclosed in Japanese Patent Application laid Open No. 3-217179(1991). As shown, the track is divided into a video data area, an audio data area, a servo pilot area, and a sub code area, the pilot signal being recorded in the servo pilot area only.

According to the above construction of the prior art, it is not possible to control the DSV in such a manner as desired, and a separate area has to be reserved for recording a pilot signal for tracking control. Accordingly, accurate tracking control cannot be realized without increasing the data amount and hence increasing the recording rate, which makes it difficult to achieve high density recording.

SUMMARY OF THE INVENTION

It is an object of the present invention to provide a data conversion method which, by suppressing low frequency components, can minimize intersymbol interference on the transmission channel, thus permitting increased per-track recording density, as in the prior art data conversion method, and which is capable of generating pilot signals synchronized to digital signals, which has not been possible with the prior art method, and thus achieves increased recording density with reduced track width.

It is another object of the present invention to provide a recording/reproducing apparatus optimized for the data conversion method capable of generating pilot signals synchronized to digital signals.

It is a further object of the present invention to provide a data conversion method which is capable of generating pilot signals for tracking control and which involves hardly any increase in the recording rate and therefore permits high density recording and a recording/reproducing apparatus using such a data conversion method.

According to the present invention, there is provided a data conversion method for word-converting an r-bit first dataword to an m-bit second dataword (r<m) and converting the word-converted m-bit second dataword to an n-bit codeword (m<n), in which, for r/m word-conversion, a sequence of first datawords is divided into groups of x bits where x is the least common multiple of r and m, an arbitrary first dataword selected from x/r groups of first datawords is divided into x/m, and r/(x/m)-bit data obtained by dividing the first dataword into x/m is appended to the LSB (or MSB) side of one or other of the non-divided first datawords to form the m-bit second dataword. The m-bit second dataword can thus be handled as r+(r/(x/m)) (or (r/(x/m))+r). Therefore, if, in m/n conversion, the n-bit codeword is formed by dividing it into n1 and n2 bits, the data conversion can be performed by relating r to n1 and r/(x/m) to n2 . This serves to reduce the possibility of error propagation due to a bit error that may occur in reverse data conversion.

Furthermore, when converting the word-converted m-bit second dataword to the n-bit codeword the number of successive 0s between a bit "1" and the next bit "1" in each n-bit codeword is limited to 4, and two codewords, one with CDS=+1 and the other with CDS=−1, are paired and related to the m-bit second dataword, the two codewords being selectively used in accordance with a DSV control signal. This enables the DSV to be controlled at a desired value for each codeword, thereby achieving spectrum suppression in a relatively low frequency range. Also, by controlling the CDS polarity in accordance with the DSV control signal a pilot signal of the DSV variation cycle synchronized to digital data can be generated in the low frequency band where the digital data power spectrum exhibits an abrupt drop.

When the above data conversion method is employed in a recording/reproducing apparatus, the number of first datawords to be recorded in a data block where an error-correcting code and an error-detected on code are appended for every synchronizing signal is set at an integral multiple of x/r. The recording/reproducing apparatus thus constructed achieves an efficient code format that does not require redundant bits.

The recording/reproducing apparatus employing the above data conversion method has decoding means for decoding n1 bits in the reproduced n-bit codeword into r bits, the reproduced n-bit codeword being divided into n1 bits and n2 bits for reverse conversion into the m-bit second dataword; decoding means for decoding the n2 bits into r/(x/m) bits; decoding means for decoding the n bits into the m bits; identifying means for identifying the type of bits at prescribed positions in the n-bit codeword and for outputting an identification signal designating the identified type; and means for selecting decoded data from the respective decoding means on the basis of the identification signal supplied from the identifying means and for output ting the decoded second dataword. This construction serves to reduce the possibility of the error propagation that may occur between decoded first datawords due to a single bit random error in the n-bit codeword.

Another recording/reproducing apparatus of the invention has means for recording multiple kinds of data in partitioned areas; means for relating 14-bit codewords of CDS=0 and pairs of codewords of CDS=±2 to respective 12-bit datawords when encoding and recording at least one of the multiple kinds of data and for encoding the data by selectively using these codewords; and means for appending one bit to each 14-bit codeword to form a pair of codewords, one with CDS=+1 and the other with CDS=−1, when encoding and recording at least one other of the multiple kinds of data and for encoding the data by selectively using these codewords.

In the above recording/reproducing apparatus, when encoding and recording at least one of the area-partitioned multiple kinds of data, either a 14-bit codeword of CDS=0 or a pair of codewords differing only in MSB, one with CDS=2 and the other with CDS=−2 are related to one dataword, and the dataword is encoded by selectively using these codewords, thus constructing a DC-free code of Tmin=0.86T and Tmax=4.29T; on the other hand, when encoding and recording at least one other of the multiple kinds of data, one bit is appended to each 14-bit codeword to form a pair of codewords one with CDS=+1 and the other with CDS=−1, and the data is encoded by selectively using these codewords thus constructing a code that provides the DSV coming round o the same value at prescribed intervals.

The above and further objects and features of the invention will more fully be apparent from the following detailed described ion with accompanying drawings.

BRIEF DESCRIPTION OF THE DRAWINGS

FIG. 2 is a code conversion table according to a prior art data conversion method.

FIG. 6 is a diagram showing the number of codewords for deriving codewords in accordance with a first embodiment of the invention.

FIG. 7 is another diagram showing the number of codewords for deriving codewords in accordance with a first embodiment of the invention.

FIGS. 8–10 are all diagrams for explaining the construction of code conversion tables according to the first embodiment of the invention.

FIGS. 11–26 are diagrams showing code conversion according to the first embodiment of the invention.

FIGS. 33–49 (both parts A and B) are diagrams showing classifications for 5-bit LSB codewords in the codewords of the first embodiment.

FIG. 51 is a diagram showing a code select table according to the second embodiment.

DESCRIPTION OF THE PREFERRED EMBODIMENTS

Embodiment 1

Figure 1:
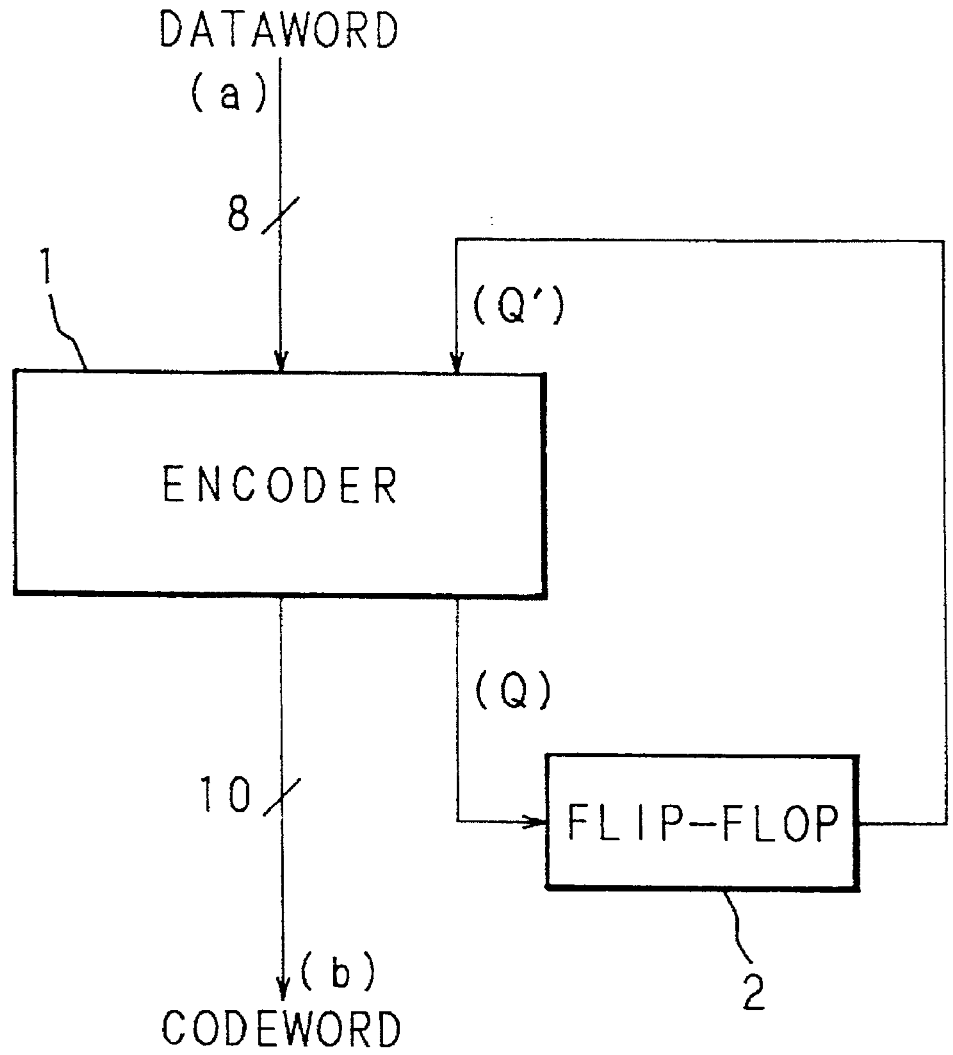
FIG. 1 is a diagram showing the circuit configuration of a prior data converting apparatus.
Figure 3:
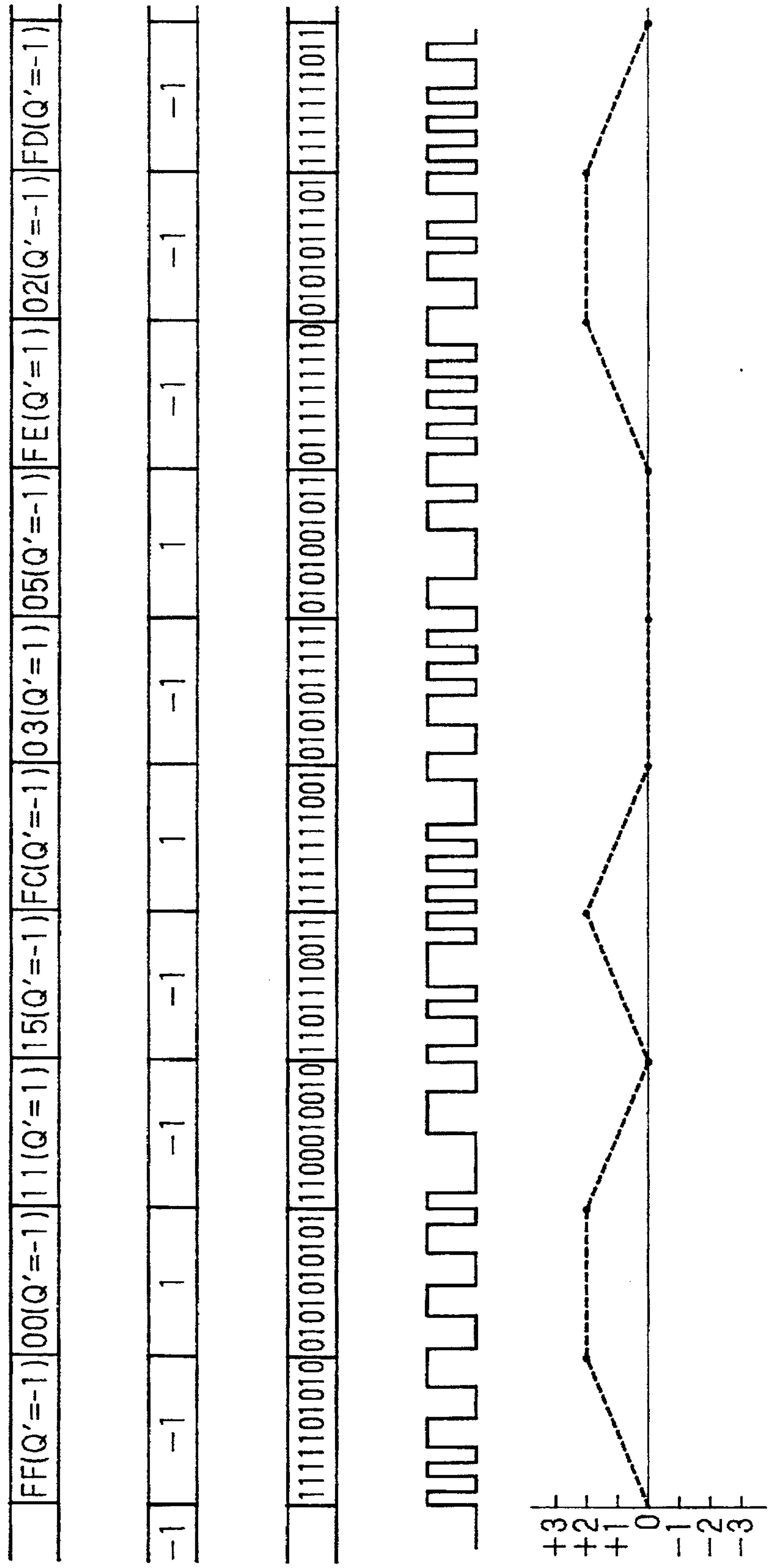
FIG. 3(A) through FIG. 3(D) are diagrams for explaining the operation of the data converting apparatus of FIG. 1.
Figure 4:
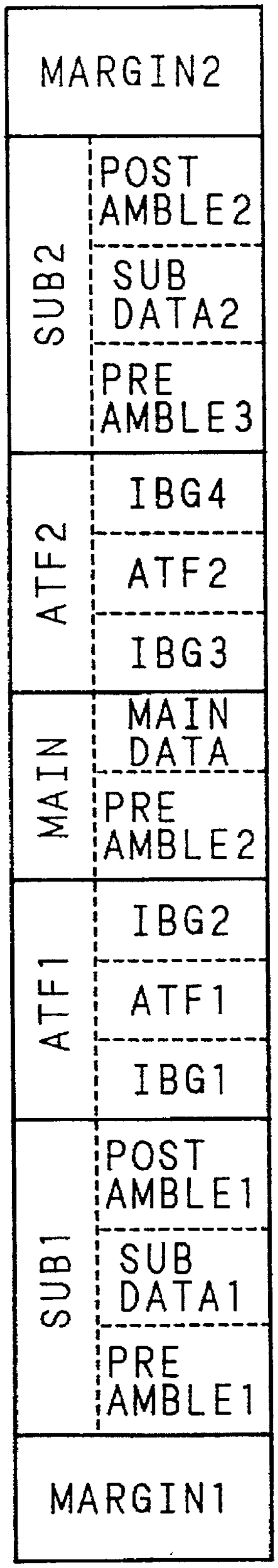
FIG. 4 is a diagram showing a recording format of a prior art DAT.
Figure 5:
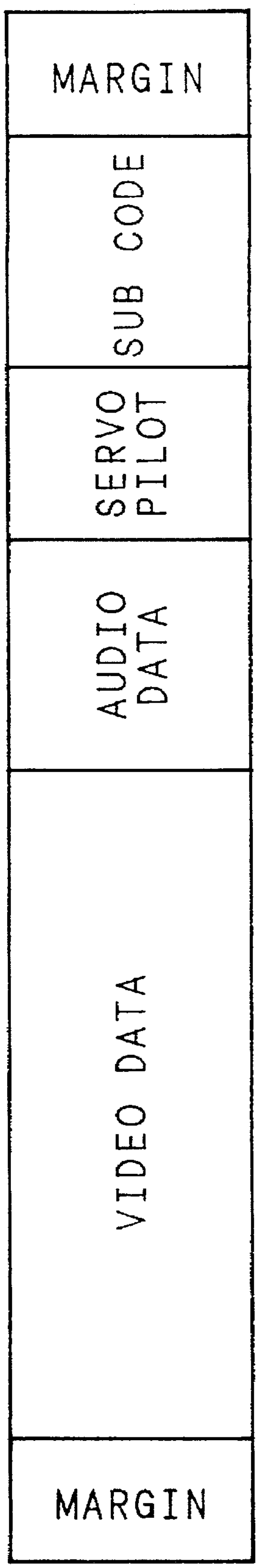
FIG. 5 is a diagram showing a recording format of a prior art digital VTR.

A first embodiment of the invention will now be described below with reference to accompanying drawings. Now suppose a first dataword length r=8, a word-converted second dataword length m=12, and a data-converted codeword length n=15, to form a code with a modulation parameter Truax/Train=5. At this time d=0 and k=4, where d is the minimum number of 0s between an arbitrary 1 and the next 1, and k is the maximum number of 0s between an arbitrary 1 and the next 1. The NRZI (F) rule is used to form the code. To achieve such a data conversion, the maximum number of successive 0s in each codeword is limited to 3 on the MSB side, 1 on the LSB side and 4 within codeword. In this situation, the number of possible codewords having the MSB of 0 and satisfying the 0 run length condition is given in FIG. 6 for each CDS.

To form a DC-free code, $2^{12}$ pairs (4096 pairs) of codewords, each pair having codewords of different CDS polarities, should be provided. The numbers given in FIG. 6 are only for codewords whose MSB is 0; by converting the MSB to 1, codewords of reverse CDS polarity can be obtained while satisfying the 0 run length condition. Accordingly, of the codewords given in FIG. 6, only the codewords of CDS=±1 are enough to satisfy the minimum required number of second datawords=$2^{12}$ (4096<number of codewords =4650). Therefore, by using only the codewords of MSB=0 and CDS=±1 and by setting the MSB to 0 or 1, it is possible to supress the dispersion of DSV.

FIG. 7 shows possible combinations of codewords n1 and n2 when the codewords of CDS=±1 given in FIG. 6 are each divided into n1=10 bits and n2=5 bits, n1 representing the 10 bits on the MSB side and n2 representing the 5 bits on the LSB side. In FIG. 7, Group A consists of n1 codewords of CDS=0, Group B of n1 codewords of CDS=+2, Group C of n1 codewords of CDS=−2, Group D of n1 codewords of +4, and Group E of n1 codewords of CDS=−4. Each of the codeword groups A to E is subdivided in accordance with the 0 run length at codeword end resulting from the concatenation of the codewords n1 and n2.

First, we focus our attention on Group A. It can be seen that there are 18 different n2 codewords that can be paired with A1 while, of the 18 codewords, 17 codewords excluding the codeword "02" can also be paired with A2. Therefore, For Group A, 16 codewords, excluding the codewords "02" and "05", are used and m=12 bits are divided into m1=8 bits and m2=4 bits at the time of m in conversion, to realize m1/n1 (8/10) conversion and m2/n2 (4/5) conversion respectively. This coding technique serves to avoid propagation of errors between divided codewords at the time of decoding. To utilize this property when 8-bit first datawords of length (r) supplied from an error-correcting circuit are word-converted to 12-bit second datawords of length (m) four bits separated from the eight bits are mapped to m2 while non-divided 8 bits are mapped to m1. As a result, when a random error occurred to one bit in n bits during the reconstruction process, the error occurring to the first dataword after decoding is limited only to one dataword; the error is thus prevented from propagating between datawords.

In the first embodiment, 1s and 0s used to represent one-bit signals are binary numbers, a 1 representing a high level and a 0 a low level. On the other hand, "0" to "F" used to represent datawords, codewords, or parallel data bit sequences are hexadecimal numbers.

If the above coding method is provided in 256 pairs, a single bit error in n bits during the reconstruction process can be prevented from propagating between first datawords after decoding. However, as is apparent from FIG. 7, under the condition that satisfies the modulation parameter of the data conversion method of the first embodiment, the above coding method can be applied only to Group A, and cannot be applied to the other Groups B to E.

In view of the above situation, we now consider a method of coding, as shown in FIGS. 8 to 10 wherein the m1/n1, m2/n2 coding method is divided into three major coding groups, i.e. the first coding group consisting only of Group A codewords corresponding to the first datawords m1 ="00" to "73", the second coding group consisting of Group B and Group C codewords corresponding to the first datawords m1="74" to "BA", and the third coding group consisting of the codewords in the other groups as well as the remaining codewords in Group B and Group C corresponding to the first datawords m1="BB" to "FF".

First referring to the first coding group of FIG. 8 which consists only of Group A codewords, if an error occurred to one bit in n bits in the reconstruction process, the error occurring to the first dataword after decoding is limited only to one dataword and is thus prevented from propagating between datawords.

Next, in the second coding group shown in FIG. 9 there is provided a one-to-one correspondence for the m2/n2 conversion, but for the m1/n1 conversion two n1 codewords are mapped to one m1. Therefore, of the encoded 15 bits, if the 10 bits mapped to n1 contains a single bit error, the error occurring to the first dataword after decoding is limited only to one dataword and is thus prevented from propagating between datawords. However, if there is an error in one bit out of the five bits mapped to n2, error propagation can occur between first datawords after decoding from the probability point of view.

Further, in the third encoding group shown in FIG. 10, one m1 is mapped to a plurality of n1 codewords for the m1/n1 conversion, while for the m2/n2 conversion, a plurality of m2 codewords are mapped to one n2. Therefore, any one bit error can cause error propagation between first datawords after decoding from the probability point of view whether the error is in n1 or n2.

In the data conversion method wherein an 8-bit first dataword is word-converted to a 12-bit second dataword which is further converted to a 15-bit codeword the above coding method has the effect of reducing the possibility of error propagation that may occur between first datawords after decoding due to a single bit detection error in the encoded 15 bits.

Code conversion tables thus constructed are shown in FIGS. 11 to 26. The numbers given in FIGS. 11 to 26 represent binary digital signals in hexadecimal notation; "0" to "F" in the uppermost row each correspond to the four bits on the LSB side of a 12-bit input codeword and "00" to "FF" in the leftmost column each correspond to the eight bits on the MSB side of a 12-bit input codeword each row and column intersection "XXXX" forming the resulting 16-bit codeword. For example, when a 12-bit dataword "15A" is input, a codeword "9539" is obtained from the intersection between the row of "15" and the column of "A" (see FIG. 12). For a 12-bit input codeword (the second codeword), the resulting codeword consists of 16 bits, of which the MSB corresponds to a Q signal ("1" for a high level and "0" for a low level, representing the end level of an NRZI-modulated codeword when the MSB of the premodulation codeword is "0"), the 15th bit represents the CDS information ("1" for +1 and "0" for −1) and the remaining bits from the 14th bit to the LSB correspond to the bits from the 14th bit to the LSB of the 15-bit codeword to be NRZI-modulated. For the m/n (12/15) data conversion, the codeword output is selected as 16 bits because the codeword MSB control is performed by comparing the CDS information of the codeword to be converted with the end level of the previous NRZI-modulated codeword on the basis of a DSV control signal of 50% duty cycle derived by further dividing the data conversion rate signal.

Figure 27:
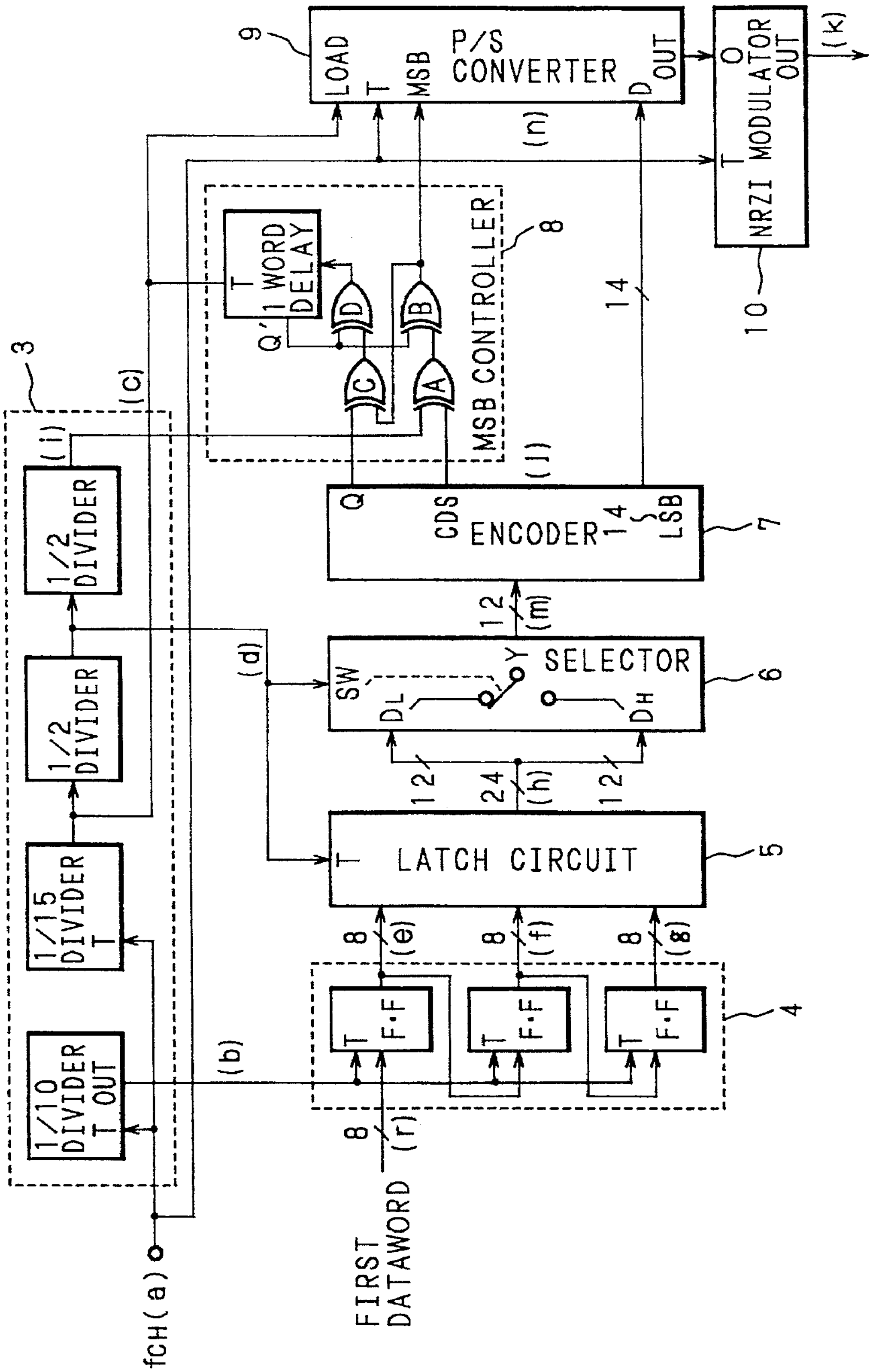
FIG. 27 is a diagram showing the circuit configuration of a data converting apparatus for implementing the code conversion method of the first embodiment.

FIG. 27 is a diagram showing an example of a circuit configuration implementing the first embodiment. The reference numeral 3 designates a clock generator circuit which generates, from a channel clock for transmit ting a data-converted code, a symbol clock of fCH/10 for transmit ting a first codeword (r), a clock (fMW/2) of fCH/30 (a value obtained by multiplying 24, the least common multiple of r and m, by n/m (10/8)) for word-converting the first dataword to the second dataword, a clock (FMW) for parallel-transmitting a converted n-bit codeword and a DSV control signal (i) for determining the variation frequency of DSV.

The numeral 4 is a shift register constructed from three stages of flip-flops (F—F) for transmitting 8-bit first datawords in parallel at the symbol clock (fsym); 5 is a latch circuit that latches at the clock (fMW/2) the 24-bit parallel signal output from the shift register 4; 6 is a selector for word-converting the first datawords of 3 bytes to two second datawords by using the clock (fMW/2) as a select switch; 7 is an encoder for data-converting each 12-bit dataword to a codeword selected from the tables shown in FIGS. 11 to 26; and 8 is an MSB controller for outputting the MSB of the codeword in accordance with the Q and CDS information supplied from the encoder 7 and the DSV control signal (i) supplied from the clock generator circuit 3, the MSB controller 8 having four EXOR circuits, A to D, and a one-word delay for delaying the end level of the previous NRZI-modulated codeword by one encoding cycle by using the clock (fMW). Further, the numeral 9 designates a parallel/serial converter for loading the encoded 15-bit parallel signal at the clock (fMW) and for converting the parallel signal to a serial signal which is transmit ted at the channel clock (fCH), and the numeral 10 indicates an NRZI modulator for causing state inversion (high to low and low to high transitions) when signal "1" is input.

Figure 28A:
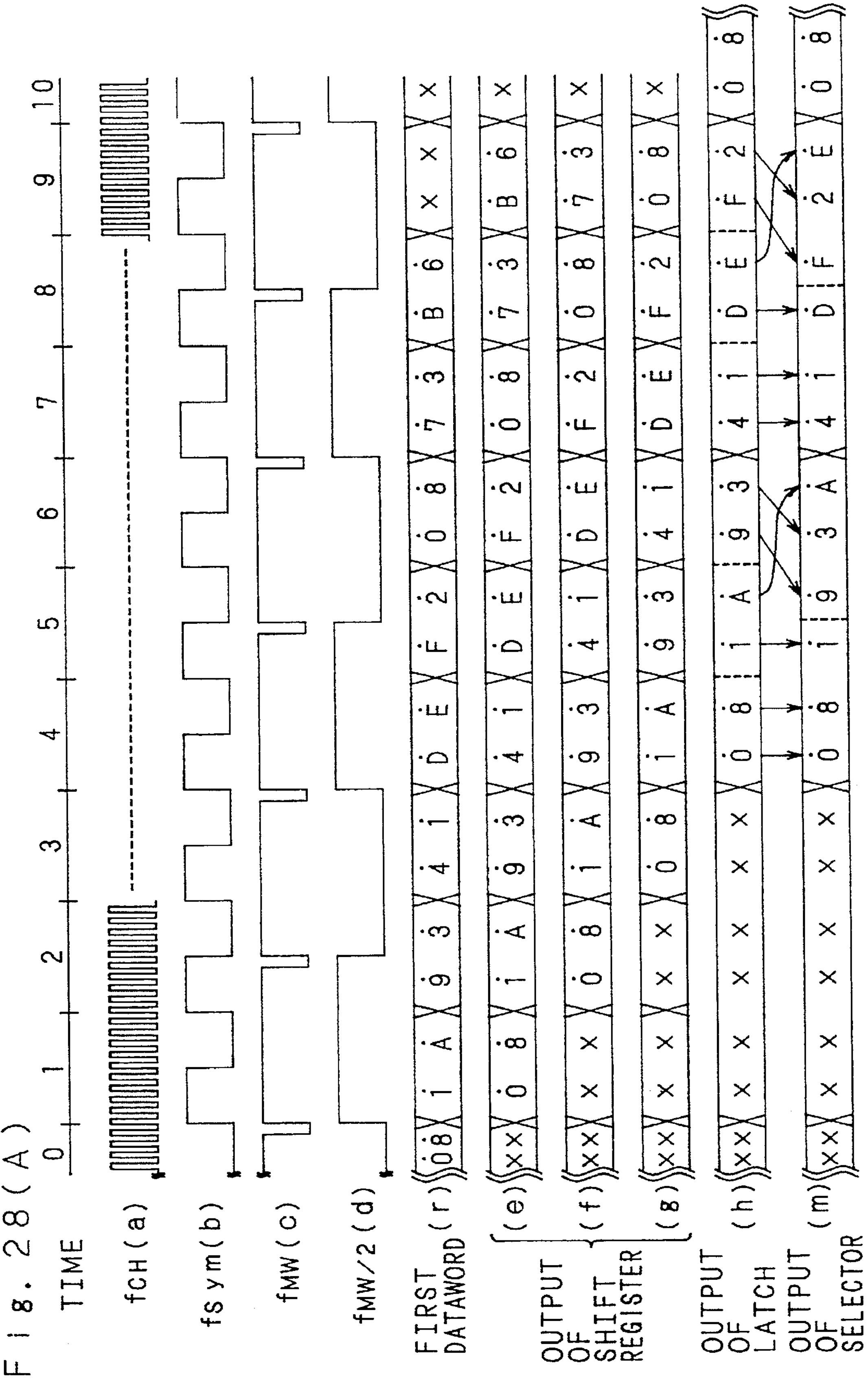
FIG. 28(A) and FIG. 28(B) are diagrams for explaining the operation of the data converting apparatus of FIG. 27.
Figure 28B:
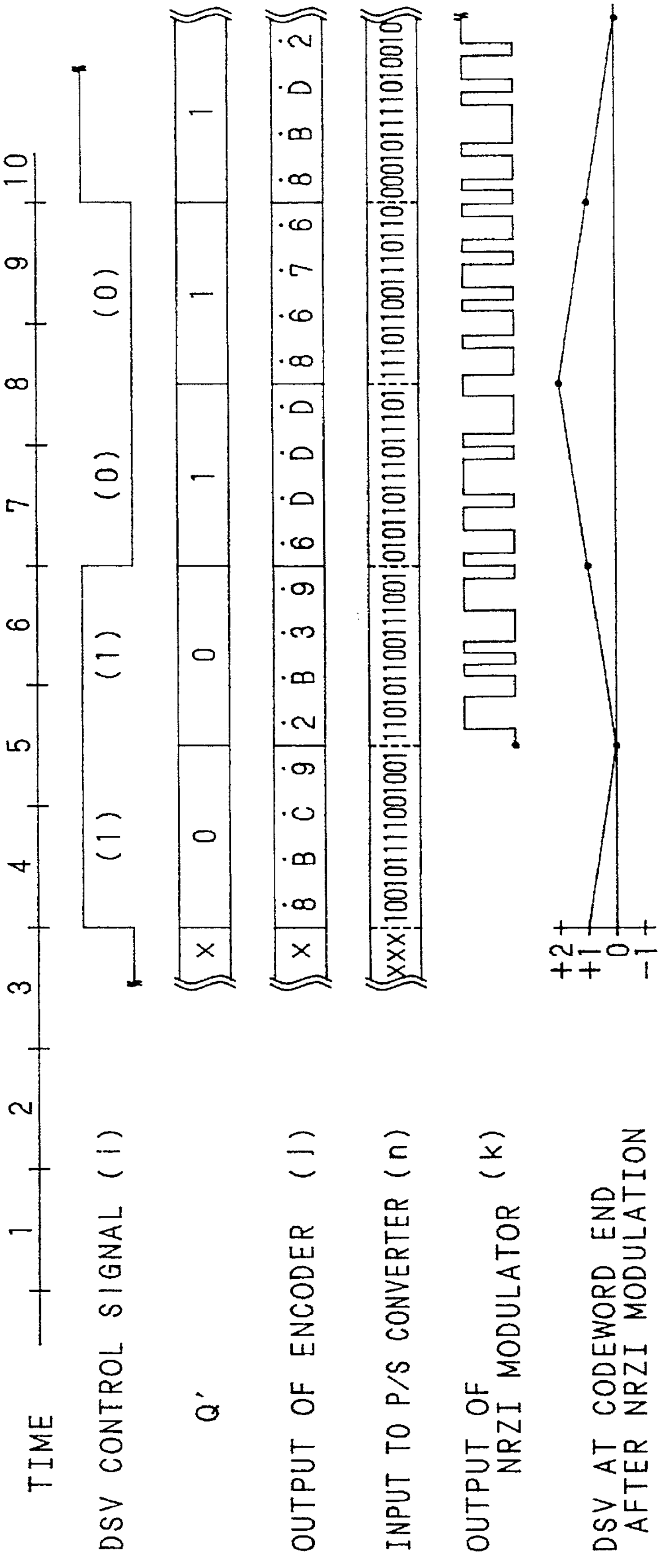

FIG. 28 is a timing diagram for explaining the operation of the circuit shown in FIG. 27. The reference signs (a) to (k), (m), (n), and (r) correspond to the respective points designated by the same signs appearing at the inputs/outputs of the respective circuit sections.

The operation of the circuit will now be described in detail 8-bit first datawords (r) fed from an error-correcting circuit section are shifted at the symbol clock (fsym) into and along the shift register 4 and are output as a 3-byte or 24-bit parallel signal. The 24-bit parallel signal is latched by the latch circuit 5 at the clock (fMW/2) of three-symbol cycle. That is, three bytes of signals "08", "1A", and "93" are latched by the latch circuit 5 at the rising edge, between times 3 and 4, of the clock (fMW/2) shown in FIG. 28. Of the three bytes of parallel signals, the first byte (8 bits) "08" is input to DH11–D14 of the selector 6, and the four bits of "1" on the MSB side of the second byte are input to DH3–DH0 of the selector 6. Further, the last byte (8 bits) "93" is input to DL11–DL4 of the selector 6, and the four bits of "A" on bhe LSB side of the second byte are input to DH3–DH0, respectively. As a result, between time 4 and the first half of time 5 in FIG. 28, the selector 6 outputs a 12-bit parallel signal "081". Between the second half of time 5 and time 6 the selector 6 outputs a 12-bit parallel signal "93A".

With the above operation the three 8-bit first datawords "08", "1A"and "93" are word-converted to two 12-bit second datawords, "081" and "93A", by dividing the second byte of the first dataword into two and appending the respective halves to the LSBs of the first and third bytes of the first dataword. Likewise, the three bytes of the first dataword, "41","DE"and "F2", latched by the latch circuit 5 at the rising edge between times 6 and 7 of the clock (fMW/2) in FIG. 28 are word-converted by the selector 6 to two second datawords "41D" and "F2E".

Next, we will describe in detail the operation for converting the 12-bit second datawords to 15-bit codewords. For the convenience of explanation, it is assumed that, at time 4 in FIG. 28, the output Q' of the one-word delay in the MSB controller 8 is low, and that the DSV value for the codeword sequence up to the converted second dataword immediately preceding "081" is 0.

In this condition when the second dataword "081" is input to the encoder 7 during the period from time 4 to the first half of time 5 the encoder 7 outputs a signal 8BC9, in accordance with the conversion tables shown in FIGS. 11 to 26 the signal having a total of 16 bits i. e. a codeword formed from the LSB to the 14th bit and the CDS signal and Q signal one bit each associated with the codeword. To describe the contents of the signal of the four bits "1000" corresponding to "8"the MSB represents the Q signal "0" for a low level and "1" for a high level Further, of "1000" corresponding to "8"the bit immediately preceding the MSB represents the CDS signal for the codeword "0" indicating CDS=−1 and a low level and "1" indicating CDS=+1 and a high level The remaining two bits of the "1000" corresponding to "8" plus the 12 bits "BC9" a total of 14 bits constitute the data-converted codeword which has 14 bits of "00101111001001" from the 14th bit to the LSB.

Of the signals thus created, the Q signal and the CDS signal are input, along with the DSV control signal (i), to the MSB controller 8 which then determines and outputs the MSB of the codeword in accordance with the operation hereinafter described. The DSV control signal (i) is set at "1" (high level) if the DSV is to be dispersed in the positive direction and at "0" (low level) if the DSV is to be dispersed in the negative direction. In the present embodiment the DSV control signal is set at a high level for the duration of times 4, 5, and 6 and at a low level for the duration of times 7, 8, and 9, so that the CDS is controlled to give +1 for encoding the second datawords "081" and "93A" and −1 for encoding the second datawords "41D" and "F2E".

The operation of the MSB controller 8 will now be described in detail. First, using the EXOR circuit A, it is checked whether the CDS value of the codeword currently output agrees with the direction in which the DSV is to be dispersed; if they agree, a 0 is output, and if they do not agree, a 1 is output, thereby making the CDS value of the codeword agree with the dispersing direction of the DSV. Note, however, that the above output condition is based on the assumption that encoding is performed with the start point of the codeword at a low level at the time of NRZI modulation. Also note that the MSB needs to be determined by referencing the Q' signal (a 0 for a low level and a 1 for a high level) indicating the end level of the previous NRZI-modulated codeword. The output of the EXOR circuit A and the Q' signal are both input to the EXOR circuit B and when the Q' signal is "0" (indicating that the NRZI-modulated word level at the end of the previous codeword is low), the output level of the EXOR circuit A appears unchanged at the output of the EXOR circuit B. On the other hand, when the Q' signal is "1" (indicating that the NRZI-modulated word level at the end of the previous codeword is high), since the polarity of the CDS of the codeword is inverted after NRZI modulation, the output level of the EXOR circuit A appears inverted at the output of the EXOR circuit B. The output of the EXOR circuit B is supplied as the MSB of the codeword to the parallel/serial converter 9.

To describe the above operation as applied to the present embodiment, when the second dataword "081" is input to the encoder 7, the CDS signal output from the encoder 7 is "0", and the DSV control signal (i) is at a high level ("1") that causes the DSV to disperse in the positive direction as can be seen from FIG. 28, so that the EXOR circuit A outputs a high level signal ("1"). At this time, the Q' signal that indicates the end level of the previous NRZI-modulated codeword is at a low level ("0") so that the EXOR circuit B outputs a 1 as the MSB of the codeword.

As a result a 15-bit parallel signal "1001011101" is loaded into the parallel/serial converter 9 in the middle of time 5 when the clock (fMW) goes low. The loaded bits are then output serially at the channel clock (fCH) from the parallel/serial converter 9 to form a code sequence with the MSB at the top of the sequence. The code sequence output from the parallel/serial converter 9 is fed to the NRZI modulator 10 where the polarity of the signal is inverted each time a "1" is input, the resulting signal being shown in FIG. 28(*k*). Here, with +1 as a high level and −1 as a low level the CDS can be calculated as +1, which indicates that the DSV of the code sequence is in the positive dispersing direction.

With the above operation, the 12-bit dataword is data-converted to the 15-bit codeword in accordance with the DSV control signal, but it is further necessary to check the end level of the NRZI-modulated codeword as previously described. This is accomplished by the following operation.

The Q signal from the encoder and the MSB signal from the EXOR circuit B are input to the EXOR circuit C in the MSB controller 8. When the MSB is "0", the Q signal appears unchanged at the output of the EXOR circuit C. On the other hand, when the MSB is "1", the number of inversions that occur in the NRZI modulation increases by one as the number of 1s in the codeword increases by one, and therefore, the Q signal is inverted for output. During the NRZI modulation, the polarity is inverted between positive and negative in accordance with the level of the connected signal Therefore, the output of the EXOR circuit C is input to the EXOR circuit D along with the Q' signal indicating the word end level of the previous NRZI-modulated codeword, and when the Q' signal is "0" (indicating the word end level after NRZI modulation is low), the output signal of the EXOR circuit C appears unchanged at the output of the EXOR circuit D. On the other hand, when the Q' signal is "1" (indicating the word end level after NRZI modulation is high), the output of the EXOR circuit C is inverted through the EXOR circuit D. The output of the EXOR circuit D is supplied to the one-word delay as a signal indicating the end level of the NRZI-modulated codeword for the immediately following data conversion.

To describe the above operation as applied to the present embodiment, when the second dataword "081" is input to the encoder 7, the Q signal output from the encoder 7 is "1", and the MSB output from the EXOR circuit B is also "1", as can be seen from FIG. 28, so that the output of the EXOR circuit D is at a low level ("0"). At this time, the signal Q' that indicates the end level of the previous NRZI-modulated codeword is at a low level ("0"), and therefore, the EXOR circuit D outputs a signal "0" indicating that the end level of the NRZI-modulated codeword is low, the signal "0" being input at the clock (fMW) to the one-word delay through which the signal is delayed by one encoding cycle. By repeating the above operation for every m/n data conversion with one word delay at each time, the end level of each codeword can be checked correctly for continuous sequences of codewords.

As described above, the data that has been word-converted by the selector 6 from 8-bit first datawords to 12 bit second datawords is converted by the encoder 7 to a 16-bit codeword, which is further converted by the MSB controller 8 to a 15-bit codeword, capable of determining the dispersing direction of the DSV as desired by the DSV control signal (i), by converting the two bits on the MSB side of the 16-bit codeword to a one-bit signal that determines the polarity of the CDS. Likewise, subsequent second datawords "93A", "41D",and "F2E" are respectively input to the encoder 7 and converted to the signal shown in FIG. 28(*j*), with their CDSs being controlled in accordance with the DSV control signal (i). As a result, the DSV value at the codeword end obtained at the output of the NRZI modulator 10 has a variation width p–p2 over four data conversion cycles as shown in FIG. 28(*k*), the resulting signal thus being made to synchronize with the DSV control signal.

Figure 29:
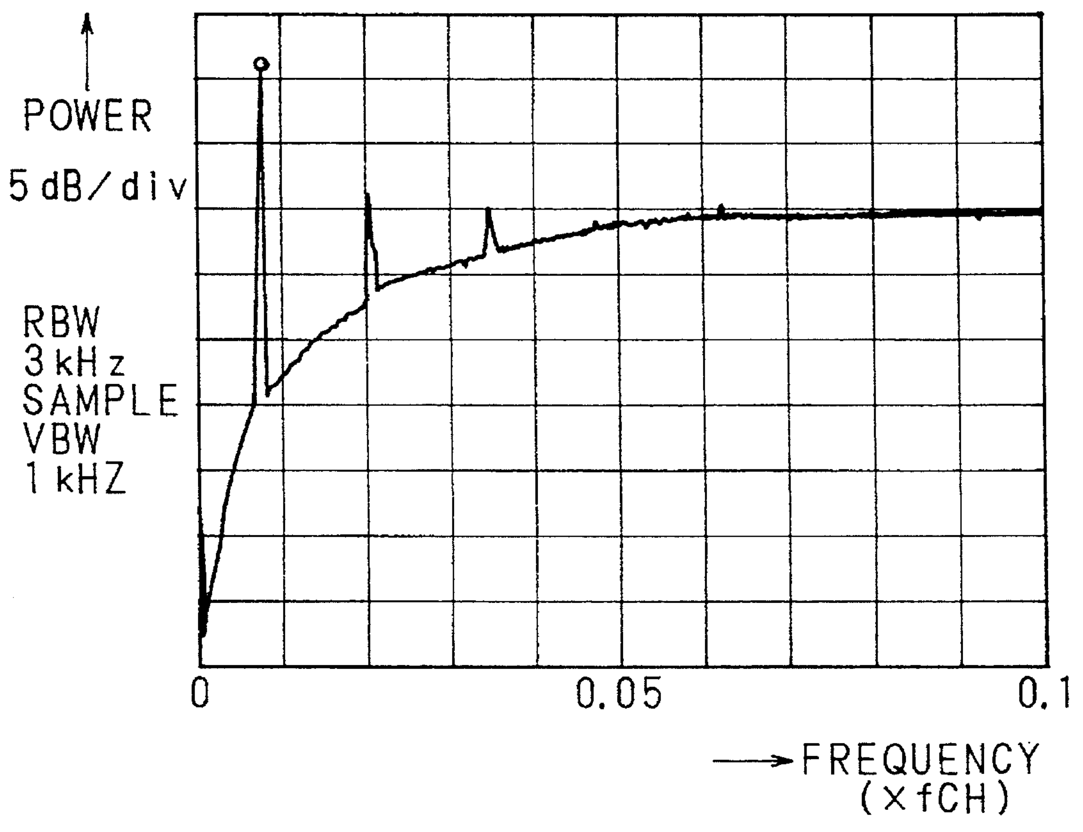
FIG. 29 is a power spectrum diagram showing the effect of the first embodiment

The power spectrum of the digital signal is dependent on the state transition probability, and by keeping the DSV variation cycle at a constant value, the state transition occurring at the DSV variation cycle becomes high, thus making it possible to obtain a spectrum having high power at frequencies corresponding to the DSV variation cycle. In the present embodiment, the cycle of the DSV control signal is selected to be equal to four m/n data conversion cycles. However, if the signal cycle is set equal to about 10 data conversion cycles, it will be possible to obtain a relatively low frequency signal corresponding to the DSV variation cycle synchronized with the digital data, and such a low frequency signal can be used as a tracking pilot signal that will become necessary when the track width is reduced. FIG. 29 is a diagram illustrating the power spectrum obtained when first datawords constructed from 8-bit M-sequence random signals expressed as $X^{23}+X^5+1$ are input in a circuit constructed in accordance with the first embodiment but with the cycle of the DSV control signal set equal to ten m/n data conversion cycles. As can be seen from FIG. 29, the resulting spectrum has no DC content (DC-free) and, at the same time exhibits high power only at frequencies corresponding to the cycle of the DSV control signal.

We will now describe a digital magnetic recording/reproducing apparatus that can be constructed into a system optimized for the above-described data conversion method.

Figure 30:
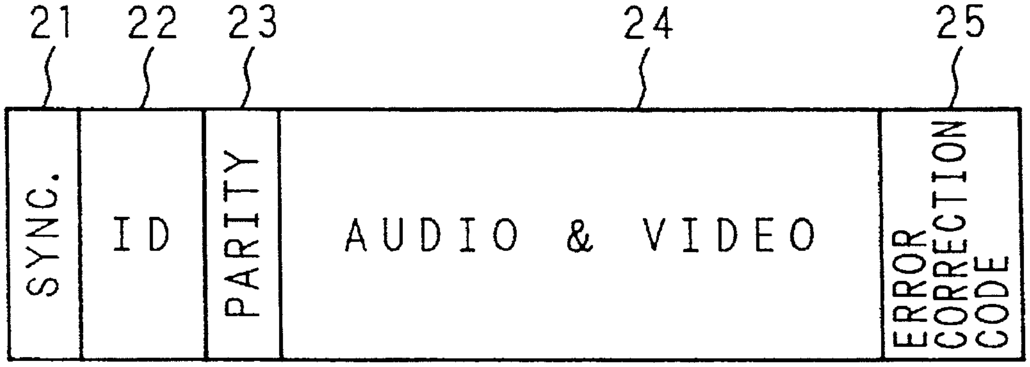
FIG. 30 is a diagram showing the structure of a first dataword block recorded by a recording reproducing apparatus employing the data conversion method of the first embodiment
Figure 31:
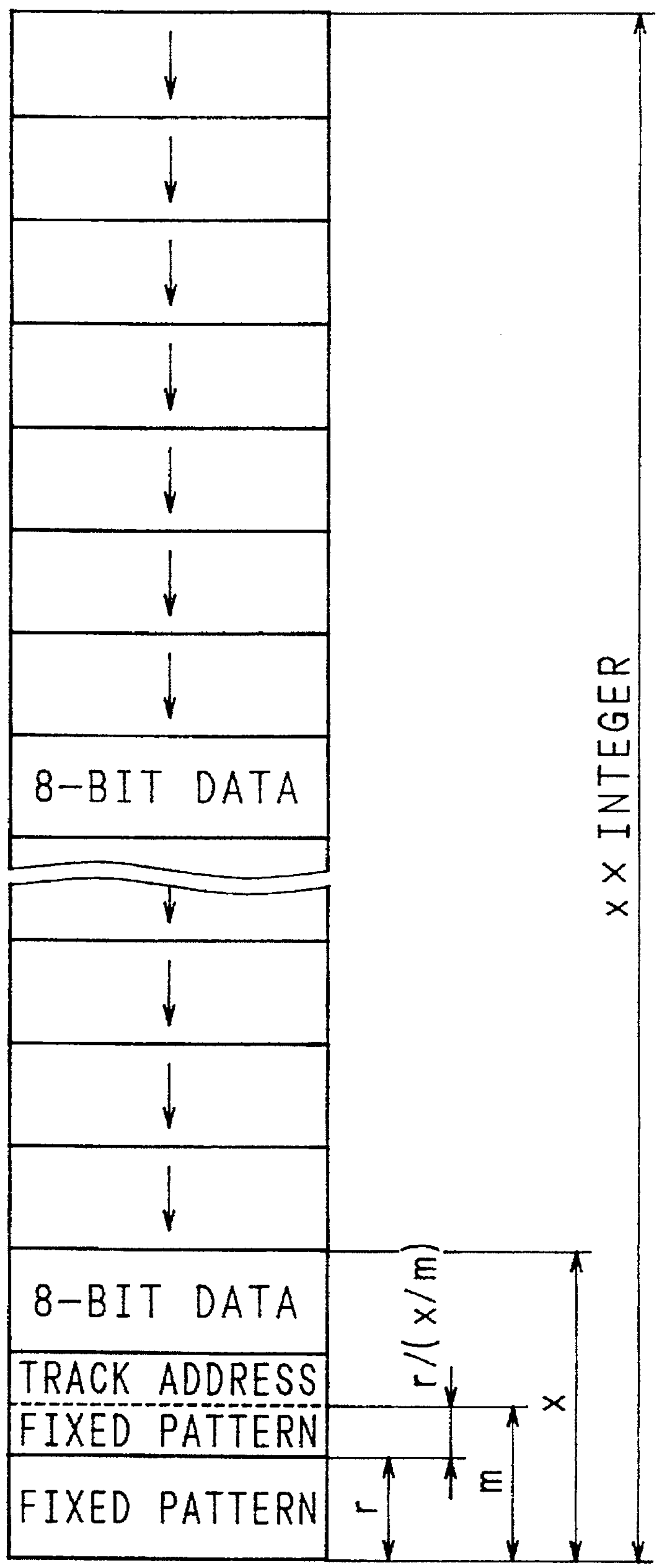
FIG. 31 is a diagram showing the structure of the first dataword block recorded by the recording reproducing apparatus employing the data conversion method of the first embodiment along with the structure of the first datawords recorded at the top of the block.

Digital magnetic recording/reproducing apparatus such as DAT, digital VTR, etc. have the characteristic of being insusceptible to system variation in the sense that degradation in the signal-to-noise ratio does not lead to degradation in the audio and video reproduction performance as long as 1s and 0s can be distinguished. On the other hand, there is some danger with such digital apparatus that only a single bit error in a large volume of information may entirely change the contents of the information. Therefore, in digital magnetic recording/reproducing apparatus, it is essential to employ error-correcting codes for correction of errors caused on the transmission channel. Usually, error-correcting codewords are recorded in error-correcting code blocks separated from one another by a synchronizing signal as shown in FIG. 30. In FIG. 30, the numeral 21 is the synchronizing signal for separating one error-correcting code block from another, 22 is an ID signal for the block identified by the track number or the synchronizing signal, 23 is a parity-check codeword for checking whether the ID signal is correctly reproduced, 24 is an audio video sector, and 25 is an error-correcting code. Rotary head type digital magnetic recording/reproducing apparatus usually have about 100 such blocks per track, each block being separated by the synchronizing signal.

The following description deals with a method of setting the amount of information for each block.

The synchronizing signal 21 serves not only as a signal for separating each error-correcting code block but also as a signal for executing word synchronization for decoding the codeword encoded and recorded as previously described, into the original dataword. The synchronizing signal thus has a very important role, and therefore, a unique signal that does not usually appear in the recorded signal sequences is often used as the synchronizing signal. This unique signal can only be obtained by reconverting the data-converted codeword. According to the data conversion method of the first embodiment in which 8-bit first datawords are first converted to 12-bit second datawords and then converted to 15-bit codewords, the synchronizing signal length corresponds to 1.5 bytes in the original first datawords. Therefore, if the synchronizing signal sector is constructed from one-byte synchronizing signal data plus 0.5 byte obtained by dividing the first dataword, these components would become separated at the time of decoding, so that the 0.5 byte in the synchronizing signal sector would cause a fixed error and therefore, the one byte data immediately following the synchronizing signal data would also cause a fixed error. This problem may be solved by inserting a dummy dataword of one byte immediately following the first dataword (which may be formed from a fixed pattern) used for the synchronizing signal.

However, it is not advantageous in terms of space utilization to add a dummy dataword in a limited package. Therefore, in the recording/reproducing apparatus employing the data conversion method of the first embodiment, the first dataword used for the synchronizing signal is constructed from a fixed pattern of one byte, and the immediately following first dataword is constructed from a fixed pattern of four bits on the MSB side and data (e.g., a cue signal, track address, etc.) of four or less bits on the LSB side. Ordinary 8-bit datawords are mapped starting with the first dataword of the third byte. The pattern of the synchronizing signal sector may be set in any pattern suitable for the reconversion performed after ordinary data conversion.

We will now describe a method of setting the number of first datawords for each block separated by the synchronizing signal. According to the data conversion method of the first embodiment, r-bit first datawords are first word-converted to m-bit second datawords and then data-converted to n-bit codewords. This requires word synchronization for every x bits, where x is the least common multiple of r and m. For example, in the present embodiment, r=8 and m=12, and hence the least common multiple is 24 bits so that the first codewords are word-synchronized for every three bytes. Since word synchronization is performed for every three bytes in each block as described above, if the number of first datawords in the block is not an integral multiple of 3, the first dataword remaining after dividing the number by 3 will cause a fixed error. Therefore, in the recording/reproducing apparatus employing the data conversion method of the first embodiment, number of first datawords per block is selected to be equal to an integral multiple of x/r.

The following describes a method of converting the reproduced 15-bit codeword back to the original 12-bit second dataword in the recording/reproducing apparatus employing the above-described data conversion method.

Figure 32:
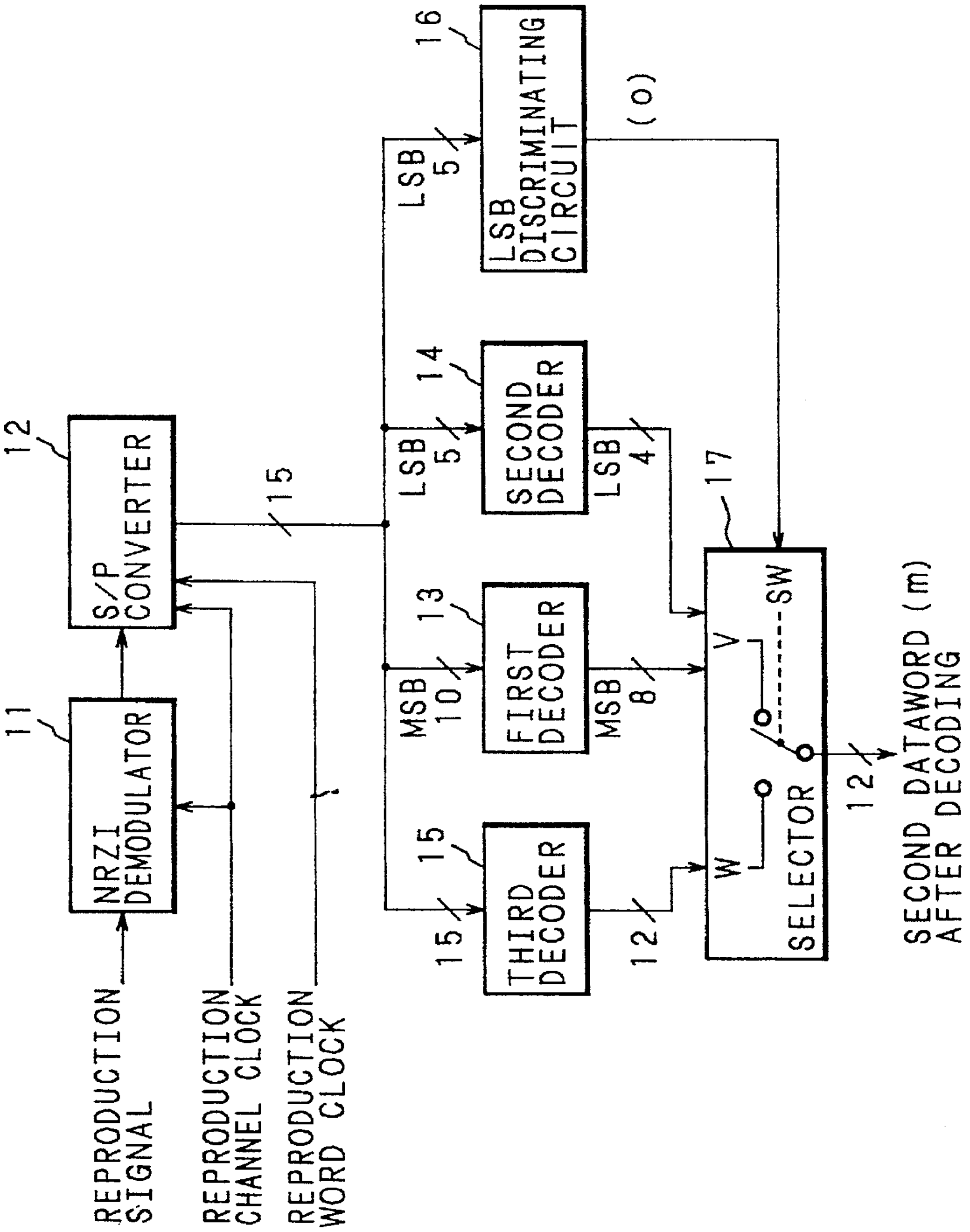
FIG. 32 is a diagram showing the configuration of a circuit for implementing a decoding method in the recording/reproducing apparatus employing the data conversion method of the first embodiment.

FIG. 32 is a diagram illustrating an example of a circuit configuration for decoding the reproduced 15-bit code-word into the original 12-bit second dataword (m), employed in the recording/reproducing apparatus using the data conversion method of the first embodiment in FIG. 32, the reference numeral 11 is an NRZI demodulator for NRZI-demodulating the reproduction signal transmitted by a reproduction channel clock; 12 is a serial parallel converter for converting the NRZI-demodulated serial signal, fed from the NRZI demodulator 11, to a 15-bit parallel signal by using a reproduction word clock which is word-synchronized by a synchronizing signal appended to the top of each block; 13 is a first decoder for accepting at its input the 10 bits n1 on the MSB side of the 15-bit codeword (n) output from the serial parallel converter 12 and for decoding the n1 into a dataword that forms the eight bits on the MSB side of the second dataword; and 14 is a second decoder for accepting at its input the five bits n2 on the LSB side of the 15-bit codeword (n) output from the serial/parallel converter 12 and for decoding the n2 into a dataword that forms the four bits on the LSB side of the second dataword. The numeral 15 designates a third decoder for decoding the 15-bit codeword, output from the serial/parallel converter 12, into 12-bit decoded data the third decoder 15 is constructed to perform one-to-one decoding when the five bits on the LSB side is of a prescribed type.

Furthermore the reference numeral 16 indicates an the discriminating circuit which accepts at its input the five bits on the LSB side of the 15-bit codeword output from the serial/parallel converter 12, and which discriminates the type of the codeword and outputs a control signal (o) designating the classification type; and 17 refers to a selector which selects either the 12-bit dataword having decoded data from the first decoder 13 and the second decoder 14 or the 12-bit dataword from the third decoder 15 by using the control signal supplied from the LSB discriminating circuit 17 as a select SW, and which generates the second dataword (m) after decoding.

The operation of this embodiment will now be described. The reproduction signal is NRZI-demodulated by the NRZI demodulator 11 and fed to the serial/parallel converter 12 through which the demodulated serial signal is converted to a 15-bit codeword (n). Of the 15 bits in the codeword (n), the 10 bits n1 on the MSB side are entered to the first demodulator 13, and the five bits n2 on the LSB side are fed to the second demodulator 14 as well as to the LSB discriminating circuit 16. On the other hand, all the 15 bits of the codeword (n) are loaded directly into the third demodulator 15.

We will now describe in detail the operation of decoders for decoding the 15-bit codeword back into the 12-bit second dataword. From FIGS. 8 to 10, the five-bit codeword n2 on the LSB side of the 15-bit codeword can be classified in relation to the demodulated 4-bit dataword m2, as shown in FIG. 33. The codewords classified as the first the code group in FIG. 33 correspond to the LSB codewords n2 in the first and second coding groups in FIGS. 8 and 9 as well as in the first n1 group for m1="BB" to "E7" in the third coding group in FIG. 10, and each n1 in the n1 group is related to one decoding data m1 within the limits of the first the code group. Further, the codewords classified as the second the code group correspond to the LSB codewords classified as the second n1 group in the third coding group as well as the fourth n1 group for m1="EE" to "FF " in the same coding group. The codewords classified as the third the code group correspond to the LSB codewords classified as the third n1 group, while the codewords classified as the fourth the code group correspond to the LSB codewords in the nl group for m1="E8" to "FF". Note, however, that the n1 group in the second to the fourth the code groups overlaps with the n1 group in the first the code group, and that, in some cases, a plurality of m2are mapped to one the codeword n2.

Now, the first decoder 13 decodes the 10 bits on the MSB side into an eight-bit dataword. In this case, the top bit in the 10-bit codeword is a control bit for controlling the DSV during demodulation and may therefore be disregarded at the time of decoding. Thus, the remaining nine bits are decoded. The decoding is performed on the codewords in the first and second coding groups in FIGS. 8 and 9 as well as in the first n1 group for m1="BB" to "E7"in the third coding group in FIG. 10, and the decoded 8-bit dataword is applied to V11–V4 on the selector 17 as data representing the eight bits on the MSB side of the second dataword. On the other hand, the second decoder 14 decodes the five bits on the LSB side into a four-bit dataword. In this case, the decoding is performed on the codeword n2 in the first the code group. The decoded 4-bit dataword is applied to V3–V0 on the selector 17 as data representing the four bits on the LSB side of the second dataword. The third decoder 15 decodes the input 15-bit codeword into a 12-bit dataword. In this case also the top bit on the MSB side is excluded, as in the case of the first decoder 13, and the remaining 14 bits are decoded. The decoding is performed only when the five-bit the codeword falls in one of the second to the fourth the code groups, and the decoded 12-bit dataword is applied to W11–W0 on the selector 17.

The selector 17 is switched to select either the dataword supplied from the first decoder 13 and second decoder 14 or the dataword supplied from the third decoder 15, and outputs the selected dataword as the decoded second dataword; the switching of the selector 17 is controlled by a control signal supplied from the LSB discriminating circuit 16. Of the 15 bits in the codeword, the five bits n2 on the LSB side are input to the LSB discriminating circuit 16 to discriminate the type of the LSB codeword. For example, if the LSB codeword n2 is a codeword discriminated as belonging to one of the second to the fourth the code groups, the LSB discriminating circuit 16 outputs a control signal (o) indicating the discriminated type and applies it to the select SW on the selector 17. When no control signal (o) is received, the selector 17 selects the eight-bit MSB dataword V11–V4 supplied from the first decoder 13 and the four-bit the dataword V3–V0 supplied from the second decoder 14 and outputs the resulting 12-bit dataword V. On the other hand, when the control signal (o) is received, the selector 17 is switched to select the 12-bit dataword W decoded by the third decoder 15.

Thus, the selector 17 outputs the 12-bit dataword m obtained by reconverting the codeword that was encoded in accordance with the tables shown in FIGS. 8 to 10. As described, the 15-bit codeword is decoded on a one-to-one basis to the 12-bit dataword only when the five-bit the codeword n2 is discriminated as belonging to one of the second to the fourth the code groups in FIG. 33; otherwise, the 15-bit codeword is decoded by dividing it into 10 bits on the MSB side and five bits on the LSB side. This construction serves to reduce the possibility of the error propagation that may occur between decoded first datawords due to a single bit detection error in the 15-bit codeword.

In the above decoding method, the discrimination of the five-bit LSB codeword is determined by which of the two major groups, the first the code group or the second to fourth the code group, the LSB codeword belongs to. However, in an alternative method, the types of codeword may be classified into three major groups, for example, the first the code group, the second the code group, and the third fourth the code group, and four decoders, i.e. the first to the fourth decoders, may be provided, the outputs of these decoders being selected accordingly by using a control signal from the LSB discriminating circuit. Such configuration may somewhat increase the circuit complexity compared to that of the above embodiment, but will serve to further reduce the possibility of error propagation between decoded first datawords.

Thus, according to the first embodiment, eight-bit first datawords are first word-converted to 12-bit second datawords, and then, the 12-bit second datawords are converted to 15-bit codewords, each having bits of CDS=+1 or −1, by executing word-synchronization for every two second datawords, which is the least common multiple of the first and second datawords. In the conversion process, the first byte of the first dataword is mapped to the eight bits on the MSB side of the first of the two second datawords, and the four bits on the MSB side of the second byte of the first dataword are mapped to the four bits on the LSB side of the first of the two second datawords. For the second of the two second dataword, the third byte of the first dataword is mapped to the eight bits on the MSB side, while the four bits on the LSB side of the second byte of the first dataword are mapped to the four bits on the LSB side of the second of the two second datawords, thus accomplishing the 8/12 word-conversion. Thereafter each 12-bit dataword is converted to a 15-bit codeword (12/15 data conversion). This encoding method permits the 8/10 encoding of non-divided first datawords and the 4/5 is encoding of divided first datawords which serves to reduce the possibility of the error propagation that may occur due to a single bit error in the codeword, between first datawords during reverse conversion at the time of decoding. Furthermore, when this data conversion method is applied to a recording/reproducing apparatus, it is possible to construct a system capable of efficient recording of data without requiring redundant bits, the system being constructed such that the number of first datawords for each block separated by a synchronizing signal is set at a multiple of r/x and that the first dataword as the synchronizing signal at the beginning of the block is formed from a fixed pattern and the immediately following first dataword is formed from a fixed pattern of four bits on the MSB side and data of four or less bits (e.g., cue signal, track address, etc.) on the LSB side.

On the other hand, when decoding the 15-bit codeword into the 12-bit second dataword, the 15-bit codeword is divided into 10 bits on the MSB side and five bits on the LSB side, and the 10 bits are decoded into eight bits by the first decoder and the five bits are decoded into four bits by the second decoder, while the 15 bits are decoded into 12 bits by the third decoder. The discriminating circuit discriminates the type of the five bits on the LSB side of the 15-bit codeword and outputs a control signal indicating the discriminated type, on the basis of which the decoded data from the decoders are selected to reconstruct the second dataword. Thus, the codeword is decoded by reverse conversion of 10/8 and 5/4, except when the LSB codeword falls under specific conditions. This has the effect of reducing the possibility of the error propagation that may occur between decoded first datawords due to a detection error in the codeword.

Embodiment 2

A second embodiment of the invention will now be described below. Suppose a code of dataword length =12 and codeword length =14 with one bit added to form a code with Tmax/Tmin=5. Here let d=0 and k=4. The NRZI(F) rule is used to construct the code. To satisfy k=4 in each codeword, the number of successive 0s in the codeword is limited to 4, and since one bit is inserted between codewords, the number of successive 0s is limited to 2 on the MSB side and 1 on the LSB side.

To form a DC-free code, 4096 pairs of codewords, each pair having codewords of different CDS polarities, should be provided. There are 2481 codewords with CDS=0, 2169 codewords with CDS=+2, and 1888 codewords with CDS= −2, which satisfy the above conditions. Hence, 2481 codewords with CDS=0 and 1615 pairs of codewords with CDS=±2, which differ only in MSB, are used to suppress the dispersion of DSV to achieve DC-free modulation. Code conversion tables thus constructed are shown in FIGS. 34 to 49. The data given in FIGS. 34 to 49 represent binary digital signals in hexadecimal notation. For every 12-bit input data (dataword), there are output a total of 16 bits, i.e. a 14-bit codeword, one-bit data (hereinafter represented by Q) indicating the number of inversions performed on the NRZI-modulated codeword, and the CDS (a zero or nonzero bit) of the codeword.

Figure 50:
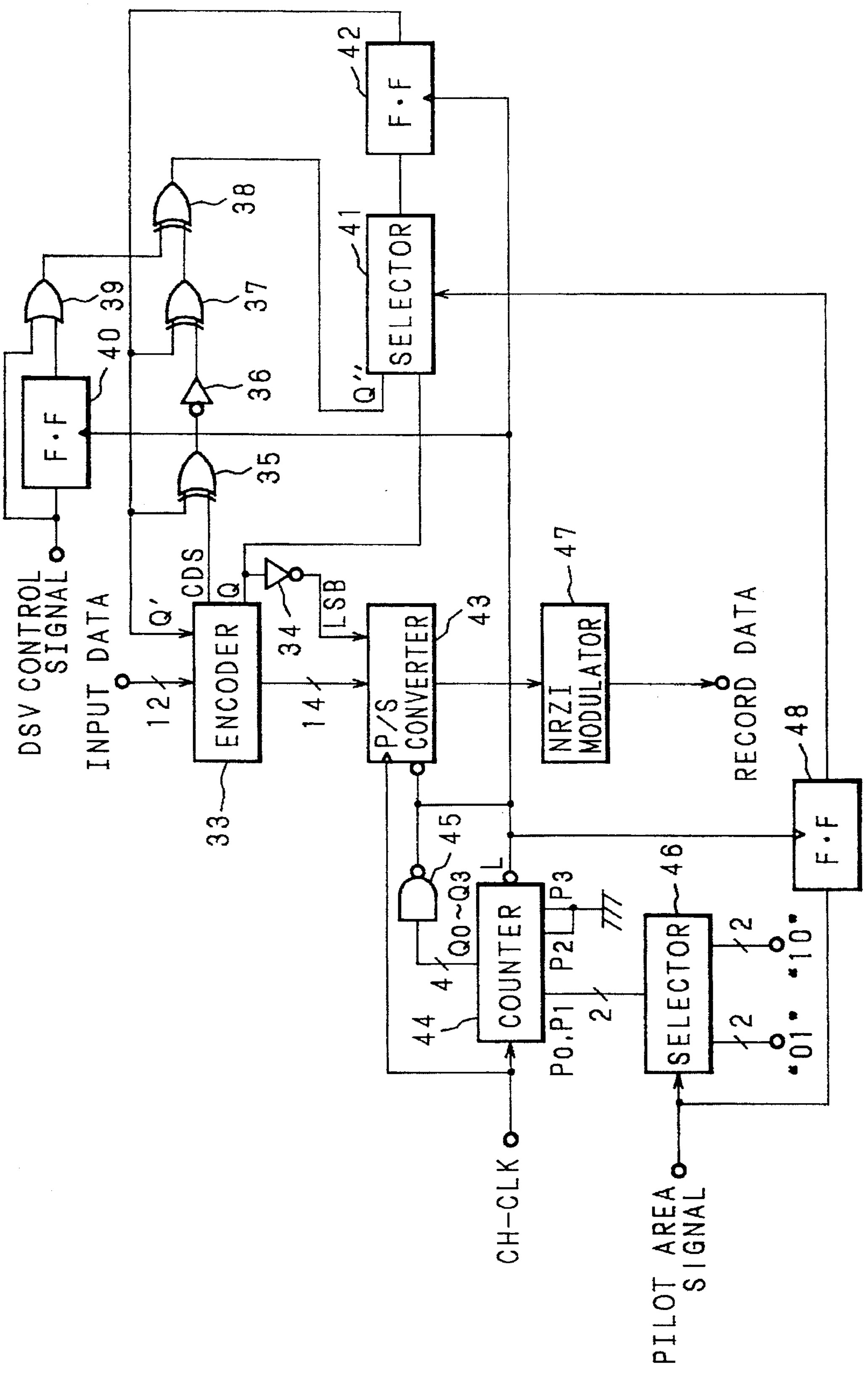
FIG. 50 is a diagram showing the circuit configuration of a data converting apparatus for implementing the data conversion method of the second embodiment.

FIG. 50 is a diagram illustrating an example of a circuit configuration implementing the second embodiment. In FIG. 50, the reference numeral 33 is an encoder for converting 12-bit digital data (dataword) to 16-bit digital data shown in FIGS. 34 to 49; 34 and 36 are NOT gates; 35, 37, 38, and 39 are EXOR gates; 40, 42, and 48 are flip-flops; 41 and 46 are selectors; 43 is a parallel/serial converter for converting 14-bit or 15-bit parallel data to a serial data sequence; 44 is a counter; 45 is a four-input NAND gate; and 47 is an NRZI modulator for processing the codeword, converted to serial data so that the signal polarity is inverted each time a 1 is input.

FIG. 51 shows a code selectable used to determine a code to be selected in accordance with the current and the previous DSV control signal values, the CDS value of the codeword just selected, and the previous Q' signal.

Figure 52A:
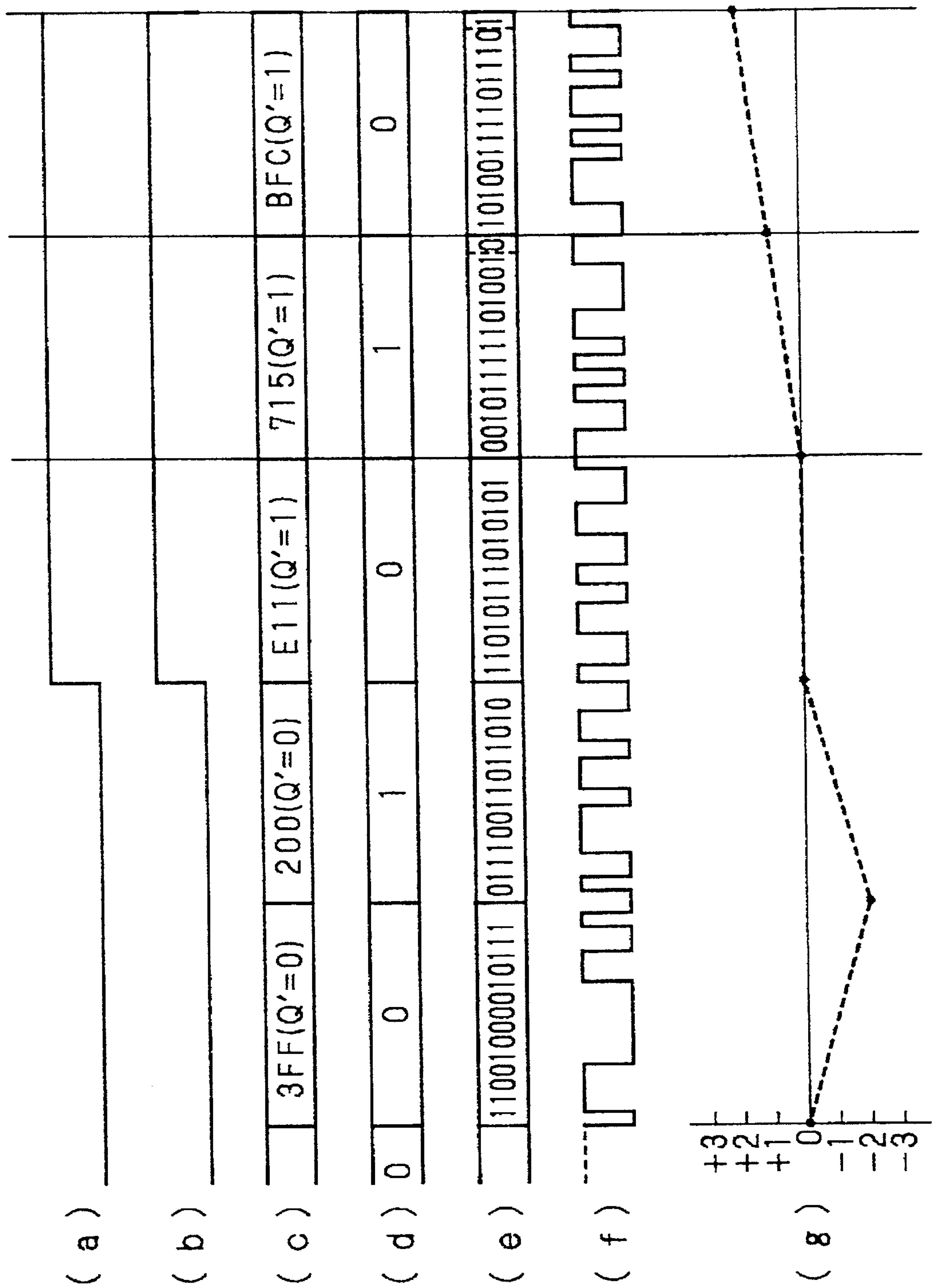
FIG. 52(A) and FIG. 52(B) are diagrams for explaining the operation of the data converting apparatus of FIG. 50.
Figure 52B:
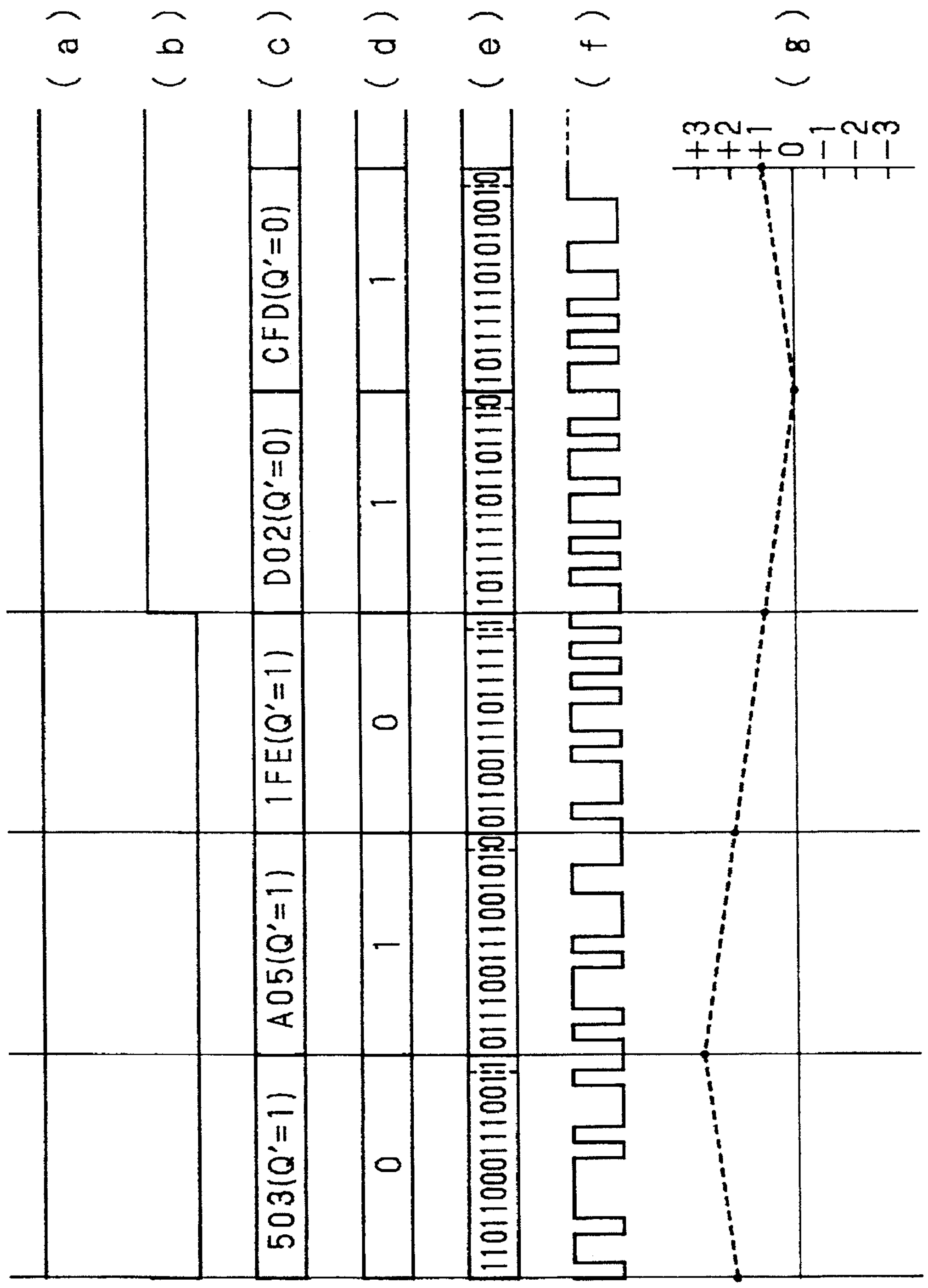

FIG. 52 is a diagram illustrating code conversion and DSV value variation according to the second embodiment. In FIG. 52, (*a*) is a pilot signal (write at "1"), (*b*) is a DSV control signal (positive direction at "1"), (*c*) is input data (12 bits), (*d*) is a code select signal Q', (*e*) is a selected codeword (*f*) is a signal waveform to be recorded, and (*g*) is a DSV value at the end of each codeword.

Figure 53:
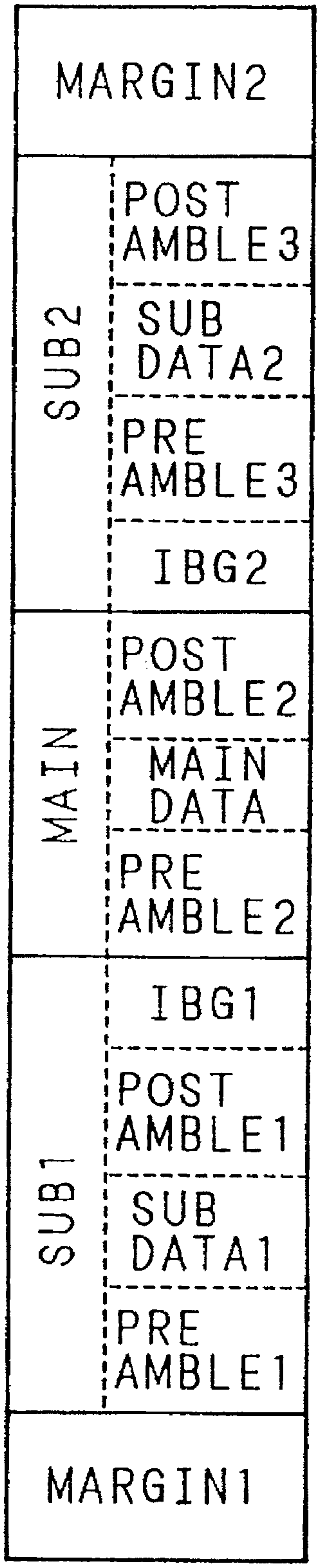
FIG. 53 is a diagram showing a recording format of a recording/reproducing apparatus according to the second embodiment.

FIG. 53 is a diagram illustrating the recording format of a magnetic recording/reproducing apparatus according to the second embodiment in FIG. 53, subcode signals, etc. are recorded in the subdata areas (SUB1, SUB2), and video and audio signals are recorded in the main data area (MAIN). Pilot signals are recorded in the subdata areas (SUB1, SUB2).

The circuit operation of the second embodiment will now be described below with reference to FIG. 50.

First, when the pilot area signal output from the flip-flop 48 is "0", i.e. when data other than that for the subdata area is to be encoded for recording, 12-bit data is input to the encoder 33 where the 12-bit data is converted to a 14-bit codeword (parallel) by using the code select signal Q' supplied from the flip-flop 42. The resulting 14-bit codeword is supplied to the parallel/serial converter 43. The encoder 33 also outputs a Q signal which is supplied to the selector 41. On the other hand the selector 46 selects "10" by the input pilot area signal "0", which sets the load value of the counter 14 to "0010", and the counter 14 outputs a load CLK of one CLK width to the parallel/serial converter 43 for every 14 CH-CLKs. The parallel/serial converter 43 converts the input 14-bit parallel codeword to serial data which is fed to the NRZI modulator 47. At this time, the output of the NOT gate 34, i.e. the LSB, is input to the parallel/serial converter 43, but since a load CLK is input for every 14 CH-CLKs, the LSB is not output from the parallel/serial converter 43. The serial codeword input to the NRZI modulator 47 is NRZI-modulated for output. The Q signal output from the encoder 33 is input to the selector 41 which selects the Q signal by the pilot area signal and supplies it to the flip-flop 42.

On the other hand, when the pilot area signal output from the flip-flop 48 is "1", i.e. when data for the subdata area is to be encoded for recording, 12-bit data is input to the encoder 33 which converts the 12-bit data to a 14-bit codeword (parallel) by using the code select signal Q' supplied from the flip-flop 42. The resulting 14-bit codeword is supplied to the parallel/serial converter 43. The encoder 33 also supplies a Q signal to the selector 41 and the NOT gate 34, and a CDS signal to the EXOR gate 35. The selector 46 selects "01" by the input pilot area signal "1", which sets the load value of the counter 14 to "0001", and the counter 14 supplies a load CLK of one CLK width to the parallel/serial converter 43 for every 15 CH-CLKs. The parallel/serial converter 43 converts the input 14-bit parallel codeword and the to serial data which is supplied to the NRZI modulator 4. The serial codeword input to the NRZI modulator 47 is NRZI-modulated for output. The DSV control signal is input to the flip-flop 40 and the EXOR gate 39, the output of the flip-flop 40 being coupled to the other input of the EXOR gate 39. The output of the EXOR gate 39, i.e. the exclusive OR sum of the current DSV control signal and the previous DSV control signal, is supplied to one input of the EXOR gate 38. The EXOR gate 35 EXORs the CDS signal output from the encoder 33 with the Q' signal. The output of the EXOR gate 35 is inverted through the NOT gate 36 and applied to one input of the EXOR gate 37. The EXOR gate 37 EXORs the output of the NOT gate 36 with the Q' signal and supplies the result to the other input of the EXOR gate 38. The EXOR gate 38 EXORs the outputs of the EXOR gates 37 and 39 and supplies the result to the other input of the selector 41. In this manner, the signal selected in accordance with the codeword select table is output as a Q" signal. The Q" signal is selected by the pilot area signal and is fed to the flip-flop 42 to form a code select signal Q' for the next coding.

Suppose, for example, that the pilot area signal is "0",the input data is "3FF",the previous polarity is "1", and the Q' signal is "0". In this case, the 14-bit codeword output from the encoder 33 is "11001000010111"; the CDS is −2 and the DSV is also −2. As a result, the Q signal "0" is output. Next, when data "200" is input since the Q' signal, i.e. the previous Q signal, is "0", the selected codeword is "01110011011010"; the CDS is +2 and the DSV is 0. Next, when the pilot area signal and the DSV control signal both go to a "1" and data "E11" is input, since the Q' signal is "1", the output codeword is "11010111010101", and a Q signal of "0" and a CDS signal of "0" are output; CDS and DSV are both 0. When data "715" is input, since the Q' signal is "1",the selected codeword is "00101111101001" and the LSB is "0"; CDS and DSV are both +1. Next, when data "BFC" is input, since the Q' signal is "1",the selected codeword is "10100111101110" and the LSB is "1"; CDS is +1 and DSV is +2. The above operation is repeated for the subdata areas where the pilot area signal is "1", thereby achieving a modulation method in which the DSV varies at the cycle of the DSV control signal.

Using the above-described modulation method, a tracking servo pilot signal is recorded at two places within one track. Therefore, in the subdata areas (SUB1, SUB2), one LSB bit is added to the 14-bit codeword to form a 15-bit codeword, as described previously, and modulation is performed on the codeword including the pilot signal, while for other areas, the 14-bit codeword is directly modulated.

According to the format shown in FIG. 53, two sub data areas are provided within one track, and the pilot signals are recorded in these areas. Alternatively, three or more pilot signal recording areas may be provided within one track in order to enhance the tracking accuracy with a narrower track. It will also be appreciated that the pilot signal may be recorded in any portion within the subdata areas.

As described, according to the second embodiment, 12-bit datawords are each converted to a 14-bit codeword which, after NRZI modulation has a succession of the same level, more than one bit long and five bits at maximum, and provides CDS=0, +2 or −2, the CDS value being controlled to suppress the dispersion of DSV thus accomplishing a DC-free modulation method. Furthermore, in areas where pilot signals are recorded, one bit is added to the 14-bit codeword to form codewords of CDS=±1, and the modulation is performed so that the DSV varies in synchronism with the DSV control signal to produce a tracking control pilot signal. This eliminates the need for ATF areas, the areas where only tracking control signals are recorded. Moreover, since one bit is added to the codeword and the pilot signal is recorded in a restricted area, it is not necessary to substantially raise the recording rate, and therefore, high density recording is achieved. Furthermore, since the modulation method is basically the same for both the pilot signal areas and other areas, the configuration does not involve any appreciable increase in the circuit complexity.

As this invention may be embodied in several forms without departing from the spirit of essential characteristics thereof, the present embodiment is therefore illustrative and not restrictive, since the scope of the invention is defined by the appended claims rather than by the description preceding them and all changes that fall within metes and bounds of the claims, or equivalence of such metes and bounds thereof are therefore intended to be embraced by the claims.

What is claimed is:

1. A data conversion method for word-converting an r-bit first dataword to an m-bit second dataword (r<m) and converting the word-converted m-bit second dataword to an n-bit codeword (m<n) comprising the steps of:

dividing a sequence of first datawords into groups of x bits and x/r first datawords where x is the least common multiple of r and m;

dividing an arbitrary first dataword of each said group into r/(x/m) bit first dataword portions; and forming the m-bit second dataword by appending an r/(x/m)-bit first dataword portion to each remaining one of said x/r first datawords in each said group.

2. A recording/reproducing apparatus employing the data conversion method of claim 1, further comprising:

means for formatting blocks so that each block separated by a synchronizing signal contains a number of the first datawords equal to an integral multiple of x/r.

3. A recording/reproducing apparatus employing the data conversion method of claim 1, further comprising:

means for mapping r bits and r/(x/m) bits to a second dataword corresponding to a synchronizing signal; and means for mapping the remaining bits of the divided first dataword to a data signal other than the synchronizing signal.

4. A recording/reproducing apparatus employing the data conversion method of claim 1, further comprising:

first decoding means for decoding the n1-bit first codeword portion onto an r bit first data word portion;

second decoding means for decoding the n2-bit second codeword portion into an r/(x/m) bit second dataword portion;

third decoding means for decoding the n bits into the m bits;

identifying means for identifying the type of bits at prescribed positions in the n-bit codeword and for outputting an identification signal designating the identified type; and means for selecting decoded data from the first, second, or third decoding means on the basis of the identification signal supplied from the identifying means and for producing and outputting the decoded second dataword therefrom.

5. The data conversion method of claim 1 further comprising the step of converting each m-bit second dataword into an n-bit codeword.

6. The data conversion method of claim 5 further comprising the step of dividing each n-bit codeword into an n1-bit first codeword portion an n2-bit second codeword portion.

7. An apparatus for converting r-bit first datawords into m-bit second datawords where r is less than m and into n-bit codewords comprising the steps of:

dividing means for dividing each m-bit dataword into m1-bit and m2-bit dataword portions where a m1-bit dataword portion corresponds to a first dataword and where a m2-bit dataword portion corresponds to at least a portion of another first dataword; and assigning means for assigning to each m-bit dataword having m1-bit and m2-bit dataword portions first and second n-bit codewords each having n1-bit and n2-bit dataword portions corresponding to said m1-bit and m2-bit codeword portions, respectively, said first and second n-bit codewords having different CDSs (codeword digital sums) and forming n-bit codeword pairs, the possible number of codeword pairs which adhere to any run length limitation being sufficient to specify all possible said datawords, codes of at least one of said n1-bit and n2-bit codeword portions which adhere to any run length limitation being insufficient to uniquely encode said m1-bit and m2-bit dataword portions, respectively, and said assigning means assigning to each n1-bit codeword portion having a CDS of u, a pair of n2-bit codeword portions having CDSs of v and x respectively, such that u+v and u+x are said different CDSs, and wherein said assigning means first assigns n1-bit codeword portions and n2-bit codeword portions to said m1-dataword portions and said m2-bit dataword portions in unique one to one mappings, where possible, thereby minimizing error propagation between said n1-bit and n2-bit codeword portions, and where said unique one to one mappings to n1-bit and n2-bit codeword portions are not possible, said assigning means subsequently assigns unique combinations of n1-bit and n2-bit codeword portions to the m1-bit and m2-bit dataword combinations so that said n1-bit codeword portion must be known to decode the 2-bit codeword portion, or vice versa.

8. The apparatus of claim 7 wherein r=8, m=12, n=15, m1=8, m2=4, n1=10, and n2=5. m2=4, n1=10, and n2=5.

9. A magnetic recording/reproducing apparatus for recording multiple kinds of data formed by dividing digital data into 12-bit datawords and then converting the 12-bit datawords into 14-bit codewords having a most significant bit (MSB) side and a least significant bit (the) side said data being stored in partitioned areas, comprising:

first means for converting digital data to codewords for recording on one or more areas within one track, the first means limiting the number of successive 0s between a 1 and another 1 in each said codeword to 4 or less within the codeword and to 2 or less at the MSB side of the codeword and to 1 or less at the LSB side of the codeword, codewords having a codeword digital sum (CDS) of 0 solely corresponding to each 12-bit dataword while for codewords having a CDS of +2 or −2, pairing the two codewords that differ only in MSB and which correspond to the 12-bit data, the two codewords being switched selectively by using polarity signals of the respective codewords; and second means for converting digital data to codewords in the other areas in the same track, the second means limiting the number of successive 0s between a 1 and another 1 in each said codeword to 4 or less within the codeword and to 2 or less at the MSB side of the codeword and to 1 or less at the LSB side of the codeword, codewords having a codeword digital sum (CDS) of 0 solely corresponding to each 12-bit dataword, while for codewords having a CDS of +2 or −2, pairing the two codewords that differ only in MSB and which correspond to the 12-bit data, the two codewords being switched selectively by using polarity signals of the respective codewords, said second means appending at least one bit to each 14-bit codeword to form a pair of codewords one having a CDS of +1 and the other having a CDS of −1, with the number of successive 0s between a 1 and another 1 in the code sequence being limited to 4 or less, and one or the other of the pair of codewords being selected in accordance with the DSV control signal so as to produce a pilot signal.

10. A data converting apparatus for word-converting an r-bit first dataword to an m-bit second dataword (r<m) and converting the word-converted m-bit second dataword to an n-bit codeword (m<n) comprising:

means for dividing a sequence of first datawords into groups of x bits and x/r first datawords where x is the least common multiple of r and m;

means for dividing an arbitrary first dataword of each said group into r/(x/m) bit first dataword portions; and means for forming the m-bit dataword by appending an r/(x/m)-bit first dataword portion to each remaining one of said x/r first datawords in each said group.

11. A recording/reproducing apparatus for digital data, comprising:

means for, when a plurality of data groups are recorded on a medium, recording each data group in respective divided areas each said data group including a plurality of datawords;

means for converting each m-bit dataword to an n-bit (n>m) first codeword having a finite CDS (codeword digital sum); and means for generating an n+k-bit second codeword, where k is an integer greater than zero, the CDS of said second codeword being selected by a DSV (digital sum variation) control signal by appending a dummy k-bit to said first codeword so that a DSV of a sequence of said second codewords varies in synchronization with the DSV control signal, which has a same period as that of a pilot signal and instructs the DSV variation direction of said sequence of said second codewords, to produce a tracking control pilot signal; and wherein said tracking control pilot signal is generated in at least one or more data group areas.

12. A recording/reproducing apparatus set forth in claim 11, characterized in that when the m-bit dataword is converted to the n-bit first codeword, the first codeword is composed of a "zero" codeword group consisting of n-bit codewords of CDS= and "non-zero" codeword groups consisting of pairs of n-bit codewords of CDS =+2 and CDS= −2.

13. A method of converting r-bit first datawords into m-bit second datawords where r/s less than m and subsequently into n-bit codewords, each of said datawords having a most significant bit (MSB) side and a least significant bit (the) side comprising:

a) dividing a sequence of r-bit first datawords into groups of x bits and x/r first datawords, where x is the least common multiple of r and m;

b) dividing one of said first datawords into r/(x/m)-bit first dataword portions;

c) associating an r/(x/m)-bit first dataword portion with each of the remaining ones of said first datawords within each said group to develop m-bit second datawords, said step c) of associating placing every r/(x/m)-bit first dataword portion on the same one of said MSB or LSB side of the remaining ones of said first datawords within each said group.

14. The method of claim 13 wherein each group is divided into first through third said first datawords, said step c) including the steps of:

(c1) associating an r/(x/m)-bit portion corresponding to a first half of second said first dataword divided in said step b) to the LSB side of a first said first dataword, and (c2) associating an r/(x/m)-bit portion corresponding to a second half of second said first dataword divided in said step b) to the LSB side of a third said first dataword.

15. The method of claim 13 wherein the placement of the first dataword portions on the same one of said MSB or the side of the remaining ones of said first datawords within each said group enables the encoding of said m-bit second datawords into n-bit codewords with a reduced possibility that errors will be propagated between datawords.

16. The method of claim 15 further comprising the steps of d) dividing each m-bit dataword into m1-bit and m2-bit dataword portions where a m1-bit dataword portion corresponds to a first dataword and where a m2-bit dataword portion corresponds to at least a portion of another first dataword;

e) assigning to each m-bit dataword having m1-bit and m2-bit dataword portions first and second n-bit codewords each having n1-bit and n2-bit codeword portions corresponding to said m1-bit and m2-bit dataword portions, respectively, said first and second n-bit codewords having different CDSs and forming n-bit codeword pairs, the possible number of codeword pairs which adhere to any run length limitation being sufficient to specify all possible said datawords, codes of at least one of said n1-bit and n2-bit codeword portions which adhere to any run length limitation being insufficient to uniquely encode said m1-bit and m2-bit dataword portions, respectively, said step e) of assigning including, i) assigning to each n1-bit codeword portion having a CDS of u, a pair of n2-bit codeword portions having CDSs of v and w respectively, such that u+v and u+x are said different CDSs, said step i) first assigning n1-bit codeword portions and n2-bit codeword portions to said m1-dataword portions and said m2-bit dataword portions in unique one to one mappings, where possible, thereby minimizing error propagation between said n1-bit and n2-bit codeword portions, wherein when said unique one to one mappings to n1-bit and n2-bit codeword portions are not possible, said step i) subsequently assigning unique combinations of n1-bit and n2-bit codeword portions to the m1-bit and m2-bit dataword combinations so that said n1-bit codeword portion must be known to decode the n2-bit codeword portion, or vice versa.

17. The method of claim 13 further comprising the steps of d) developing plural n-bit codewords from each m-bit dataword, each of said plural codewords for a said dataword having a different known CDS (codeword digital sum);

e) providing a DSV (digital sum variation) control signal representative of a desired variation in DSV which can be accomplished by selection of a codeword having a selected CDS; and f) selecting one of said plural codewords having the known CDS required to produce the desired variation in DSV represented by said DSV control signal to make the DSV of said codeword string correspond to desired variation in DSV.

18. The method of claim 17 wherein said plural codewords associated with each m-bit dataword include codewords having CDSs which are of opposite polarity.

19. The method of claim 18 wherein said desired variation in DSV is periodic and produces a pilot signal superimposed on the encoded data to enable tracking of said encoded data when linearly recorded on an information track.

20. The method of claim 19 further comprising NRZI modulating said selected codewords to produce a signal for recording.

21. A method of storing data in an m-bit dataword string as codewords encoded on tracks of a magnetic medium, comprising the steps of:

a) converting m-bit datawords into a corresponding less than n bit codewords, at least some of said m-bit datawords being mapped into first and second less than n bit codewords having complementary CDSs (codeword digital sums);

b) adding at least one additional bit to one end of each said less than n bit codewords to form an n-bit codeword including, i) developing a DSV (digital sum variation) control signal to control the DSV to a desired value, ii) developing the at least one additional bit under control of said DSV control signal, iii) adding the at least one additional bit to said less than n bit codeword to produce an n-bit codeword having a known CDS which produces a desired amount of change in DSV, said step b) adding a pilot signal to said data.

22. The method of claim 21 wherein said plural codewords associated with each dataword include codewords having CDSs which are of opposite polarity.

23. The method of claim 21 wherein said DSV control signal periodically varies to produce a pilot signal superimposed on the encoded data to enable tracking of said encoded data when linearly recorded on an information track.

24. The method of claim 23 further comprising NRZI modulating said selected code word to produce a signal for recording.

25. The method of claim 24 wherein said DSV control signal alternates every k words, where k is an integer.

26. A method of storing data in an m-bit dataword string as codewords encoded on tracks of a magnetic medium, comprising the steps of:

a) converting m-bit datawords into a corresponding less than n bit codewords, at least some of said m-bit datawords being mapped into first and second less than n bit codewords having different known CDSs (codeword digital sums);

b) adding at least one additional bit to one end of each said less than n bit codewords to form an n-bit codeword, said step b) of adding being responsive to a DSV (digital sum variation) control signal to produce a periodically varying DSV as a pilot signal, said step b) embedding a pilot signal in the digital data signal by periodically varying the DSV of the codeword string by selecting between values of said at least one additional bit which produce n-bit codewords having complementary CDSs.

27. The method of claim 26 wherein said step b) of adding includes the step of, defining a desired pilot signal by producing a DSV control signal representative of the desired variation in DSV.

28. A method of storing data in an m-bit dataword string as codewords encoded on tracks of a magnetic medium, comprising the steps of:

a) converting m-bit datawords into a corresponding less than n bit codewords, at least some of said m-bit datawords being mapped into first and second less than n bit codewords having complementary CDSs (codeword digital sums);

b) during first portions of each track, selecting between said first and second less than n bit codewords so as to minimize dispersion and recording said selected less than n-bit codewords on said track;

c) during second portions of each track, adding at least one additional bit to one end of each said less than n bit codewords to form an n-bit codeword including, i) developing a DSV (digital sum variation) control signal to control the DSV to a desired value, ii) developing the at least one additional bit under control of said DSV control signal, iii) adding the at least one additional bit to said less than n bit codeword to produce an n-bit codeword having a known CDS which produces a desired amount of change in DSV and iv) recording said n-bit codewords on said track said step c) adding a pilot signal to said data in said second portions of said track.

29. The method of claim 28 wherein each of said data words have a most significant bit (MSB) side and a least significant bit (the) side, said step c) adding said at least one additional bit to the LSB side of each said less than n-bit codeword.

30. The method of claim 28 wherein said less than n-bit codewords stored in said first portions of said track define main data;

said n-bit codewords stored on said second portions of said track defining sub-data which includes a pilot signal.

31. The method of claim 30 wherein said second portions are encoded on the ends of each said track.

32. A method of converting r-bit first datawords into m-bit second datawords, where r/s less than m, and into n-bit codewords, comprising the steps of:

a) dividing each m-bit dataword into m1-bit and m2-bit dataword portions where a m1-bit dataword portion corresponds to a first dataword and where a m2-bit dataword portion corresponds to at least a portion of another first dataword;

b) assigning to each m-bit dataword having m1-bit and m2-bit dataword portions first and second n-bit codewords each having n1-bit and n2-bit dataword portions corresponding to said m1-bit and m2 bit codeword portions, respectively, said first and second n-bit codewords having different CDSs (codeword digital sums) and forming n-bit codeword pairs, the possible number of codeword pairs which adhere to any run length limitation being sufficient to specify all possible said datawords, codes of at least one of said n1-bit and n2-bit codeword portions which adhere to any run length limitation being insufficient to uniquely encode said m1-bit and m2-bit dataword portions, respectively, said step of assigning including, i) assigning to each n1-bit codeword portion having a CDS of u, a pair of n2-bit codeword portions having CDSs of v and x respectively, such that u+v and u+x are said different CDSs, said step i) first assigning n1-bit codeword portions and n2-bit codeword portions to said m1-dataword portions and said m2-bit dataword portions in unique one to one mappings, where possible, thereby minimizing error propagation between said n1-bit and n2-bit codeword portions, where said unique one to one mappings to n1-bit and n2-bit codeword portions are not possible, said step i) subsequently assigning unique combinations of n1-bit and n2-bit codeword portions to the m1-bit and m2-bit dataword combinations so that said n1-bit codeword portion must be known to decode the n2-bit codeword portion, or vice versa.

33. The method of claim 32 wherein r=8, m=12, n=15, m1=8, m2=4, n1=10, and n2=5.

34. An apparatus for storing data in an m-bit dataword string as codewords encoded on tracks of a magnetic medium, comprising:

a converter converting m-bit datawords into a corresponding less than n bit codewords, at least some of said m-bit datawords being mapped into first and second less than n bit codewords having different known CDSs (codeword digital sums); and developing means for adding at least one additional bit to one end of each said less than n bit codewords to form an n-bit codeword, said adding operation being responsive to a DSV (digital sum variation) control signal to produce a periodically varying DSV as a pilot signal, and said developing means for embedding a pilot signal in the digital data signal by periodically varying the DSV of the codeword string by selecting between values of said at least one additional bit which produce n-bit codewords having complementary CDSs.

35. The apparatus of claim 34 wherein said developing means defines a desired pilot signal by producing a DSV control signal representative of the desired variation in DSV.

36. An apparatus for converting r-bit first datawords into m-bit second datawords where r/s less than m, and subsequently into n-bit codewords, each of said datawords having a most significant bit (MSB) side and a least significant bit (the) side, comprising:

first dividing means for dividing a sequence of r-bit first datawords into groups of x bits and x/r first datawords, where x is the least common multiple of r and m, and for dividing one of said first datawords into r/(x/m)-bit first dataword portions; and associating means for associating an r/(x/m)-bit first dataword portion with each of the remaining ones of said first datawords within each said group to develop m-bit second datawords, said associating means placing every r/(x/m)-bit first dataword portion on the same one of said MSB or LBS side of the remaining ones of said first datawords within each said group.

37. The apparatus of claim 36 wherein said first dividing means divides each group into first through third said first datawords; and said associating means associates an r/(x/m)-bit portion, corresponding to a first half of second said first dataword divided by first dividing means, to the LSB side of a first said first dataword and associates an r/(x/m)-bit portion corresponding to a second half of second said first dataword divided by said first dividing means, to the LSB side of a third said first dataword after shuffling said third said first dataword and said second half of said second said first dataword.

38. The apparatus of claim 36 were in said associating means places the first dataword portions on the same one of said MSB or the side of the remaining ones of said first datawords within each said group enables the encoding of said m-bit second datawords into n-bit codewords with a reduced possibility that errors will be propagated between datawords.

39. The apparatus of claim 38 further comprising:

second dividing means for dividing each m-bit dataword into m1-bit and m2-bit dataword portions where a m1-bit dataword portion corresponds to a first dataword and where a m2-bit dataword portion corresponds to at least a portion of another first dataword; and assigning means for assigning to each m-bit dataword having m1-bit and m2-bit dataword portions first and second n-bit codewords each having n1-bit and n2-bit codeword portions corresponding to said m1-bit and m2-bit dataword portions, respectively, said first and second n-bit codewords having different CDSs and forming n-bit codeword pairs, the possible number of codeword pairs which adhere to any run length limitation being sufficient to specify all possible said datawords, codes of at least one of said n1-bit and n2-bit codeword portions which adhere to any run length limitation being insufficient to uniquely encode said m1-bit and m2-bit dataword portions, respectively, and said assigning means for assigning to each n1-bit codeword portion having a CDS of u, a pair of n2-bit codeword portions having CDSs of v and w respectively, such that u+v and u+x are said different CDSs, and wherein said assigning means first assigns n1-bit codeword portions and n2-bit codeword portions to said m1-dataword portions and said m2-bit dataword portions in unique one to one mappings, where possible, thereby minimizing error propagation between said n1-bit and n2-bit codeword portions, and when said unique one to one mappings to n1-bit and n2-bit codeword portions are not possible, said assigning means subsequently assigns unique combinations of n1-bit and n2-bit codeword portions to the m1-bit and m2-bit dataword combinations so that said n1-bit codeword portion must be known to decode the n2 bit codeword portion, or vice versa.

40. The apparatus of claim 36 further comprising means for developing plural n-bit codewords from each m-bit dataword, each of said plural codewords for a said dataword having a different known CDS (codeword digital sum);

means for providing a DSV (digital sum variation) control signal representative of a desired variation in DSV which can be accomplished by selection of a codeword having a selected CDS; and means for selecting one of said plural codewords having the known CDS required to produce the desired variation in DSV represented by said DSV control signal to make the DSV of said codeword string correspond to desired variation in DSV.

41. The apparatus of claim 40 wherein said plural codewords associated with each m-bit dataword include codewords having CDSs which are of opposite polarity.

42. The apparatus of claim 41 wherein said desired variation in DSV is periodic and produces a pilot signal superimposed on the encoded data to enable tracking of said encoded data when linearly recorded on an information track.

43. The apparatus of claim 42 further comprising means for NRZI modulating said selected codewords to produce a signal for recording.

44. An apparatus for storing data in an m-bit dataword string as codewords encoded on tracks of a magnetic medium, comprising:

a converter converting m-bit datawords into a corresponding less than n codewords, at least some of said m-bit datawords being mapped into first and second less than n bit codewords having complementary CDSs (codeword digital sums);

developing means for adding at least one additional bit to one end of each said less than n bit codewords to form an n-bit codeword, for developing a DSV (digital sum variation) control signal to control the DSV to a desired value, for developing the at least one additional bit under control of said DSV control signal, for adding the at least one additional bit to said less than n bit codeword to produce an n-bit codeword having a known CDS which produces a desired amount of change in DSV and for adding a pilot signal to said data.

45. The apparatus of claim 44 wherein said plural codewords associated with each dataword include codewords having CDSs which are of opposite polarity.

46. The apparatus of claim 44 wherein said DSV control signal periodically varies to produce a pilot signal superimposed on the encoded data to enable tracking of said encoded data when linearly recorded on an information track.

47. The apparatus of claim 46 further comprising means for NRZI modulating said selected code word to produce a signal for recording.

48. The apparatus of claim 47 wherein said DSV control signal alternates every k words, where k is an integer.

49. An apparatus for storing data in an m-bit dataword string as codewords encoded on tracks of a magnetic medium, comprising:

a converter converting m-bit datawords into a corresponding less than n bit codewords, at least some of said m-bit datawords being mapped into first and second less than n bit codewords having complementary CDSs (codeword digital sums);

a selector, during first portions of each track, selecting between said first and second less than n bit codewords so as to minimize dispersion and recording said selected less than n-bit codewords on said track; and developing means, during second portions of each track, for adding at least one additional bit to one end of each said less than n bit codewords to form an n-bit codeword, for developing a DSV (digital sum variation) control signal to control the DSV to a desired value, for developing the at least one additional bit under control of said DSV control signal, for adding the at least one additional bit to said less than n bit codeword to produce an n-bit codeword having a known CDS which produces a desired change in DSV, and said developing means including a recorder recording said n-bit codewords on said track; and wherein said developing means adds a pilot signal to said data in said second portions of said track.

50. The apparatus of claim 49 wherein each of said data words have a most significant bit (MSB) side and a least significant bit (the) side, and said developing means adds said at least one additional bit to the LSB side of each said less than n-bit codeword.

51. The apparatus of claim 49 wherein said less than n-bit codewords stored in said first portions of said track define main data;

said n-bit codewords stored on said second portions of said track defining sub-data which includes a pilot signal.

52. The apparatus of claim 51 wherein said second portions are encoded on the ends of each said track.

53. A data conversion method for converting an m-bit dataword to a codeword consisting of a greater number of bits than m, comprising the steps of:

a) converting each m-bit dataword into an n-bit codeword of codeword digital sum=0, +2, or −2; and b) adding at least one bit to each n-bit codeword produced by said step a) of converting to control the DSV to a desired value to produce a pilot signal.

* * * * *